US007491266B2

(12) United States Patent
Taguchi et al.

(10) Patent No.: US 7,491,266 B2
(45) Date of Patent: *Feb. 17, 2009

(54) BLACK INK AND INK SET FOR INKJET RECORDING

(75) Inventors: Toshiki Taguchi, Tokyo (JP); Naotaka Wachi, Shizuoka (JP); Manabu Ogawa, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 334 days.

This patent is subject to a terminal disclaimer.

(21) Appl. No.: 10/578,229

(22) PCT Filed: Nov. 4, 2004

(86) PCT No.: PCT/JP2004/016697

§ 371 (c)(1),
(2), (4) Date: May 4, 2006

(87) PCT Pub. No.: WO2005/042652

PCT Pub. Date: May 12, 2005

(65) Prior Publication Data

US 2007/0101899 A1    May 10, 2007

(30) Foreign Application Priority Data

Nov. 4, 2003 (JP) ............................. 2003-374328
Jan. 9, 2004 (JP) ............................. 2004-003813

(51) Int. Cl.
*C09D 11/02* (2006.01)

(52) U.S. Cl. .............. 106/31.27; 106/31.46; 106/31.48; 106/31.5; 106/31.52; 106/31.57

(58) Field of Classification Search ............. 106/31.27, 106/31.52, 31.46, 31.48, 31.5, 31.57
See application file for complete search history.

(56) References Cited

U.S. PATENT DOCUMENTS

| 5,980,623 | A   |   | 11/1999 | Hiraoka et al. |            |
|-----------|-----|---|---------|----------------|------------|
| 7,029,523 | B2  | * | 4/2006  | Taguchi et al. | 106/31.46  |
| 7,037,365 | B2  | * | 5/2006  | Taguchi et al. | 106/31.46  |
| 7,048,790 | B2  | * | 5/2006  | Taguchi et al. | 106/31.46  |
| 7,083,664 | B2  | * | 8/2006  | Taguchi et al. | 106/31.27  |
| 7,208,035 | B2  | * | 4/2007  | Ogawa et al.   | 106/31.58  |
| 7,211,133 | B2  | * | 5/2007  | Taguchi        | 106/31.48  |
| 7,220,302 | B2  | * | 5/2007  | Taguchi        | 106/31.46  |
| 7,252,707 | B2  | * | 8/2007  | Ozawa et al.   | 106/31.27  |
| 7,267,715 | B2  | * | 9/2007  | Taguchi et al. | 106/31.48  |
| 7,273,519 | B2  | * | 9/2007  | Taguchi et al. | 106/31.46  |
| 7,303,272 | B2  | * | 12/2007 | Taguchi et al. | 106/31.46  |
| 2002/0135649 | A1 | * | 9/2002 | Yoshizawa et al. | 347/100 |
| 2005/0243151 | A1 | * | 11/2005 | Chino et al.   | 347/100   |

FOREIGN PATENT DOCUMENTS

| EP | 0 979 847 A1 | 2/2000 |
|----|--------------|--------|
| EP | 1 462 490 A1 | 9/2004 |
| EP | 1 462 493 A1 | 9/2004 |
| EP | 1 462 494 A1 | 9/2004 |
| JP | 2000-43399 A | 2/2000 |
| JP | 2002-256190 A | 9/2002 |
| JP | 2003-147238 A | 5/2003 |
| JP | 2003-306623 A | 10/2003 |
| JP | 2004-123828 A | 4/2004 |
| JP | 2004-123861 A | 4/2004 |
| JP | 2004-124012 A | 4/2004 |
| JP | 2004-124017 A | 4/2004 |
| JP | 2004-137332 A | 5/2004 |
| JP | 2004-149558 A | 5/2004 |
| JP | 2004-225004 A | 8/2004 |
| JP | 2004-292482 A | 10/2004 |
| JP | 2004-315790 A | 11/2004 |
| WO | WO 2004/029166 | * 4/2004 |

OTHER PUBLICATIONS

International Search Report for PCT/JP04/016697 dated Jan. 25, 2005.
Supplementary Partial European Search Report dated May 8, 2007.

* cited by examiner

*Primary Examiner*—Helene Klemanski
(74) *Attorney, Agent, or Firm*—Sughrue Mion, PLLC

(57) ABSTRACT

To provide an inkjet black ink having excellent image durability and ink discharge properties and an ink set, the inkjet black ink, which contains a dye having a λmax of from 500 nm to 700 nm and a half-band width of 100 nm or more in an absorption spectrum of a diluted solution standardized at an absorbance of 1.0 at the λmax, has the change ratio of absorbance at the λmax in the visible region, specified in the specification; and the inkjet ink set containing at least two black inks having different densities has the relationship among the at least two black inks, specified in the specification.

12 Claims, No Drawings

BLACK INK AND INK SET FOR INKJET RECORDING

TECHNICAL FIELD

The present invention relates to a black ink for inkjet recording, which has excellent durability of images, and an ink set containing the same.

BACKGROUND ART

In recent years, following the diffusion of computers, inkjet printers are widely utilized not only in offices but also for the purpose of printing on papers, films, cloths, etc. in households.

The inkjet recording method includes a system of discharging droplets by applying a pressure by piezoelectric elements; a system of discharging droplets by generating bubbles in an ink by heat; a system of using ultrasonic waves; and a system of suction discharging droplets by an electrostatic force. As ink compositions for such inkjet recording, aqueous inks, oil based inks, or solid (melt type) inks are used. Of these inks, aqueous inks are the mainstream in view of production, handling properties, odor, safety, and other properties.

Coloring agents that are used for these inkjet recording inks are required such that they have high solubility in solvents; they can achieve high-density recording; they have a good hue; they have excellent fastness to light, heat, air, water, or chemicals; they have good fixing properties to image receiving materials and hardly cause bleeding; they have excellent fastness as inks; they have no toxicity; they have a high purity; and additionally, they are available cheaply. However, it is extremely difficult to find out coloring agents capable of meeting these requirements at high levels.

Various dyes and pigments for inkjet use have already been proposed and actually used. However, it is a present state that any coloring agent capable of meeting all of these requirements has not been discovered yet. Conventionally well known dyes or pigments to which color index (C.I.) numbers are given are difficult to cope with both hue and fastness as required in inkjet recording inks.

So far, food black based dyes, naphthol black direct azo dyes, acid azo dyes, and so on have been widely known as inkjet black dyes.

As food black based dyes, C.I. Food Black 1 and C.I. Food Black 2 are representative, and techniques regarding use of these inkjet black inks are described in JP-A-2-36276, JP-A-2-233782, JP-A-2-233783, etc.

Also, techniques for use of C.I. Acid Black 2, C.I. Acid Black 31, C.I. Acid Black 52, C.I. Acid Black 140, C.I. Acid Black 187, etc. as acid azo dyes for inkjet black inks are described in JP-A-60-108481, JP-A-2-36277, JP-A-2-36278, etc.; and techniques for use of C.I. Direct Black 9, C.I. Direct Black 17, C.I. Direct Black 38, C.I. Direct Black 51, C.I. Direct Black 60, C.I. Direct Black 102, C.I. Direct Black 107, C.I. Direct Black 122, C.I. Direct Black 142, C.I. Direct Black 154, C.I. Direct Black 168, etc. as direct azo dyes for inkjet black inks are described in JP-A-56-139568, JP-A-61-285275, JP-A-3-106974, etc.

In general, it is difficult to cover the hue of black by single use, and therefore, a combination with a short-wave dye is preferably carried out.

As the short-wave dye, direct azo dyes, acid azo dyes, etc. are similarly widely known. Techniques for use of C.I. Acid Yellow 17, C.I. Acid Yellow 23, C.I. Acid Yellow 49, C.I. Acid Yellow 194, etc., or C.I. Direct Yellow 861, C.I. Direct Yellow 120, C.I. Direct Yellow 132, C.I. Direct Yellow 144, etc. for inkjet black inks are described in JP-A-7-97541, WO97/16496, JP-A-10-158560, JP-A-11-12514, etc.

The dye of the invention is more excellent in fastness than these dyes, and techniques for use of the dye of the invention as an inkjet black ink are described in JP-A-2003-306623.

The present inventors made investigations regarding inkjet inks using a dye. However, it was noted that there is a problem that aqueous black inks are low in image durability. In particular, in the case of expressing a gray continuous pattern with monochromatic images, it was considered problematic that deterioration of gray images in low-density areas is remarkable.

Also, different from carbon black, etc., black dyes capable of giving black images having a high printing quality such as letters by single use are not substantially existent, and it is required to mix and use several kinds of dyes having a different absorption spectrum. However, such dyes are liable to be decomposed depending upon the ink preparation condition and dye kind. It has been noted that inks using such dyes lack ink stability, resulting in causing a problem that discharge failure of ink is liable to occur.

DISCLOSURE OF THE INVENTION

An object of the invention is to provide a black ink for inkjet recording, which has excellent ink discharge properties. Another object of the invention is to provide a black ink for inkjet recording, which has excellent ink discharge properties and excellent image durability. A further object of the invention is to provide an ink set for inkjet recording, which contains an inkjet black ink having excellent image durability.

The objects of the invention have been achieved by the following black ink and ink set for inkjet recording.

(1) A black ink for inkjet recording, which comprises:

an aqueous medium; and a dye having a λmax of from 500 nm to 700 nm and a half-band width of 100 nm or more in an absorption spectrum of a diluted solution, the absorption spectrum being standardized to have an absorbance of 1.0 at the λmax, wherein a change ratio of an absorbance at λmax in a visible region is 10% or less before and after the black ink is heated to reflux for 6 hours under a condition which water boils, wherein the absorbance is an absorbance of the black ink in a cell having an optical path length of 5 μm.

(2) The black ink for inkjet recording according to item (1), which further comprises a dye having a λmax of from 350 nm to 500 nm.

(3) The black ink for inkjet recording according to item (1) or (2), wherein at least one dye to be contained in the black ink has an oxidation potential higher than 1.0 V versus SCE.

(4) The black ink for inkjet recording according to any one of items (1) to (3), wherein the at least one dye to be contained in the black ink is a dye represented by formula (1):

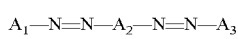

$$A_1\text{—}N\text{=}N\text{—}A_2\text{—}N\text{=}N\text{—}A_3$$

wherein $A_1$, $A_2$ and $A_3$ each independently represents an aromatic group or a heterocyclic group that may be substituted; $A_1$ and $A_3$ each represents a monovalent group; and $A_2$ represents a divalent group.

(5) The black ink for inkjet recording according to any one of items (1) to (4), wherein the aqueous medium comprises a water-soluble organic solvent having a boiling point of 150° C. or higher.

(6) The black ink for inkjet recording according to any one of items (1) to (5), wherein the black ink has an amide solvent content of an amide solvent of 5% or less by weight.

(7) The black ink for inkjet recording according to any. one of items (1) to (6), wherein the black ink has a pH of from 6 to 9.

(8) An ink set for inkjet recording, which comprises at least two black inks having different densities from each other, wherein the at least two black inks each independently comprises: an aqueous medium; and a dye having a λmax of from 500 nm to 700 nm and a half-band value of 100 nm or more in an absorption spectrum of a diluted solution, the absorption spectrum being standardized to have an absorbance of 1.0 at the λmax, wherein a lower density black ink in the at least two black inks has an ozone fastness stronger than that of a higher density black ink in the at least two black ink, the higher density black ink having a density higher than that of the lower density black ink.

(9) An ink set for inkjet recording, which comprises at least two black inks having different densities from each other, wherein the at least two black inks each independently comprises: an aqueous medium; and a dye having a λmax of from 500 nm to 700 nm and a half-band value of 100 nm or more in an absorption spectrum of a diluted solution, the absorption spectrum being-standardized to have an absorbance of 1.0 at the λmax, wherein the at least two black inks satisfy following relationship:

$$Z=(RD\text{-}L)/(RD\text{-}H)<1$$

wherein RD-L represents a ratio of Dmax (A) to Dmax (B) of a lower density black ink in the at least two black inks;

RD-H represents a ratio of Dmax (A) to Dmax (B) of a higher density black ink in the at least two black inks, the higher density black ink having a density higher than that of the lower density black ink;

Dmax (A) represents an absorbance at λmax in a visible region in measuring the absorbance of the lower density black ink or the higher density black ink in a cell having an optical path length of 5 μm; and Dmax (B) represents the absorbance at λmax in the visible region in measuring the absorbance of the lower density black ink or the higher density black ink diluted with water by 2,000 times in a cell having an optical path length of 1 cm.

(10) An ink set for inkjet recording, which comprises at least two black inks having different densities from each other, wherein the at least two black inks each independently comprises: an aqueous medium; and a dye having a λmax of from 500 nm to 700 nm and a half-band value of 100 nm or more in an absorption spectrum of a diluted solution, the absorption spectrum being standardized to have an absorbance of 1.0 at the λmax, wherein when with respect to each of the at least two black inks, a stepwise printing sample having a concentration pattern of 15 steps up to 30 mL/m² at maximum is prepared and a reflection density in the concentration pattern is measured, a higher density black ink in the at least two black inks has a maximum value of the reflection density higher than that a lower density black ink in the at least two black ink, the lower density black ink having a density lower than that of the higher density black ink.

(11) The ink set for inkjet recording according to any one of items 8 to 10, wherein at least one dye to be contained in the at least two black inks has an oxidation potential higher than 1.0 V versus SCE.

(12) The ink set for inkjet recording according to any one of items (8) to (11), wherein at least one dye to be contained in the at least two black inks is a dye represented by formula (1):

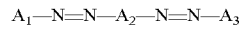

wherein $A_1$, $A_2$ and $A_3$ each independently represents an aromatic group or a heterocyclic group that may be substituted; $A_1$ and $A_3$ each represents a monovalent group; and $A_2$ represents a divalent group.

(13) The ink set for inkjet recording according to any one of items (8) to (10), wherein at least one of the at least two black inks is a black ink according to any one of items (1) to (7).

ADVANTAGE OF THE INVENTION

According to the invention, it is possible to provide an inkjet black ink having excellent image durability and ink discharge properties.

Since the ink of the invention is excellent in weather resistance (fastness to light, heat, ozone, etc.), it is possible to obtain images having excellent durability (image fastness) according to the ink of the invention. Also, since the ink of the invention is excellent in stability, its discharge properties are good.

Also, by using two or more black inks having specified spectral absorption characteristics and different densities, in the case of expressing a gray continuous pattern with monochromatic images, the invention gives rise to a marked effect that the weather resistance of gray images in low-density areas is ensured good.

DETAILED DESCRIPTION OF THE INVENTION

The invention will be described below in detail.

λmax of an ink in the invention is a wavelength at which the ink shows a maximum absorbance in absorption spectrum measurement.

In the black ink for inkjet recording (inkjet black ink) of the invention, by defining a change ratio of 10% or less with respect to absorbance at λmax in the visible region before and after the heat refluxing treatment for 6 hours under a condition of water boiling, where the absorbance is an absorbance of the black ink in a cell having an optical path length of 5 μm, it is possible to obtain sufficient ink stability.

According to the knowledge of the present inventors obtained as a result of extensive and intensive investigations regarding ink formulations and an environmental condition for the sake of keeping stability of black inks, in black inks using a black dye, the ink performance is deteriorated depending upon ink formulations and an environmental condition. The major cause of deterioration of the performance is decomposition of the dye in the ink, and this decomposition mainly relies upon solvolysis.

In order to ensure the quality in use of an ink, an evaluation method of properly evaluating the ink stability is necessary. The present inventors have successfully found a method effective for evaluating the stability.

That method is a method of judging whether or not a dye is decomposed before and after heat refluxing treatment of a prepared black ink for 6 hours under a boiling condition of water. The judgment becomes possible by optically measuring the ink as it is. In particular, since it may be considered that by diluting the ink, its optical characteristics change, the invention employs a method of measuring absorbance (Abs) in the visible region under the state that the ink is poured in an extremely thin cell having an optical path length of 5 μm without being diluted, that is, a method of examining a change ratio of absorbance at λmax in the visible region before and after heat refluxing treatment of the ink for 6 hours under a boiling condition of water as spectrally measured using a thin-layer cell.

When this measurement is carried out, by choosing dyes and additives to be used in the ink to prepare a formulation such that the change ratio of absorbance at λmax is 10% or less, preferably 5% or less, and more preferably 3% or less, it is possible to obtain an ink having excellent stability.

Incidentally, the non-diluted ink as referred to herein means an ink preferably having a dye concentration of from 0.2 to 20% by weight, and more preferably from 0.5 to 15% by weight. Also, the boiling condition of water as referred to herein means 100° C. (at one atmosphere) or a reduced pressure condition even at a temperature of lower than 100° C.

In general, in the case of solvolysis, its rate is dominated by basicity of the solvent, dielectric constant, pH of the entire system, presence of a nucleophilic agent, etc.

In the invention, it is preferred to use a water-soluble organic solvent having a boiling point of 150° C. or higher as an ink solvent.

Also, it is preferred to avoid use of an amide solvent having strong basicity or to suppress its addition amount to 5% or less by weight based on the weight of the ink. Examples of such an amide solvent include N,N-dimethylformamide, N,N-dimethylacetamide, acetamide, tetramethylguanidine, 2-pyrrolidone, and 1,3-dimethyl-2-imidazolidione.

On the other hand, preferred examples of the solvent include glycerin, diethylene glycol, triethylene glycol, diethylene glycol monobutyl ether, and triethylene glycol monobutyl ether.

Also, the pH of the ink is preferably from 6 to 9. This is because in a system having an excessively low pH, deposition of the dye is liable to occur, and acid hydrolysis is liable to proceed; and in a system having a high pH, decomposition of the dye due to hydrolysis and nucleophilic attack is liable to occur. The pH is preferably in the range of from 6.5 to 8.5, and more preferably in the range of from 7.0 to 8.0.

As a pH adjustor to be added to the ink, it is preferred to choose a base which is said to have low nucleophilicity in the organic chemistry field. That is, it is preferred to avoid use of substituted alkylamines or ammonia. On the other hand, preferred examples of the pH adjustor include hydroxides and carbonates of lithium, sodium, potassium, etc. as inorganic bases.

Next, the black dye that is used in the invention will be described below in detail.

In the black ink that is used in the invention, a dye (L) having a wave length λmax of from 500 nm to 700 nm and a half-band width of 100 nm or more (preferably 120 nm or more and not more than 500 nm, and more preferably 120 nm or more and not more than 350 nm) in an absorption spectrum of a diluted solution standardized at an absorbance of 1.0 is used.

In the case where this dye (L) can realize singly black with high image quality (tight black) (i.e., without relying upon a light source of observation) in which any one of B, G and R color tones is hardly emphasized, it is possible to use this dye singly as a dye for black ink. However, in general, a combination of the dye (L) with a dye capable of covering the region where absorption of the foregoing dye is low is used. In general, a combination of the dye (L) with a dye (S) having the major absorption in the yellow region (where the λmax is from 350 to 500 nm) is preferable. Also, it is possible to further combine other dyes to prepare a black ink.

In the invention, the dye singly or a mixture of the dyes is dissolved or dispersed in an aqueous medium to prepare a black ink. In order that the thus prepared black ink may have a performance suitable as the inkjet black ink, that is, it may be satisfied with the requirements that (1) it is excellent in weather resistance and/or (2) a balance of black does not destroy even after fading, it is preferred to prepare an ink capable of meeting the following conditions.

First of all, a 48-point black square symbol of JIS Code 2223 is printed using the black ink, and a reflection density ($D_{vis}$) obtained by measuring the print with a status A filter (visual filter) is defined as an initial density. Examples of a reflection density analyzer mounted with a status A filter include an X-Rite density analyzer. Here, in the case where the "black" density is measured, a measured value by $D_{vis}$ is employed as the standard observed reflection density. This print is forcedly faded using an ozone fadometer capable of always generating 5 ppm of ozone, and a forced fading rate constant ($k_{vis}$) is determined from a time (t) when the reflection density ($D_{vis}$) reaches 80% of the initial reflection density according to the relational expression: $0.8 = \exp(-k_{vis} \cdot t)$.

In the black ink, the rate constant ($k_{vis}$) is preferably not more than $5.0 \times 10^{-2}$ [hour$^{-1}$], more preferably not more than $3.0 \times 10^{-2}$ [hour$^{-1}$], and especially preferably not more than $1.0 \times 10^{-2}$ [hour$^{-1}$]. (Condition 1)

Also, a 48-point black square symbol of JIS Code 2223 is printed using the black ink, and reflection densities ($D_R$, $D_G$ and $D_B$) of three colors of C (cyan), magenta (M) and Y (yellow), each of which is a value obtained by measuring the print with a status A filter but not $D_{vis}$, are defined as initial densities Here, $D_R$, $D_G$ and $D_B$ mean a C reflection density measured with a red filter, an M reflection density measured with a green filter, and a Y reflection density measured with a blue filter, respectively. This print is forcedly faded using an ozone fadometer capable of always generating 5 ppm of ozone according to the foregoing method, and forced fading rate constants ($k_R$, $k_G$ and $k_B$) are each determined from a time when each of the reflection densities ($D_R$, $D_G$ and $D_B$) reaches 80% of the initial reflection density in the same manner. In the case where the three rate constants are determined, and a ratio (R) of its maximum value to its minimum value is determined (for example, in the case where $k_R$ is the maximum value, and $k_G$ is the minimum value, $R = k_R/k_G$), the ratio (R) is preferably not more than 1.2, more preferably not more than 1.1, and especially preferably not more than 1.05. (Condition 2)

Incidentally, the "print obtained by printing a 48-point black square symbol of JIS Code 2223" as referred to herein is one obtained by printing images in a size so as to thoroughly cover an aperture of the analyzer for the sake of giving a sufficient size in the density measurement.

Also, at least one dye to be used in the black ink preferably has an oxidation potential of higher than 1.0 V (vs SCE), more preferably higher than 1.1 V (vs SCE), further preferably higher than 1.2 V (vs SCE), and most preferably higher than 1.25 V (vs SCE). When the oxidation potential of the dye is higher than 1.0 V (vs SCE), it is possible to obtain images that are excellent in image durability, especially ozone fastness. Also, it is preferable that at least one dye having an oxidation potential of higher than 1.0 V (vs SCE) has a λmax of 500 nm or more. (Condition 3)

Incidentally, a value (Eox) of the oxidation potential can be easily measured by those skilled in the art. This method is described in, for example, P. Delahay, *New Instrumental Methods in Electrochemistry* (published by Interscience Publishers (1954)); A. J. Bard, et al., *Electrochemical Methods* (published by John Wiley & Sons (1980)); and Akira Fujishima, et al., *Denki Kagaku Sokuteiho* (published by Gihodo Shuppan (1984)).

Concretely, the oxidation potential is obtained by dissolving a test sample in a solvent (for example, dimethyl-formamide and acetonitrile) containing a supporting electrolyte (for example, sodium perchlorate and ammonium tetrapropyl perchlorate) in a concentration of from $1\times10^{-2}$ to $1\times10^{-6}$ moles/liter and measuring as a value against SCE (saturated calomel electrode) by cyclic voltammetry, a rotatory ring disk method, a comb electrode method, etc. This value may possibly be deviated by about several millivolts by influences such as liquid junction potential and liquid resistance of sample solution. But, it is possible to ensure reproducibility of the potential by adding a standard sample (for example, hydroquinone). Incidentally, in order to unequivocally define the potential, in the invention, a value (vs SCE) obtained by measuring in dimethylformamide containing, as a supporting electrolyte, 0.1 moles/dm$^3$ of ammonium tetrapropyl perchlorate (dye concentration: 0.001 moles/dm$^3$) is employed as the oxidation potential. In the case of a water-soluble dye, there may be the case where the dye is sparingly dissolved directly in N,N-dimethylformamide. In that case, the measurement is carried out after dissolving the dye using water in an amount as small as possible and then diluting with N,N-dimethylformamide such that the water content is not more than 2%.

The oxidation potential (Eox) value expresses easiness of movement of an electron from a sample to an electrode, and the larger the value (the oxidation potential is noble), the more difficult the movement of an electron from a sample to an electrode, in other words, the sample is hardly oxidized. In the relation with the structure of a compound, by introducing an electron withdrawing group, the oxidation potential become higher; and by introducing an electron donating group, the oxidation potential become lower.

Further, it is preferred to prepare a black ink using an azo dye represented by the foregoing formula (1). As the azo dye represented by formula (1), first of all, ones corresponding to the dye (L) having a λmax of from 500 nm to 700 nm and a half-band width of 100 nm or more in an absorption spectrum of a diluted solution standardized to have an absorbance of 1.0 at the λmax, wherein at least one of the at least two black inks is a black ink according to can be enumerated. Besides, the dye (S) having a λmax of from 350 nm to 500 nm can be similarly enumerated as one corresponding to the dye of formula (1). Preferably, at least one of the dyes (L) is a dye of formula (1); especially preferably, at least one dye in all of the dyes (L) and (S) is a dye of formula (1); and above all, it is preferable that 90% by weight of the whole of dyes in the ink is a dye of formula (1). (Condition 4)

In the first ink set for inkjet recording (inkjet ink set) of the invention, two or more black inks having different densities are prepared by dissolving and/or dispersing the dye singly or a mixture of the dyes in an aqueous medium. In this case, an ink set capable of meeting the following conditions is prepared.

The first condition is that the ozone fastness of- the black ink in the lower density side (the lower density black ink) is higher than that of the black ink in the higher density side (the higher density black ink).

The ozone fastness as referred to in the foregoing condition means a forced fading rate constant ($k_{vis}$) defined as follows.

First of all, a 48-point black square symbol of JIS Code 2223 is printed using the two or more black inks contained in the ink set (hereinafter sometimes referred to as "inks") such that a reflection density ($D_{vis}$) obtained by printing the print with a status A filter (visual filter) becomes from 0.8 to 1.2 and is defined as an initial density. Examples of a reflection density analyzer mounted with a status A filter include an X-Rite density analyzer. Here, in the case where the "black" density is measured, a measured value by $D_{vis}$ is employed as the standard observed reflection density. In the ink set of the invention, this print is forcedly faded using an ozone fadometer capable of always generating 5 ppm of ozone, and an ink set is prepared in such a manner that at that time, a forced fading rate constant ($k_{vis}$) of the print prepared using the ink in the low density side is smaller than that of the print prepared using the ink in the high density side.

The forced fading rate constant ($k_{vis}$) as referred to herein is one determined from a time (t) when the refection density ($D_{vis}$) reaches 80% of the initial reflection density according to the relational expression: $0.8=\exp(-k_{vis}\cdot t)$.

In the invention, in all of the black inks, the rate constant ($k_{vis}$) is preferably not more than $5.0\times10^{-2}$ [hour$^{-1}$], more preferably not more than $3.0\times10^{-2}$ [hour$^-$], and especially preferably not more than $1.0\times10^{-2}$ [hour$^{-1}$].

The ink density as referred to in the invention can be defined by a density in printing the same amount of the ink. That is, an ink from which a print having a higher optical density is defined as "ink having a high density". In the case of discriminating the ink state, as recited in claim 9, since the density of the ink is measured directly using a cell having an optical path length of 5 μm, and the absorbance (Dmax (A)) obtained herein is a density of the actual ink, comparison can be made using this value.

In the case where three or more inks having a different density are present, it is possible to horizontally develop this definition and unequivocally determine a density permutation of ink.

In the invention, in the foregoing black inks having a different density, forced fading rate constants ($k_R$, $k_G$ and $k_B$) based on reflection densities ($D_R$, $D_G$ and $D_B$) of three colors of C, M and Y but not $D_{vis}$ can be defined in the same method as described above.

First of all, the reflection densities ($D_R$, $D_G$ and $D_B$) are defined as initial densities.

The foregoing print is forcedly faded using an ozone fadometer capable of always generating 5 ppm of ozone according to the foregoing method, and forced fading rate constants ($k_R$, $k_G$ and $k_B$) can be each determined from a time when each of the reflection densities ($D_R$, $D_G$ and $D_B$) reaches 80% of the initial reflection density in the same manner as described above.

In the invention, in the black inks to be used in the ink set, in the case where the three forced fading rate constants are determined, and a ratio (R) of its maximum value to its minimum value is determined (for example, in the case where $k_R$ is the maximum value, and $k_G$ is the minimum value, $R=k_R/k_G$), the ratio (R) is preferably not more than 1.2, more preferably not more than 1.1, and especially preferably not more than 1.05. It is preferable that the relationship between the forced fading rate constants ($k_R$, $k_G$ and $k_B$) and the ink densities is the same as the relationship between the foregoing $k_{vis}$ and the ink density.

Incidentally, the "print obtained by printing a 48-point black square symbol of JIS Code 2223" as referred to herein is one obtained by printing images in a size so as to thoroughly cover an aperture of the analyzer for the sake of giving a sufficient size in the density measurement.

Also, a characteristic feature of the black ink in the ink set of the second invention is as-follows.

That is, when an absorbance (Dmax (A)) at λmax in measuring an absorbance (Abs) of the black ink as it is in the visible region using a cell having an optical path length of 5 µm and an absorbance (Dmax (B)) at λmax in measuring an absorbance (Abs) of the black ink after diluting with water by 2,000 times in the visible region using a cell having an optical path length of 1 cm are measured to determine a ratio of the both (RD=Dmax (A)/Dmax (B)), RD (RD-L) of the black ink in the lower density side (the lower density black ink) and RD (RD-H) of the black ink in the higher density side (the higher density black ink) have the following relationship:

$$Z = RD\text{-}L/RD\text{-}H < 1$$

This theoretically expresses that dye association properties in the ink are more enhanced in the ink in the lower density side.

It is meant that in the case where an absorbance (apparent ε) of a concentrated ink solution obtained by measuring an absorption spectrum with a cell having a very short optical path length is compared with an apparent ε of a diluted solution obtained by measuring an absorption spectrum, when the apparent ε in the ink in the lower density side is lowered, the association properties become high.

That is, when the association properties of the ink become high, the RD value defined in the invention should be lowered. What Z is not more than 1 means that the association properties of the ink in the lower density side become high.

Further, as the ink for the ink set of the third invention, an ink having the following characteristic feature can be enumerated.

That is, in preparing a stepwise printing sample having a concentration pattern of 15 steps up to 30 mL/m² at maximum using the respective two or more inks having different densities, the black ink in the higher density side (the higher density black ink) has a maximum value (Dmax) of the measured value of reflection density in the pattern higher than the black ink in the lower density side (the lower density black ink).

This is a comparison of a measured value of the reflection density in a place where the density is saturated so that even by increasing the printing amount, the density does not increase any more.

Here, with respect to the definition that the Dmax of the ink in the higher density side is high, the foregoing thought in $k_{vis}$ can be applied as it is.

The ink set of the invention can be satisfied with one or two or more of the foregoing first to third conditions, and preferably with all of these conditions.

The dye represented by formula (1) will be described below.

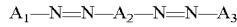

In the formula, $A_1$, $A_2$ and $A_3$ each independently represents an optionally substituted aromatic group or an optionally substituted heterocyclic group; $A_1$ and $A_3$ each represents a monovalent group; and $A_2$ represents a divalent group.

The azo dye represented by formula (1) is especially preferably a dye represented by formula (2):

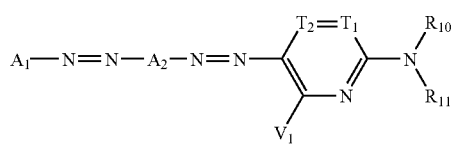

In the foregoing formula (2), $T_1$ and $T_2$ each represents =CR$_{12}$— or —CR$_{13}$=; or one of $T_1$ and $T_2$ represents a nitrogen atom, and the other represents =CR$_{12}$— or —CR$_{13}$=.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a hetero-cyclic oxy group, a silyloxy group, an acyloxy group, a carbamoyloxy group, an alkoxycarbonyloxy group, an aryl-oxycarbonyloxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group; an alkyl- or arylthio group, a heterocyclic thio group, an alkyl- or arylsulfonyl group, a heterocyclic sulfonyl group, an alkyl- or aryl-sulfinyl group, a heterocyclic sulfinyl group, a sulfamoyl group, or a sulfo group, and each of these groups may be further substituted.

$R_{10}$ and $R_{11}$, each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group, and each of these groups may further have a substituent.

Also, $R_{12}$ and $R_{10}$, or $R_{10}$ and $R_{11}$ may be taken together to form a 5- or 6-membered ring.

$A_1$ and $A_2$ are synonymous with those in formula (1), respectively.

The azo dye represented by formula (2) is further preferably a dye represented by formula (3-1) or (3-2):

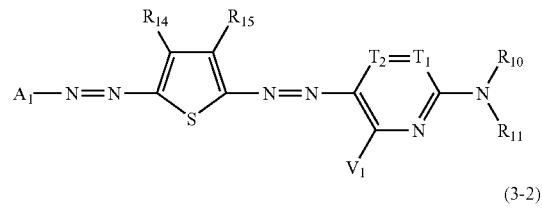

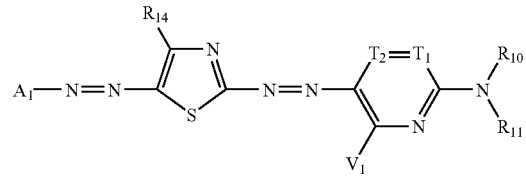

In the foregoing formula (3-1) and formula (3-2), $R_{14}$ and $R_{15}$ are synonymous with $R_{12}$ in formula (2). $A_1$, $R_{10}$, $R_{11}$, $T_1$, $T_2$ and $V_1$ are synonymous with those in formula (2), respectively.

The terminologies (substituents) used in the description of formula (1), formula (2), formula (3-1) and formula (3-2) (hereinafter referred to as "formula (3)" when formula (3-1) and formula (3-2) are expressed in summary) will be described below. These terminologies are common in the description of formula (4) and formula (5) as described later.

Examples of the halogen atom include a fluorine atom, a chlorine atom, and a bromine atom.

The aliphatic group means an alkyl group, a substituted alkyl group, an alkenyl group, a substituted alkenyl group, an alkynyl group, a substituted alkynyl group, an aralkyl group, and a substituted aralkyl group. The aliphatic group may be branched and may form a ring. The number of carbon atoms of the aliphatic group is preferably from 1 to 20, and more preferably from 1 to 16. The aryl moiety of the aralkyl group and the substituted aralkyl group is preferably phenyl or naphthyl, and especially preferably phenyl. Examples of the aliphatic group include a methyl group, an ethyl group, a butyl group, an isopropyl group, a t-butyl group, a hydroxyethyl group, a methoxyethyl group, a cyanoethyl group, a trifluoro-methyl group, a 3-sulfopropyl group, a 4-sulfobutyl group, a cyclohexyl group, a benzyl group, a 2-phenethyl group, a vinyl group, and allyl group.

The monovalent aryl group means an aryl group or a substituted aryl group. The aryl group is preferably phenyl or naphthyl, and especially preferably phenyl. The number of carbon atoms of the monovalent aromatic group is preferably from 6 to 20, and further preferably from 6 to 16. Examples of the monovalent aromatic group include phenyl, p-tolyl, p-methoxyphenyl, o-chlorophenyl, and m-(3-sulfopropylamino)phenyl. The divalent aromatic group is a divalent aromatic group resulting from conversion of the foregoing monovalent aromatic group. Examples thereof include phenylene, p-tolylene, p-methoxyphenylene, o-chlorophenylene, m-(3-sulfopropylamino)phenylene, and naphthylene.

The heterocyclic group includes a heterocyclic group having a substituent and an unsubstituted heterocyclic group. The heterocyclic group may be fused with an aliphatic group, an aromatic group, or other heterocyclic group. As the heterocyclic group, a 5-membered or 6-membered heterocyclic group is preferable. Examples of a hetero atom of the heterocyclic ring include N, O and S. Examples of the foregoing substituent include an aliphatic group, a halogen atom, an alkyl- or aryl-sulfonyl group, an acyl group, an acylamino group, a sulfamoyl-group, a carbamoyl group, and an ionic hydrophilic group. Examples of the monovalent heterocyclic group include a 2-pyridyl group, a 2-thienyl group, a 2-thiazolyl group, a 2-benzothiazolyl group, a 2-benzoxazolyl group, and a 2-furyl group. Examples of the divalent heterocyclic group include groups resulting from eliminating a hydrogen group from the foregoing monovalent heterocyclic groups.

The carbamoyl group includes a carbamoyl group having a substituent and an unsubstituted carbamoyl group. Examples of the foregoing substituent include an alkyl group. Examples of the foregoing carbamoyl group include a methylcarbamoyl group and a dimethylcarbamoyl group.

The alkoxycarbonyl group includes an alkoxycarbonyl group having a substituent and an unsubstituted alkoxycarbonyl group. As the alkoxycarbonyl group, an alkoxycarbonyl group having from 2 to 20 carbon atoms is preferable. Examples of the substituent include an ionic hydrophilic group. Examples of the foregoing alkoxycarbonyl group include a methoxycarbonyl group and an ethoxycarbonyl group.

The aryloxycarbonyl group includes an aryloxycarbonyl group having a substituent and an unsubstituted aryloxycarbonyl group. As the aryloxycarbonyl group, an aryloxycarbonyl group having from 7 to 20 carbon atoms is preferable. Examples of the foregoing substituent include an ionic hydrophilic group. Examples of the foregoing aryloxycarbonyl group include a phenoxycarbonyl group.

The heterocyclic oxycarbonyl group includes a heterocyclic oxycarbonyl group having a substituent and an unsubstituted heterocyclic oxycarbonyl group. As the heterocyclic oxycarbonyl group, a heterocyclic oxycarbonyl group having from 2 to 20 carbon atoms is preferable. Examples of the foregoing substituent include an ionic hydrophilic group. Examples of the foregoing heterocyclic oxycarbonyl group include a 2-pyridyloxycarbonyl group.

The acyl group includes an acyl group having a substituent and an unsubstituted acyl group. As the acyl group, an acyl group having from 1 to 20 carbon atoms is preferable. Examples of the foregoing substituent include an ionic hydrophilic group. Examples of the foregoing acyl group include an acetyl group and a benzoyl group.

The alkoxy group includes an alkoxy group having a substituent and an unsubstituted alkoxy group. As the alkoxy group, an alkoxy group having from 1 to 20 carbon atoms is preferable. Examples of the substituent include an alkoxy group, a hydroxyl group, and an ionic hydrophilic group. Examples of the foregoing alkoxy group include a methoxy group, an ethoxy group, an isopropoxy group, a methoxyethoxy group, a hydroxyethoxy group, and a 3-carboxypropoxy group.

The aryloxy group includes an aryloxy group having a substituent and an unsubstituted aryloxy group. As the aryloxy group, an aryloxy group having from 6 to 20 carbon atoms is preferable. Examples of the foregoing substituent include an alkoxy group and an ionic hydrophilic group. Examples of the foregoing aryloxy group include a phenoxy group, a p-methoxyphenoxy group, and an o-methoxyphenoxy group.

The heterocyclic oxy group includes a heterocyclic oxy group having a substituent and an unsubstituted heterocyclic oxy group. As the foregoing heterocyclic oxy group, a heterocyclic oxy group having from 2 to 20 carbon atoms is preferable. Examples of the foregoing substituent include an alkyl group, an alkoxy group, and an ionic hydrophilic group. Examples of the heterocyclic oxy group include a 3-pyridyloxy group and a 3-thienyloxy group.

As the silyloxy group, a silyloxy group substituted with an aliphatic group or an aromatic group-having from 1 to 20 carbon atoms is preferable. Examples of the silyloxy group include trimethylsilyloxy and diphenylmethylsilyloxy.

The acyloxy group includes an acyloxy group having a substituent and an unsubstituted acyloxy group. As the acyloxy group, an acyloxy group having from 1 to 20 carbon atoms is preferable. Examples of the foregoing-substituent include an ionic hydrophilic group. Examples of the acyloxy group include an acetoxy group and a benzoyloxy group.

The carbamoyloxy group includes a carbamoyloxy group having a substituent and an unsubstituted carbamoyloxy group. Examples of the foregoing substituent include an alkyl group. Examples of the carbamoyl group include an N-methylcarbamoyloxy group.

The alkoxycarbonyloxy group includes an alkoxycarbonyloxy group having a substituent and an unsubstituted alkoxycarbonyloxy group. As the alkoxycarbonyloxy group, an alkoxycarbonyloxy group having from 2 to 20 carbon atoms is preferable. Examples of the alkoxycarbonyloxy group include a methoxycarbonyloxy group and an isopropoxycarbonyloxy group.

The aryloxycarbonyloxy group includes an aryloxycarbonyloxy group having a substituent and an unsubstituted aryloxycarbonyloxy group. As the aryloxycarbonyloxy group, an aryloxycarbonyloxy group having from 7 to 20 carbon atoms is preferable. Examples of the aryloxycarbonyloxy group include a phenoxycarbonyloxy group.

The amino group includes an amino group substituted with an alkyl group, an aryl group or a heterocyclic group; and the alkyl group, aryl group and heterocyclic group may further have a substituent. As the alkylamino group, an alkylamino group having from 1 to 20 carbon atoms is preferable. Examples of the substituent include an ionic hydrophilic group. Examples of the alkylamino group include a methylamino group and a diethylamino group.

The arylamino group includes an arylamino group having a substituent and an unsubstituted arylamino group. As the arylamino group, an arylamino group having from 6 to 20 carbon atoms is preferable. Examples of the substituent include a halogen atom and an ionic hydrophilic group. Examples of the arylamino group include an anilino group and a 2-chlorophenylamino group.

The heterocyclic amino group includes a heterocyclic amino group having a substituent and an unsubstituted heterocyclic amino group. As the heterocyclic amino group, a heterocyclic amino group having from 2 to 20 carbon atoms is preferable. Examples of the substituent include an alkyl group, a halogen atom, and an ionic hydrophilic group.

The acylamino group includes an acylamino group having a substituent and an unsubstituted acylamino group. As the acylamino group, an acylamino group having from 2 to 20 carbon atoms is preferable. Examples of the substituent include an ionic hydrophilic group. Examples of the acylamino group include an acetylamino group, a propionylamino group, a benzoylamino group, an N-phenylacetylamino group, and a 3,5-disulfobenzoylamino group.

The ureido group includes a ureido group having a substituent and an unsubstituted ureido group. As the ureido group, a ureido group having from 1 to 20 carbon atoms is preferable. Examples of the substituent include an alkyl group and an aryl group. Examples of the ureido group include a 3-methylureido group, a 3-dimethylureido group, and a 3-phenylureido group.

The sulfamoylamino group includes a sulfamoylamino group having a substituent and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent and an unsubstituted alkoxycarbonylamino group. As the alkoxycarbonylamino group, an alkoxycarbonylamino group having from 2 to 20 carbon atoms is preferable. Examples of the substituent include an ionic hydrophilic group. Examples of the alkoxycarbonylamino group include an ethoxycarbonylamino group.

The aryloxycarbonylamino group includes an aryloxycarbonylamino group having a substituent and an unsubstituted aryloxycarbonylamino group. As the aryloxycarbonylamino group, an aryloxycarbonylamino group having from 7 to 20 carbon atoms is preferable. Examples of the substituent include an ionic hydrophilic group. Examples of the aryloxycarbonylamino group include a phenoxycarbonylamino group.

The alkyl- or arylsulfonylamino group includes an alkyl- or arylsulfonylamino group having a substituent and an unsubstituted alkyl- or arylsulfonylamino group. As the sulfonylamino group, a sulfonylamino group having from 1 to 20 carbon atoms is preferable. Examples of the substituent include an ionic hydrophilic group. Examples of the sulfonylamino group include a methylsulfonylamino group, an N-phenyl-methylsulfonylamino group, a phenylsulfonylamino group, and a 3-carboxyphenylsulfonylamino group.

The heterocyclic sulfonylamino group includes a heterocyclic sulfonylamino group having a substituent and an unsubstituted heterocyclic sulfonylamino group. As the heterocyclic sulfonylamino group, a heterocyclic sulfonylamino group having from 1 to 12 carbon atoms is preferable. Examples of the substituent include an ionic hydrophilic group Examples of the heterocyclic sulfonylamino group include a 2-thiophenesulfonylamino group and a 3-pyridinesulfonylamino group.

The heterocyclic sulfonyl group includes a heterocyclic sulfonyl group having a substituent and an unsubstituted heterocyclic sulfonyl group. As the heterocyclic sulfonyl group, a heterocyclic sulfonyl group having from 1 to 20 carbon atoms is preferable. Examples of the substituent include an ionic hydrophilic group. Examples of the heterocyclic sulfonyl group include a 2-thiophenesulfonyl group and a 3-pyridinesulfonyl group.

The heterocyclic sulfinyl group includes a heterocyclic sulfinyl group having a substituent and an unsubstituted heterocyclic sulfinyl group. As the heterocyclic sulfinyl group, a heterocyclic sulfinyl group having from 1 to 20 carbon atoms is preferable. Examples of the substituent include an ionic hydrophilic group. Examples of the heterocyclic sulfinyl group include a 4-pyridinesulfinyl group.

The alkyl- or arylthio group or heterocyclic thio group includes an alkyl- or arylthio or heterocyclic thio group having a substituent and an unsubstituted alkyl- or arylthio or heterocyclic thio group. As the alkyl- or arylthio or heterocyclic thio group, ones having from 1 to 20 carbon atoms are preferable. Examples of the substituent include an ionic hydrophilic group. Examples of the alkyl- or arylthio or heterocyclic thio group include a methylthio group, a phenylthio group, and a 2-pyridylthio group.

The alkyl- or arylsulfonyl group includes an alkyl- or arylsulfonyl group having a substituent and an unsubstituted alkyl- or arylsuolfonyl group. Examples of the alkyl- or arylsulfonyl group include a methylsulfonyl group and a phenylsulfonyl group.

The alkyl- or arylsulfinyl group includes an alkyl- or arylsulfinyl group having a substituent and an unsubstituted alkyl- or arylsulfinyl group. Examples of the alkyl- or arylsulfinyl group include a methylsulfinyl group and a phenylsulfinyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di(2-hydroxyethyl)sulfamoyl group.

Next, formulae (1), (2) and (3) will be further described below.

In the following description, with respect to groups and substituents, those as already-described are applied.

In formula (1), $A_1$, $A_2$ and $A_3$ each independently represents an optionally substituted aromatic group ($A_1$ and $A_3$ each represents a monovalent aromatic group such as an aryl group; and $A_2$ represents a divalent aromatic group such as an arylene group) or an optionally substituted heterocyclic group ($A_1$ and $A_3$ each represents a monovalent heterocyclic group; and $A_2$ represents a divalent heterocyclic group) Examples of the aromatic group include a benzene ring and a naphthalene ring; and examples of the hetero atom of the heterocyclic ring include N, O and S. The heterocyclic ring may be fused with an aliphatic ring, an aromatic ring, or other heterocyclic ring.

Examples of the substituent include an aryl azo group and a heterocyclic azo group. Accordingly, the dye represented by formula (1) includes a tris azo dye and a tetrakis azo dye.

Also, at least two of $A_1$, $A_2$ and $A_3$ are preferably a heterocyclic group.

Preferred examples of the heterocyclic group represented by $A_3$ include an aromatic nitrogen-containing 6-membered heterocyclic group. Above all, the case where $A_3$ represents an aromatic nitrogen-containing 6-membered heterocyclic group represented by the following formula P is especially preferable. At this time, formula (1) is corresponding to formula (2).

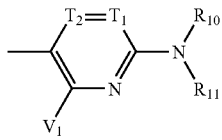

Formula P

In formula P, $T_1$ and $T_2$ each represents $=CR_{12}-$ or $-CR_{13}=$; or one of $T_1$ and $T_2$ represents a nitrogen atom, and the other represents $=CR_{12}-$ or $-CR_{13}=$. More preferably, $T_1$ and $T_2$ each represents $=CR_{12}-$ or $-CR_{13}=$.

$R_{10}$ and $R_{11}$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group. Each of these groups may further have a substituent. Preferred examples of the substituents represented by $R_{10}$ and $R_{11}$ include a hydrogen atom, an aliphatic group, an aromatic group, a heterocyclic group, an acyl group, and an alkyl- or arylsulfonyl group. Of these, a hydrogen atom, an aromatic group, a heterocyclic group, an acyl group, and an alkyl- or arylsulofnyl group are more preferable; and a hydrogen atom, an aryl group, and a heterocyclic group are most preferable. Each of these groups may further have a substituent.

$V_1$, $R_{12}$ and $R_{13}$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, a heterocyclic oxycarbonyl group, an acyl group, a hydroxyl group, an alkoxy group, an aryloxy group, a heterocyclic oxy group, a silyloxy group, an acyloxy group, a carbamoyloxy group, an alkoxycarbonyloxy group, an aryloxycarbonyloxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkyl- or arylsulfonylamino group, a heterocyclic sulfonylamino group, a nitro group, an alkyl- or arylthio group, a heterocyclic thio group, an alkyl- or arylsulfonyl group, a heterocyclic sulfonyl group, an alkyl- or arylsulfinyl group, a heterocyclic sulfinyl group, a sulfamoyl group, or a sulfo group, and each of these groups maybe further substituted.

Preferred examples of the substituent represented by V, include a hydrogen atom, a halogen atom, an aliphatic group, an aromatic group, a hydroxyl group, an alkoxy group, an aryloxy group, an acyloxy group, a heterocyclic oxy group, an amino group (including an alkylamino group, an arylamino group, and a heterocyclic amino group), an acylamino group, a ureido group, a sulfamoylamino group, an alkoxycarbonylamino group, an aryloxycarbonylamino group, an alkyl- or arylthio group, and a heterocyclic thio group. Of these, a hydrogen atom, a halogen atom, an alkyl group, a hydroxyl group, an alkoxy group, an aryloxy group, an acyloxy group, an amino group (including an alkylamino group, an arylamino group, and a heterocyclic amino group), and an acylamino group are more preferable; and a hydrogen atom, an arylamino group, and an acylamino group are most preferable. Each of these groups may further have a substituent.

Preferred examples of the substituents represented by $R_{12}$ and $R_{13}$ include a hydrogen atom, an alkyl group, an aryl group, a heterocyclic group, a halogen atom, an alkoxycarbonyl group, a carboxyl group, a carbamoyl group, a hydroxyl group, an alkoxy group, and a cyano group. Each of these groups may further have a substituent. $R_{12}$ and $R_{10}$, or $R_{10}$ and $R_{11}$ may be taken together to form a 5- or 6-membered ring. In the case where each of the substituents represented by $A_1$, $R_{12}$, $R_{13}$, $R_{10}$, $R_{11}$ and $V_1$ further has a substituent, examples of the substituent include those enumerated as the foregoing substituents for $V_1$, $R_{10}$ and $R_{11}$. Also, it is preferable that an ionic hydrophilic group is further present as a substituent at any one of the positions on $A_1$, $R_8$, $R_9$, $R_{10}$, $R_{11}$ and $V_1$.

The ionic hydrophilic group as a substituent includes a sulfo group, a carboxyl group, a phosphono group, and a quaternary ammonium group. As the foregoing ionic hydrophilic group, a carboxyl group, a phosphono group, and a sulfo group are preferable; and a carboxyl group and a sulfo group are especially preferable. The carboxyl group, phosphono group. and sulfo group may be each in the state of a salt. Examples of a counter ion for forming the salt include an ammonium ion, an alkali metal ion (for example, a lithium ion, a sodium ion, and a potassium ion), and an organic cation (for example, a tetramethylammonium ion, a tetramethylguanidinium ion, and a tetramethylphosphonium ion). Of these, a lithium ion is preferable.

Preferred examples of the heterocyclic ring represented by $A_2$ include a thiophene ring, a thiazole ring, an imidazole ring, a benzothiazole ring, and a thienothiazole ring. Each of the heterocyclic groups may further have a substituent. Of these, a thiophene ring, a thiazole ring, an imidazole ring, a benzothiazole ring, and a thienothiazole ring represented by the following formulae (a) to (e), respectively are preferable. Incidentally, when $A_2$ represents a thiophene ring represented by formula (a), and $A_3$ is a structure represented by the foregoing formula P, formula (1) is corresponding to formula (3-1); and when $A_2$ represents a thiazole ring represented by formula (b), and $A_3$ is a structure represented by the foregoing formula P, formula (1) is corresponding to formula (3-2).

(h)

(i)

(j)

-continued

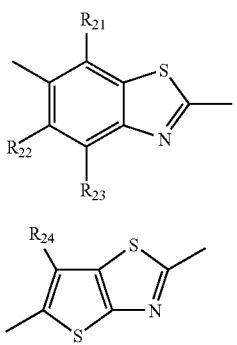

In the foregoing formulae (a) to (e) $R_{16}$ to $R_{24}$ each represents a substituent synonymous with $V_1$, $R_{12}$ and $R_{13}$ in formula P.

Of the dyes represented by formula (3), structures represented by the following formula (4-1) or formula (4-2) (hereinafter referred to as "formula (4)" when formula (4-1) and formula (4-2) are expressed in summary) are especially preferable.

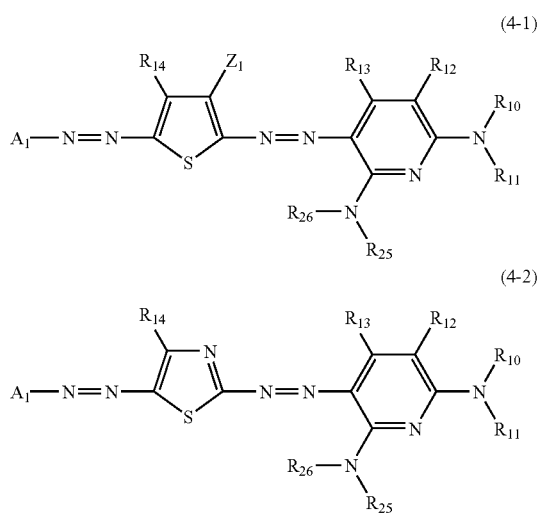

In the formulae, $Z_1$ represents an electron withdrawing group having a Hammett's substituent constant σp value of 0.20 or more. $Z_1$ is preferably an electron withdrawing group having a σp value of 0.30 or more, more preferably an electron withdrawing group having a σp value of 0.45 or more, and especially preferably an electron withdrawing group having a σp value of 0.60 or more. However, it is desired that the σp value does not exceed 1.0.

Specific examples of the electron withdrawing group having a Hammett's substituent constant σp value of 0.60 or more include a cyano group, a nitro group, an alkylsulfonyl group (for example, a methanesulfonyl group), and an arylsuofnyl group (for example, a benzenesulfonyl group).

Examples of the electron withdrawing group having a Hammett's substituent constant σp value of 0.45 or more include not only the foregoing groups but also an acyl group (for example, an acetyl group), an alkoxycarbonyl group (for example, a dodecyloxycarbonyl group), an aryloxycarbonyl group (for example, an m-chlorophenoxycarbonyl group), an alkylsulfinyl group (for example, an n-propylsulfinyl group), an arylsulfinyl group (for example, a phenylsulfinyl group), a sulfamoyl group (for example, an N-ethylsulfamoyl group and an N,N-dimethylsulfamoyl group), and a halogenated alkyl group (for example, a trifluoromethyl group).

Examples of the electron withdrawing group having a Hammett's substituent constant σp value of 0.30 or more include not only the foregoing groups but also an acyloxy group (for example, an acetoxy group), a carbamoyl group (for example, an N-ethylcarbamoyl group and an N,N-dibutylcarbamoyl group), a halogenated alkoxy group (for example, a trifluoromethyloxy group), a halogenated aryloxy group (for example, a pentafluorophenyloxy group), a sulfonyloxy group (for example, a methylsulfonyloxy group), a halogenated alkylthio group (for example, a difluoromethylthio group), an aryl group substituted with two or more electron withdrawing groups each having a Hammett's substituent constant σp value of 0.15 or more (for example, a 2,4-dinitrophenyl group and a pentachlorophenyl group), and a heterocyclic group (for example, a 2-benzoxazolyl group, a 2-benzothiazolyl group, and a 1-phenyl-2-benzimidazolyl group).

Examples of the electron withdrawing group having a Hammett's substituent constant σp value of 0.20 or more include not only the foregoing groups but also a halogen atom.

As $Z_1$, an acyl group having from 2 to 20 carbon atoms, an alkyloxycarbonyl group having from 2 to 20 carbon atoms, a nitro group, a cyano group, an alkylsulfonyl group having from 1 to 20 carbon atoms, an arylsulfonyl group having from 6 to 20 carbon atoms, a carbamoyl group having from 1 to 20 carbon atoms, and a halogenated alkyl group having from 1 to 20 carbon atoms are preferable. Of these, a cyano group, an alkylsulfonyl group having from 1 to 20 carbon atoms, and an arylsulofnyl group having from 6 to 20 carbon atoms are especially preferable; and a cyano group is most preferable.

Incidentally, the Hammett's substituent constant σp value to be used in the present specification is synonymous with that described in (0059) to (0060) of JP-A-2003-306623.

$R_{10}$, $R_{11}$, $R_{12}$, $R_{13}$ and $R_{14}$ in formula (4) are synonymous with those in formula (3). $R_{25}$ and $R_{26}$ each independently represents a hydrogen atom, an aliphatic group, an aromatic group, a heterocyclic group, an acyl group, an alkoxycarbonyl group, an aryloxycarbonyl group, a carbamoyl group, an alkyl- or arylsulfonyl group, or a sulfamoyl group. Of these, a hydrogen atom, an aromatic group, a heterocyclic group, an acyl group, or an alkyl- or arylsulfonyl group are preferable; and a hydrogen atom, an aromatic group, and a heterocyclic group are especially preferable.

Each of the groups described in formula (4) may further have a substituent. In the case where each of these groups further has a substituent, examples of the substituent include the substituents described in formula (2), the groups enumerated in $V_1$, $R_{10}$ and $R_{11}$, and an ionic hydrophilic group.

$A_1$ may be either an aromatic group or a heterocyclic group. Preferred examples of $A_1$ include a benzene ring, a naphthalene ring, a pyridine ring, an imidazole ring, a pyrazole ring, a thiazole ring, an isothiazole ring, a thiadiazole ring, a benzothiazole ring, and a benzoisothiazole ring. Of these, a benzene ring, a naphthalene ring, a pyridine ring, a pyrazole ring, an imidazole ring, an isothiazole ring, and a benzothiazole ring are more preferable; and a benzene ring and a naphthalene ring are most preferable.

With respect to a combination of substituents especially preferred as the azo dye represented by formula (2) according to the invention, $R_{10}$ and $R_{11}$ each preferably represents a hydrogen atom, an alkyl group, an aryl group, a heterocyclic group, a sulfonyl group, or an acyl group; more preferably a hydrogen atom, an aryl group, a heterocyclic group, or a sulfonyl group; and most preferably a hydrogen atom, an aryl group, or a heterocyclic group. However, $R_{10}$ and $R_{11}$ do not represent a hydrogen atom at the same time.

$V_1$ preferably represents a hydrogen atom, a halogen atom, an alkyl group, a hydroxyl group, an amino group, or an acylamino group; more preferably a hydrogen atom, a halogen atom, an amino group, or an acylamino group; and most preferably a hydrogen atom, an amino group, or an acylamino group.

$A_1$ preferably represents a pyrazole ring, an imidazole ring, an isothiazole ring, a thiadiazole ring, or a benzothiazole ring; more preferably a pyrazole ring or an isothiazole ring; and most preferably a pyrazole ring.

$T_1$ and $T_2$ each represents $=CR_{12}-$ or $-CR_{13}=$. $R_{12}$ and $R_{13}$ each preferably represents a hydrogen atom, an alkyl group, a halogen atom, a cyano group, a carbamoyl group, a carboxyl group, a hydroxyl group, an alkoxy group, or alkoxycarbonyl group; and more preferably a hydrogen atom, an alkyl group, a carboxyl group, a cyano group, or a carbamoyl group.

With respect to a combination of substituents preferred as the azo dye represented by the foregoing formula (1), compounds in which at least one of the various substituents is one of the foregoing preferred groups are preferable; compounds in which many of the various substituents are the foregoing preferred groups are more preferable; and compounds in which all of the substituents are the foregoing preferred groups are most preferable.

Specific examples of the azo dye represented by the foregoing formula (1) will be given below, but it should not be construed that the invention is limited thereto. Also, in the following specific examples, the carboxyl group, phosphono group and sulfo group may be in the state of a salt. Examples of a counter ion for forming the salt include an ammonium ion, an alkali metal ion (for example, a lithium ion, a sodium ion, and a potassium ion), and an organic cation (for example, a tetramethylammonium ion, a tetramethylguanidinium ion, and a tetramethylphosphonium ion). Of these, an ammonium ion, an organic cation, and a lithium ion are preferable; and a lithium ion is most preferable.

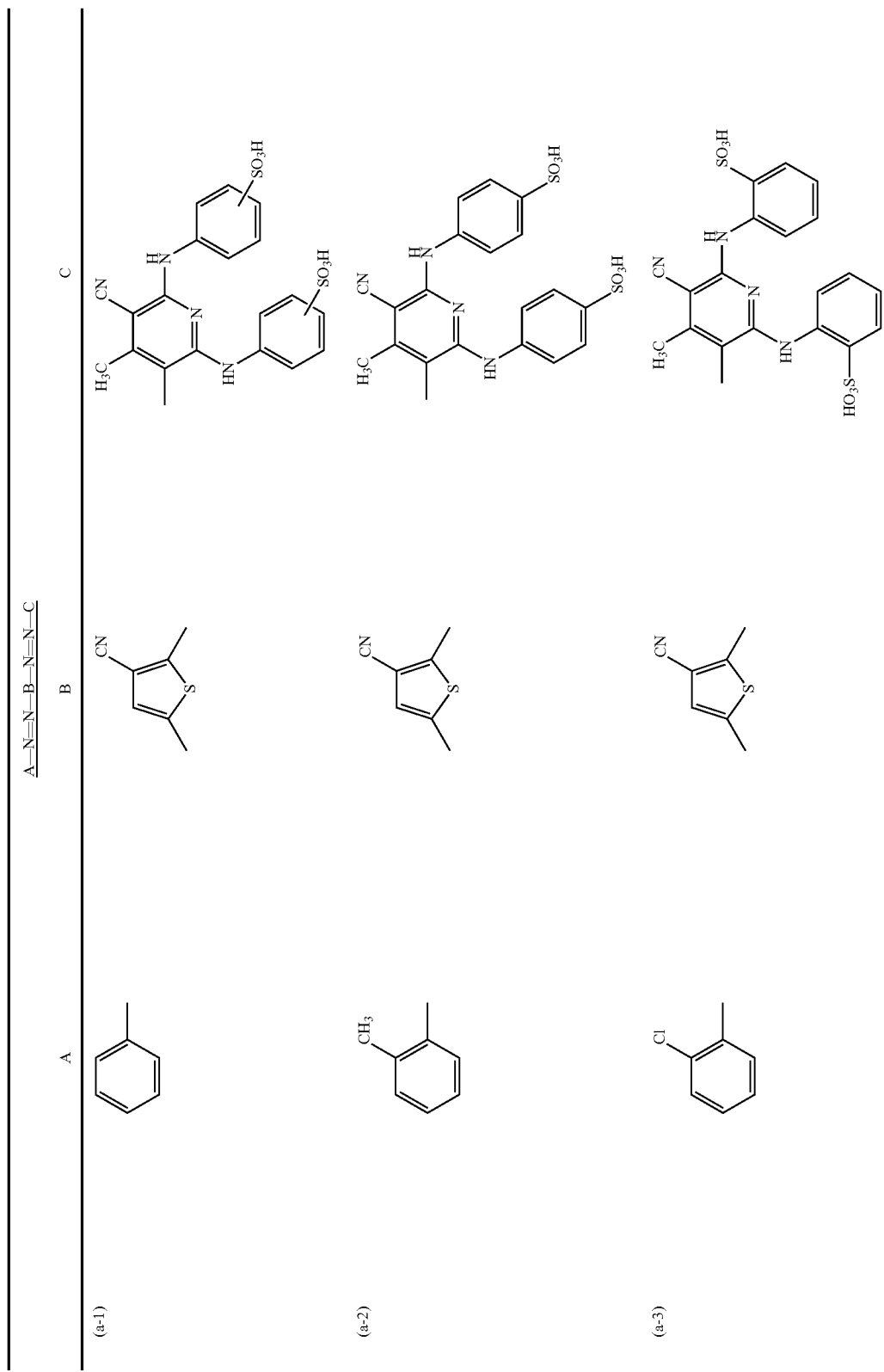

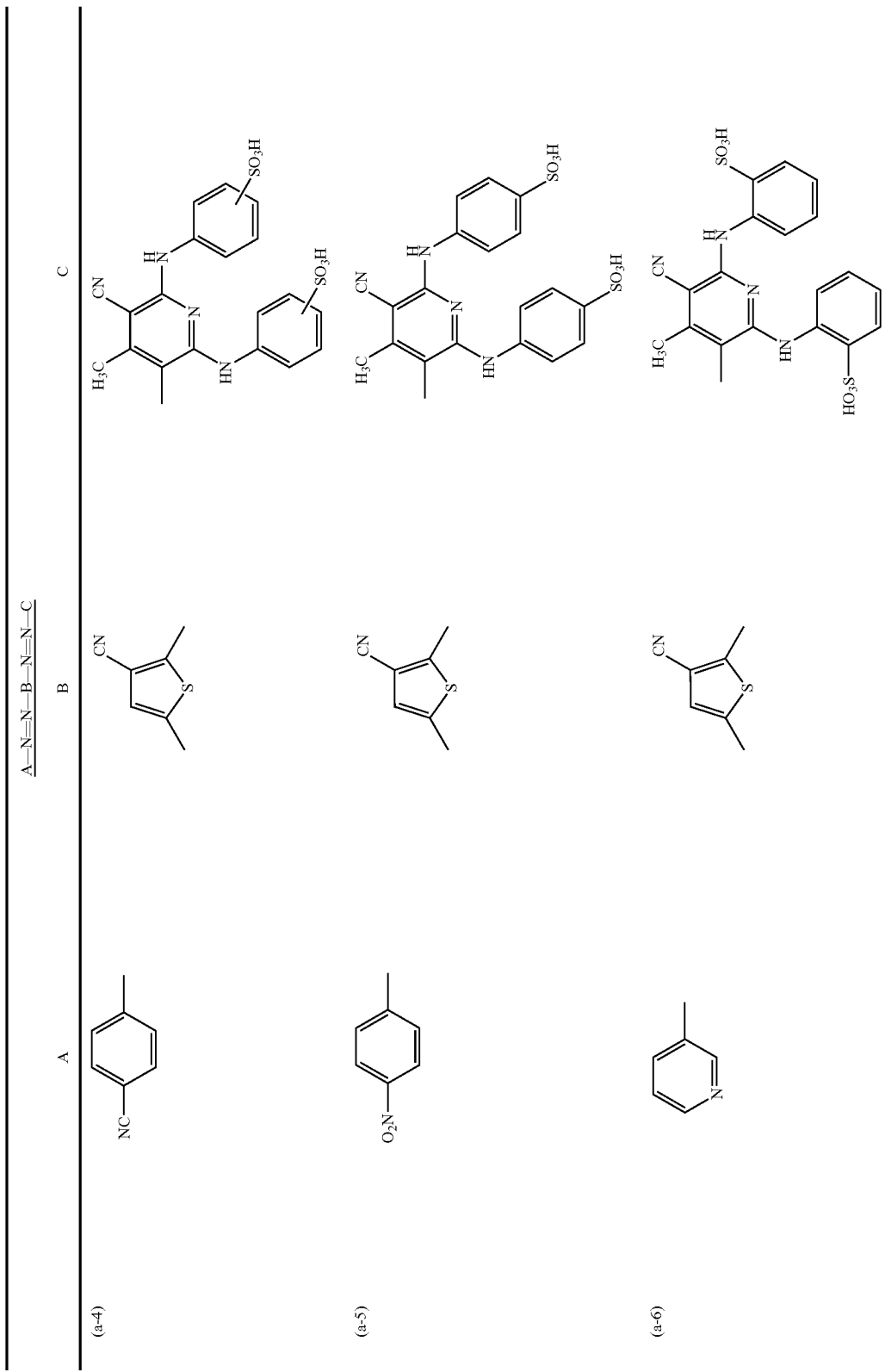

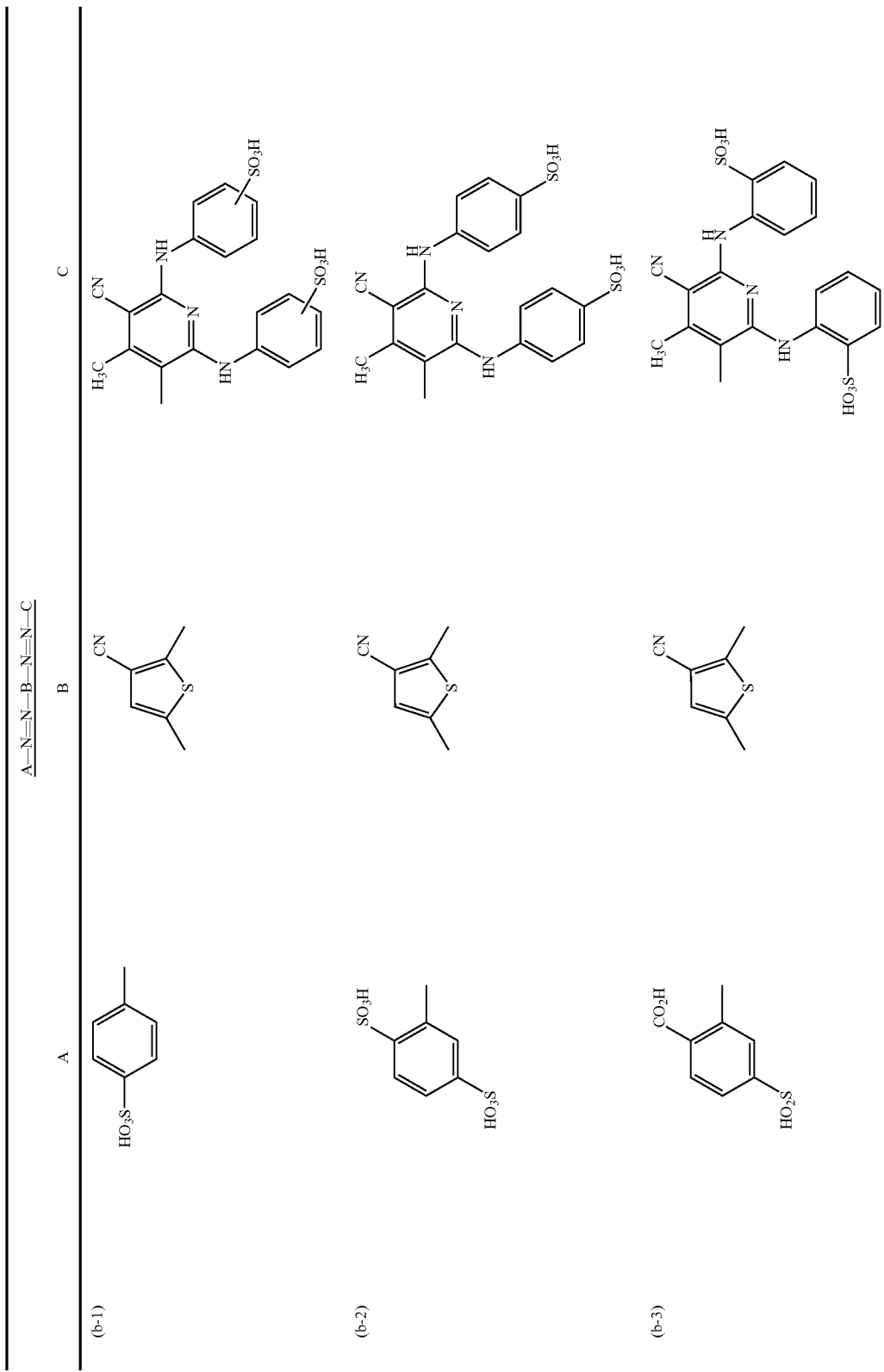

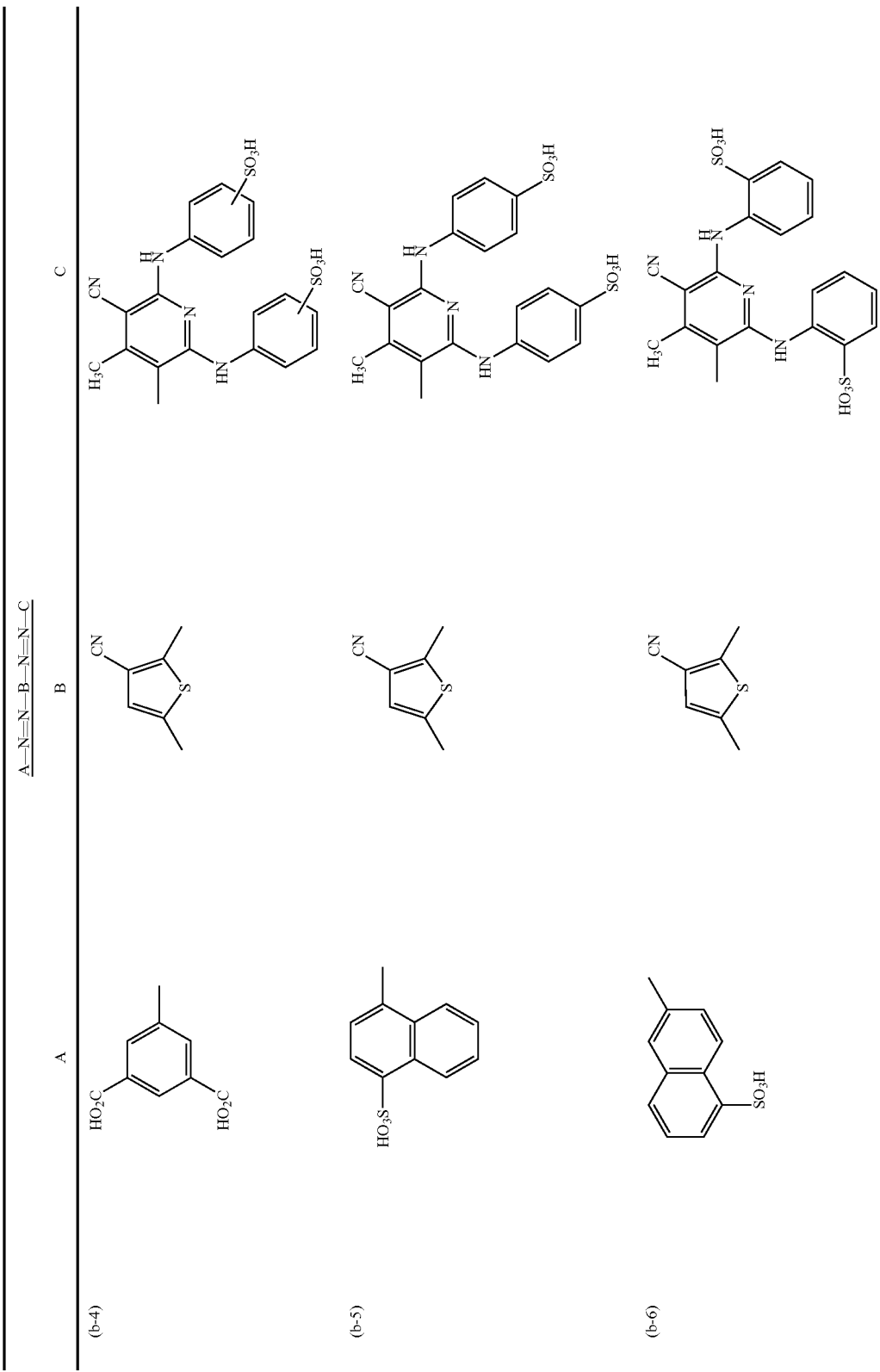

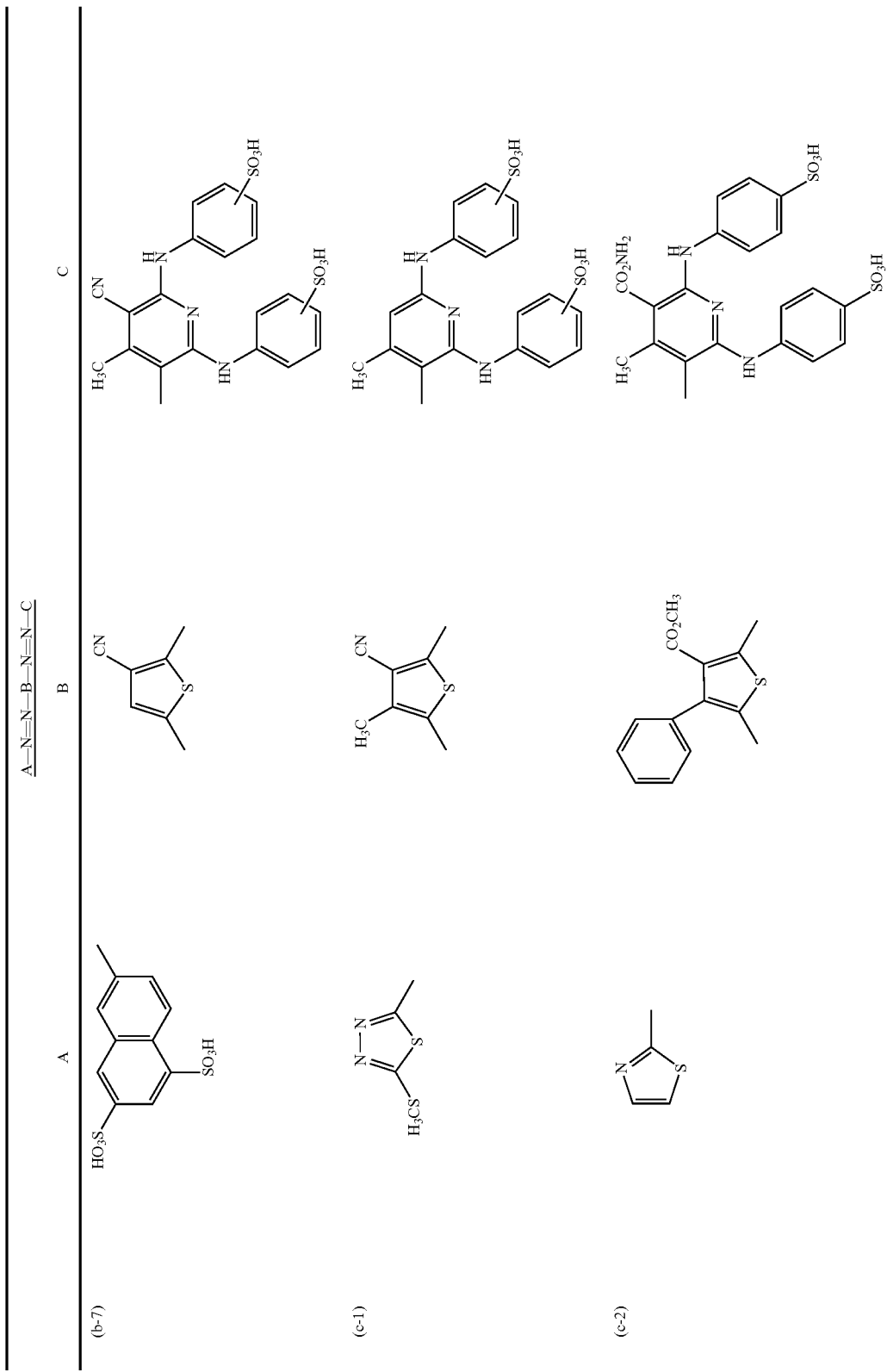

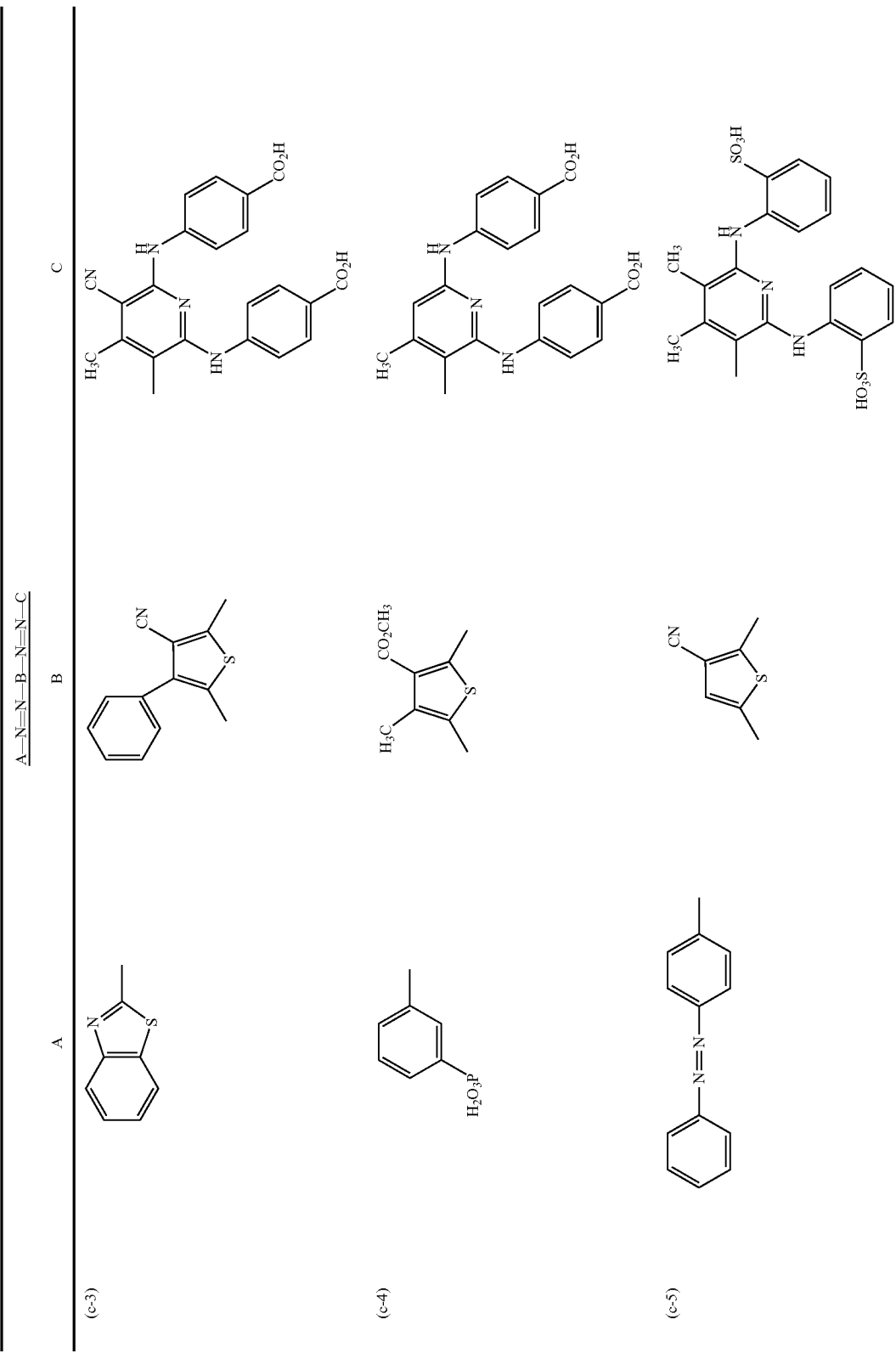

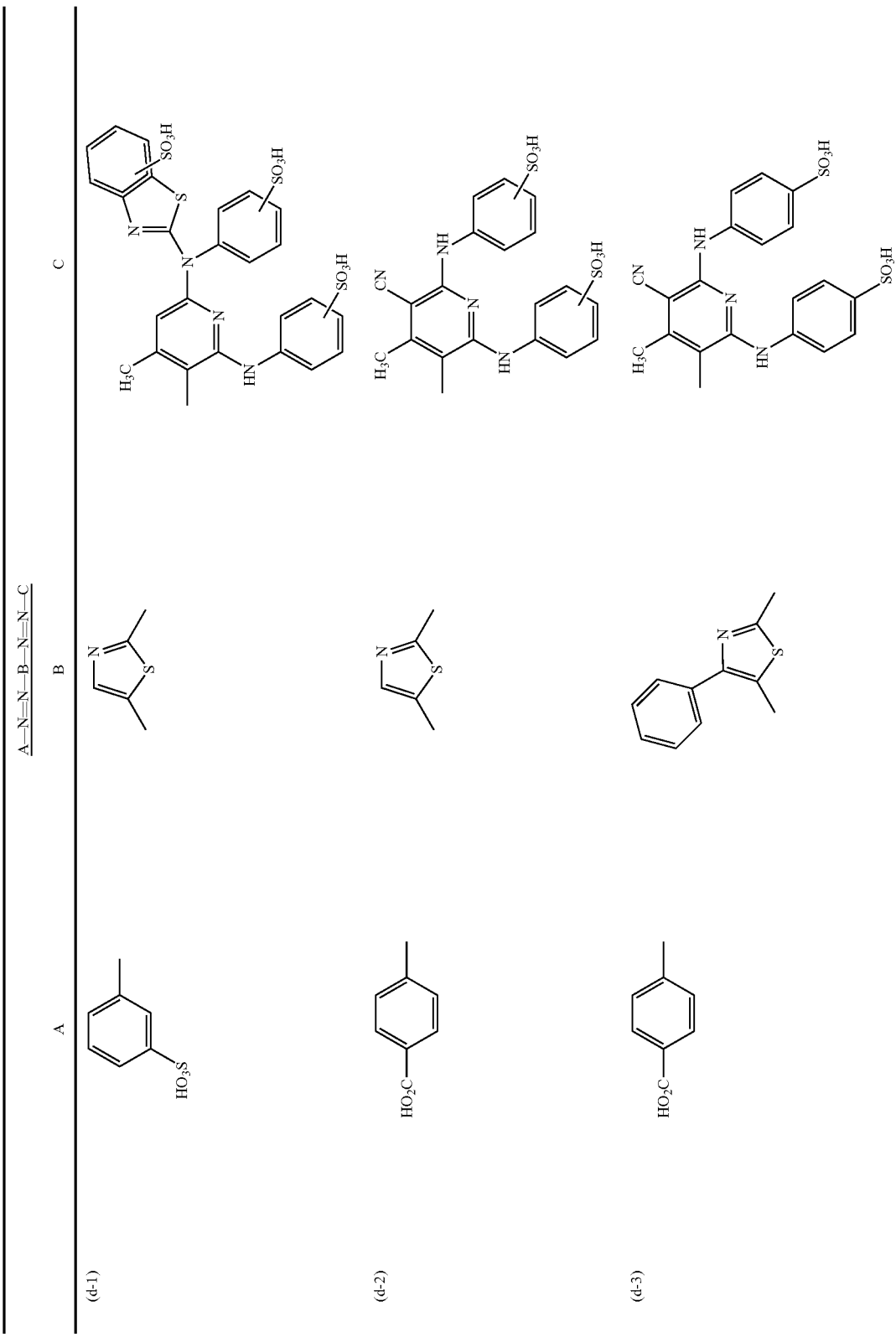

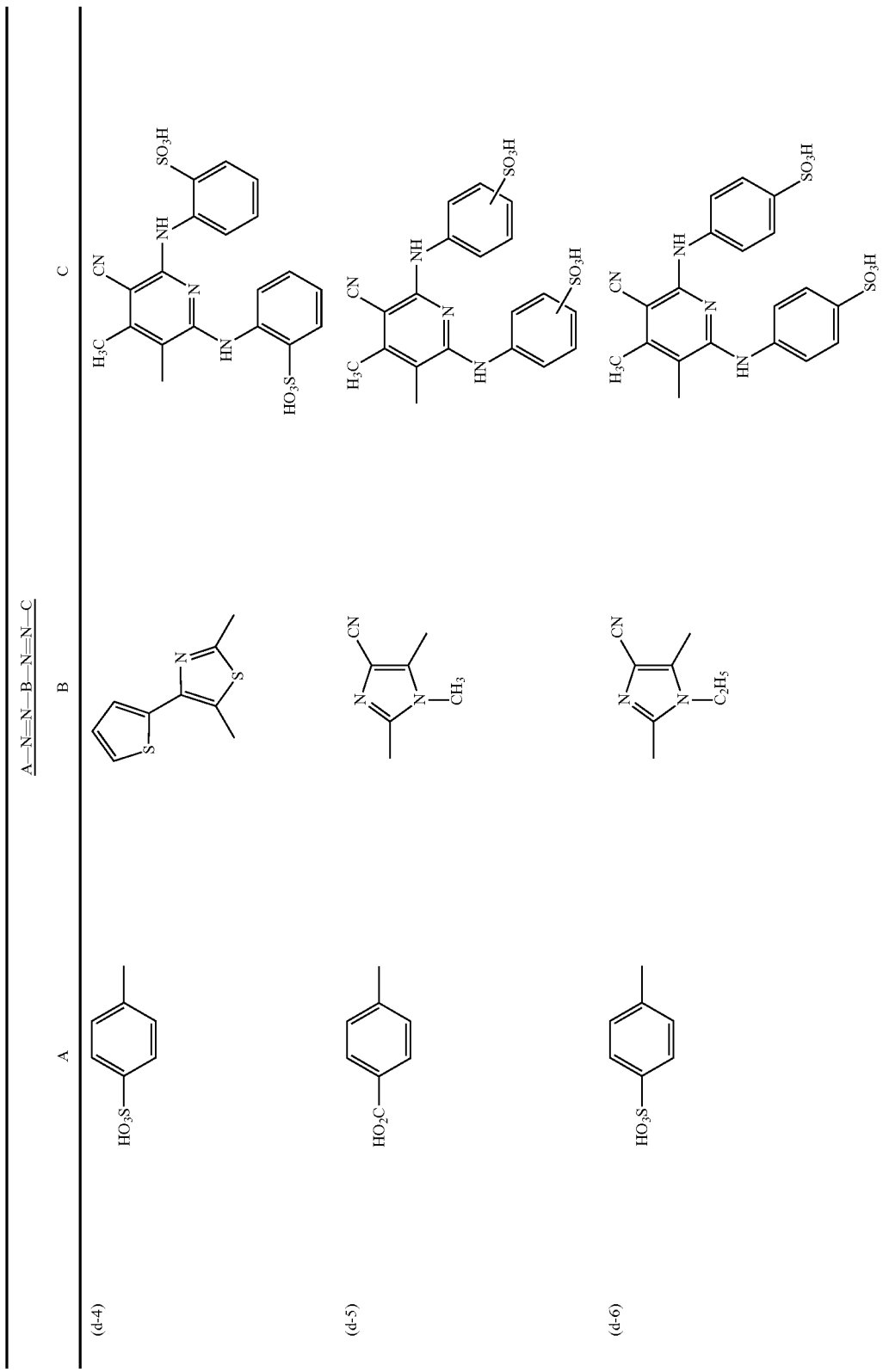

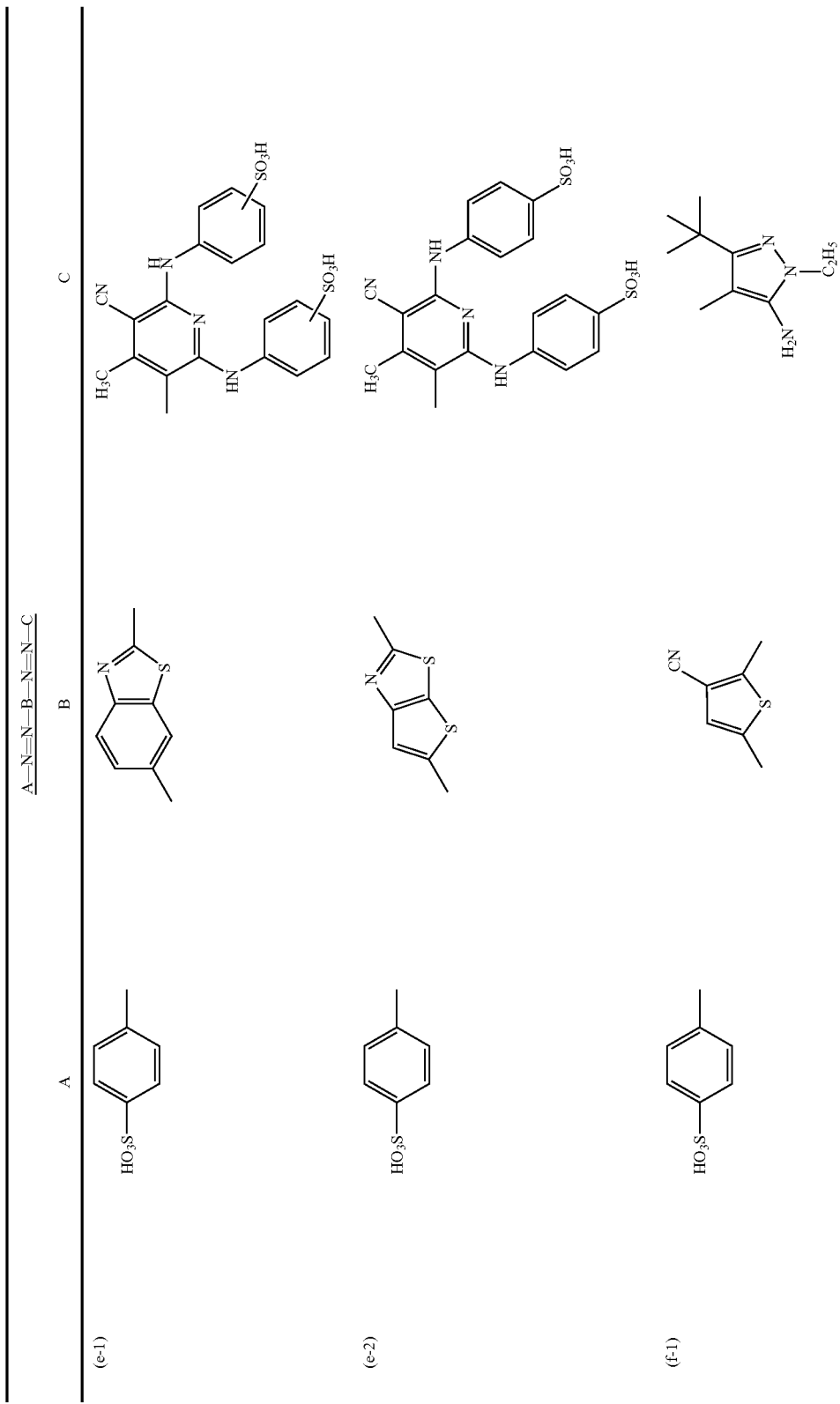

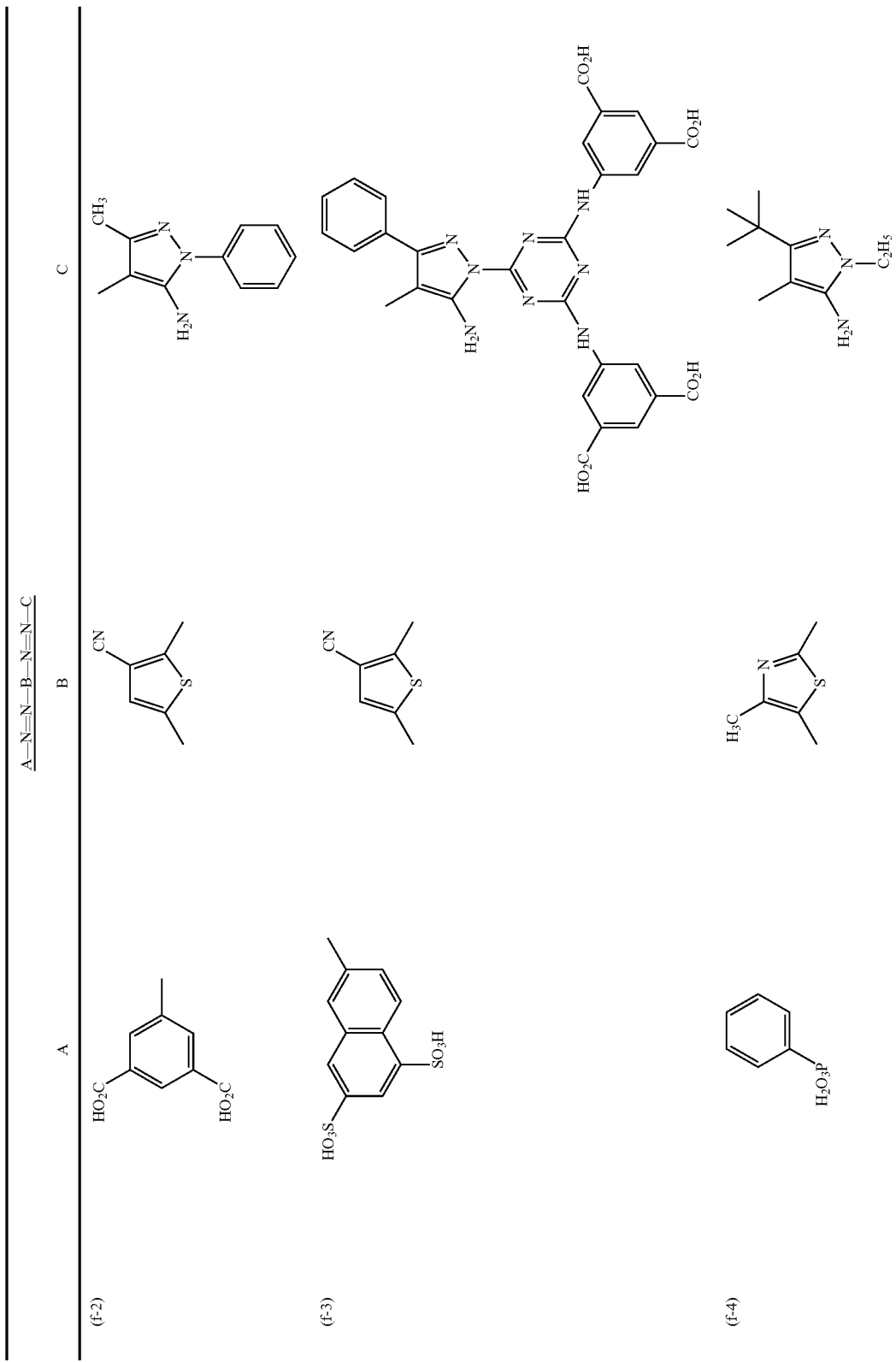

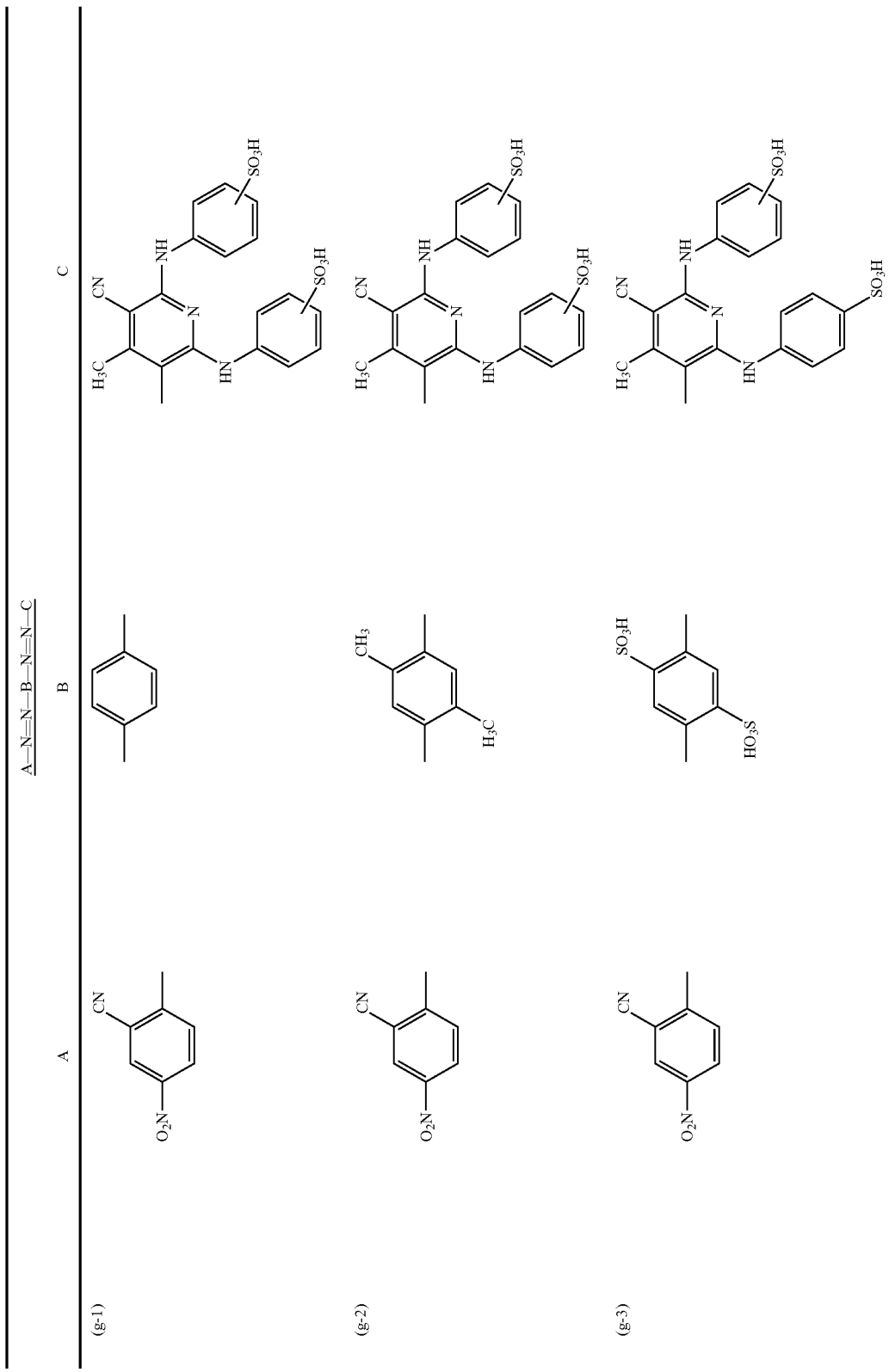

-continued
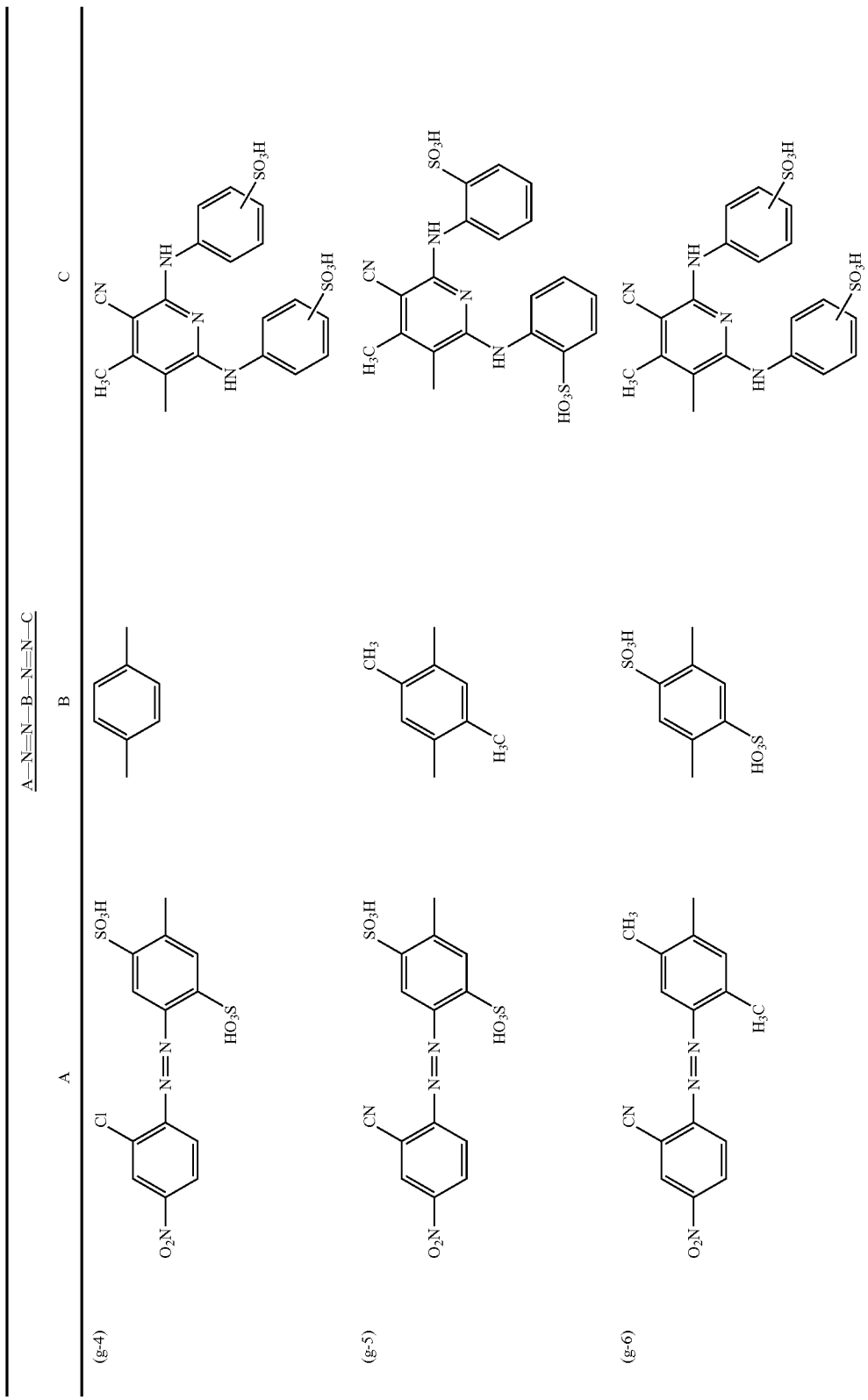

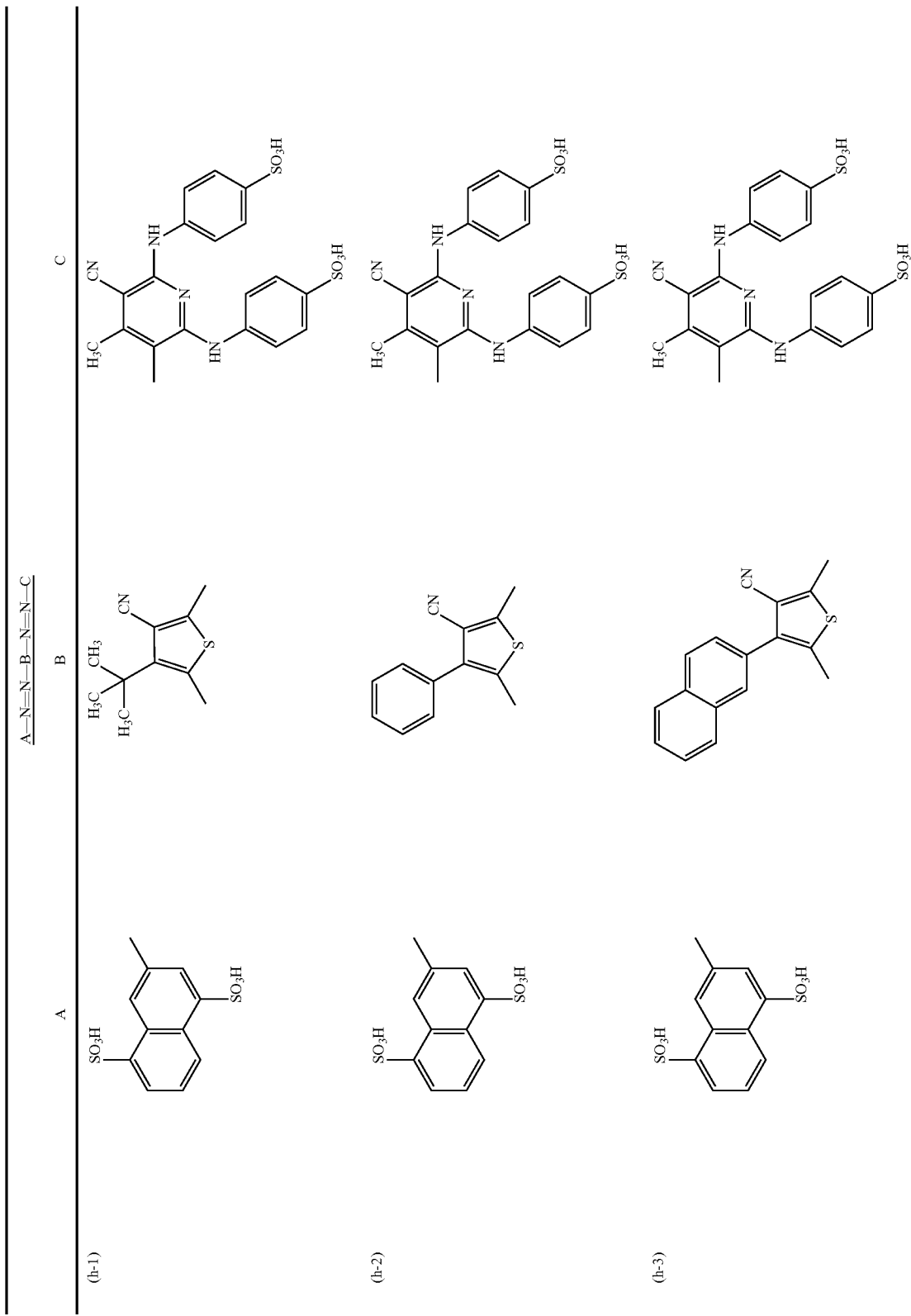

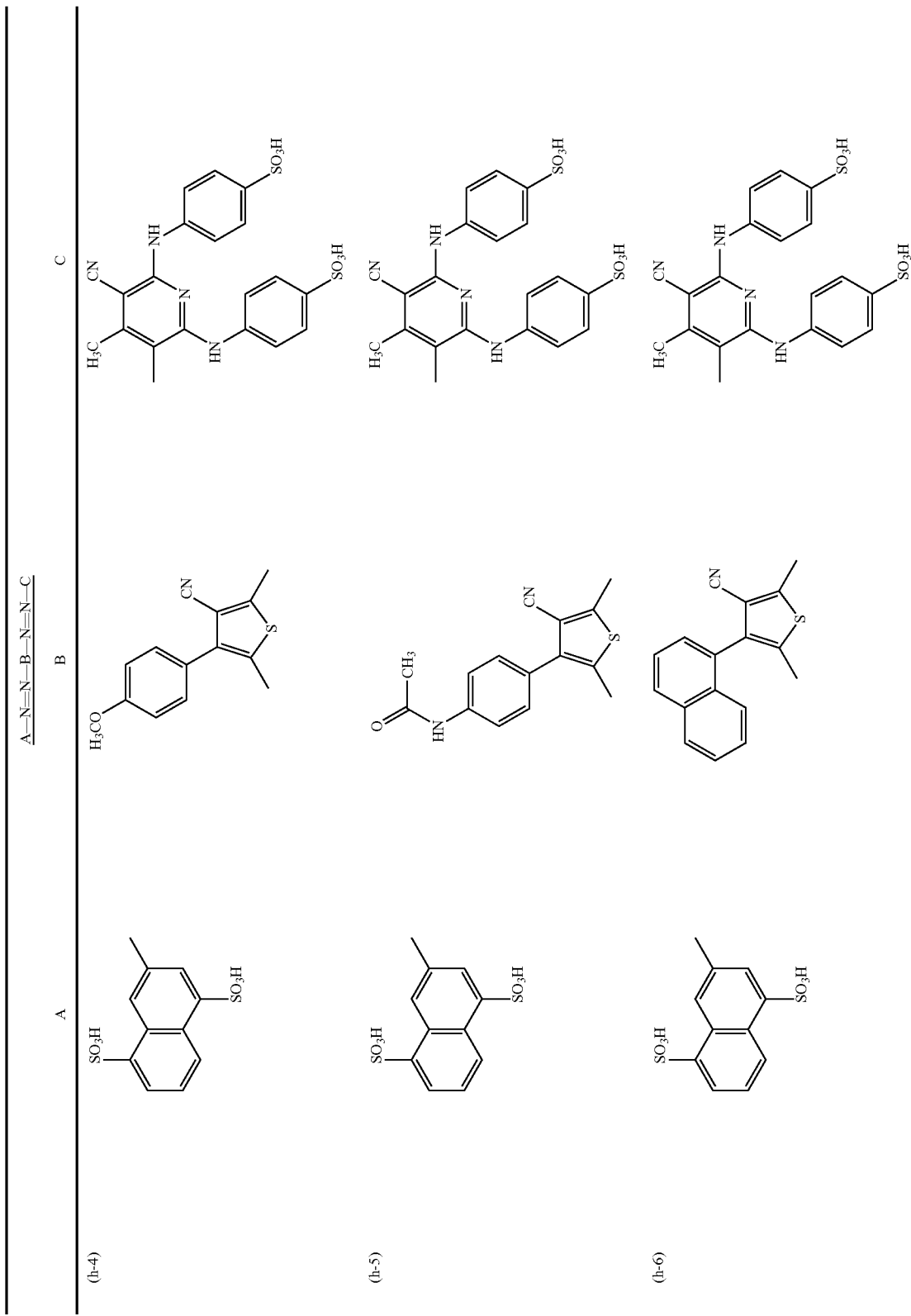

-continued
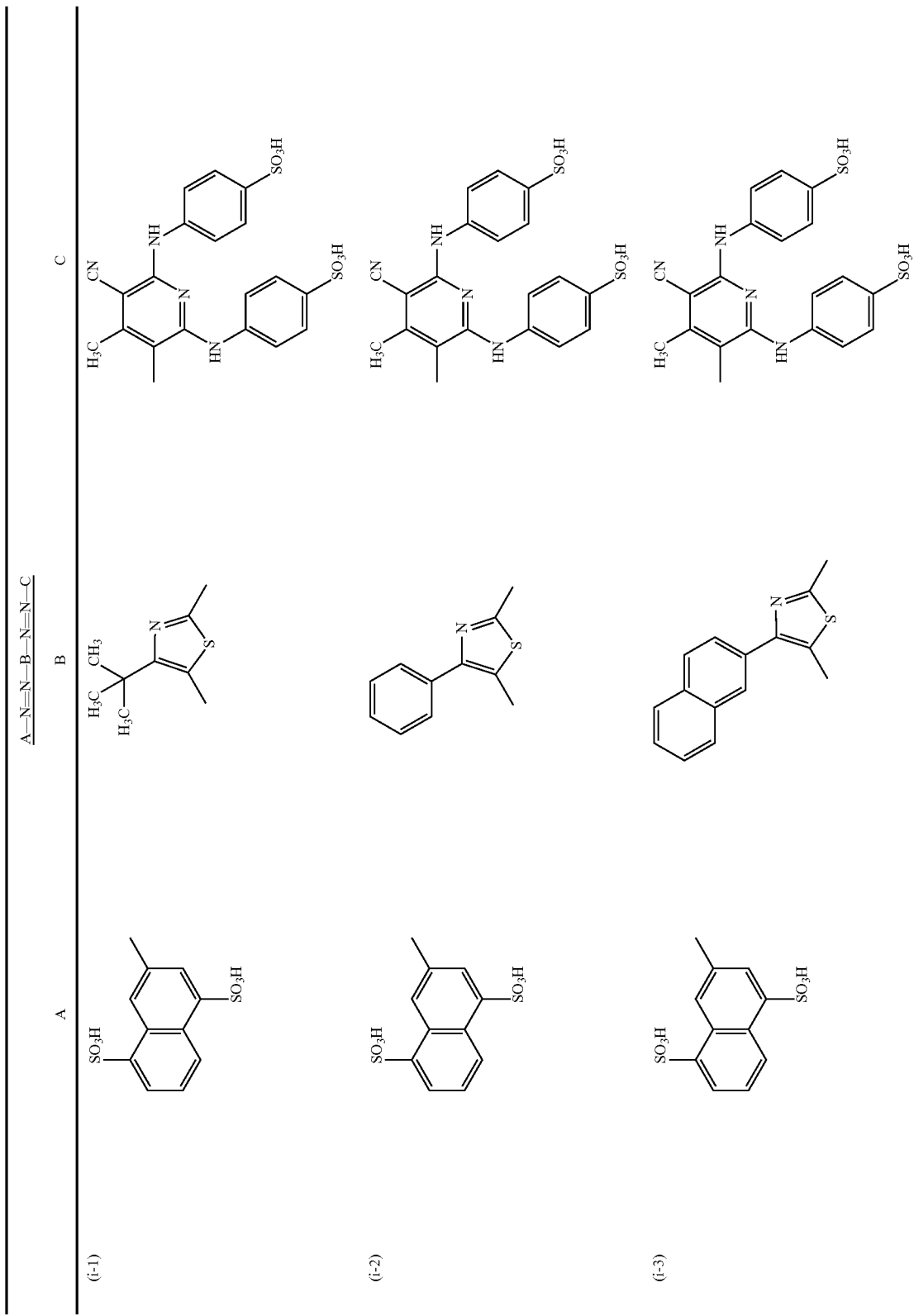

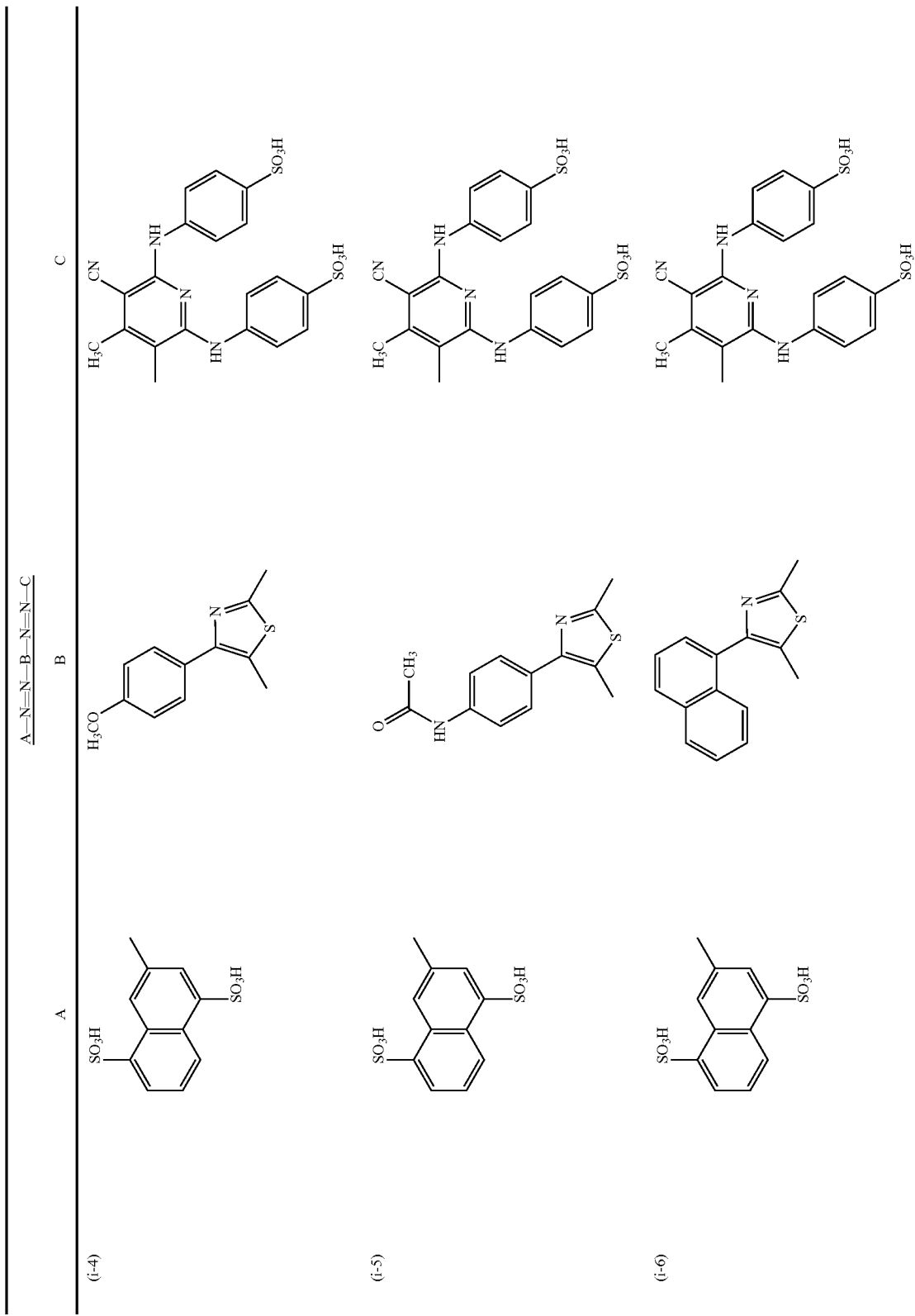

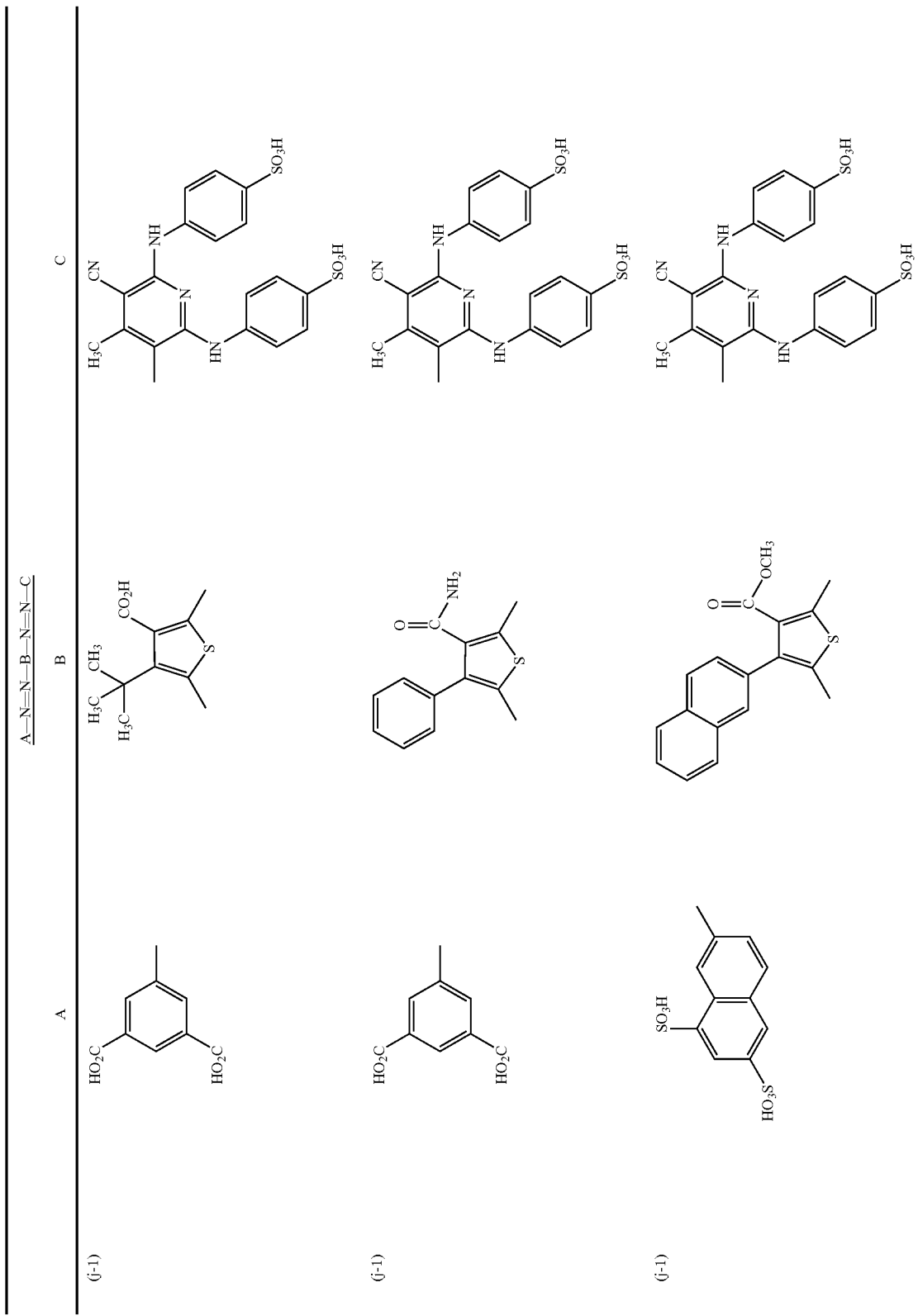

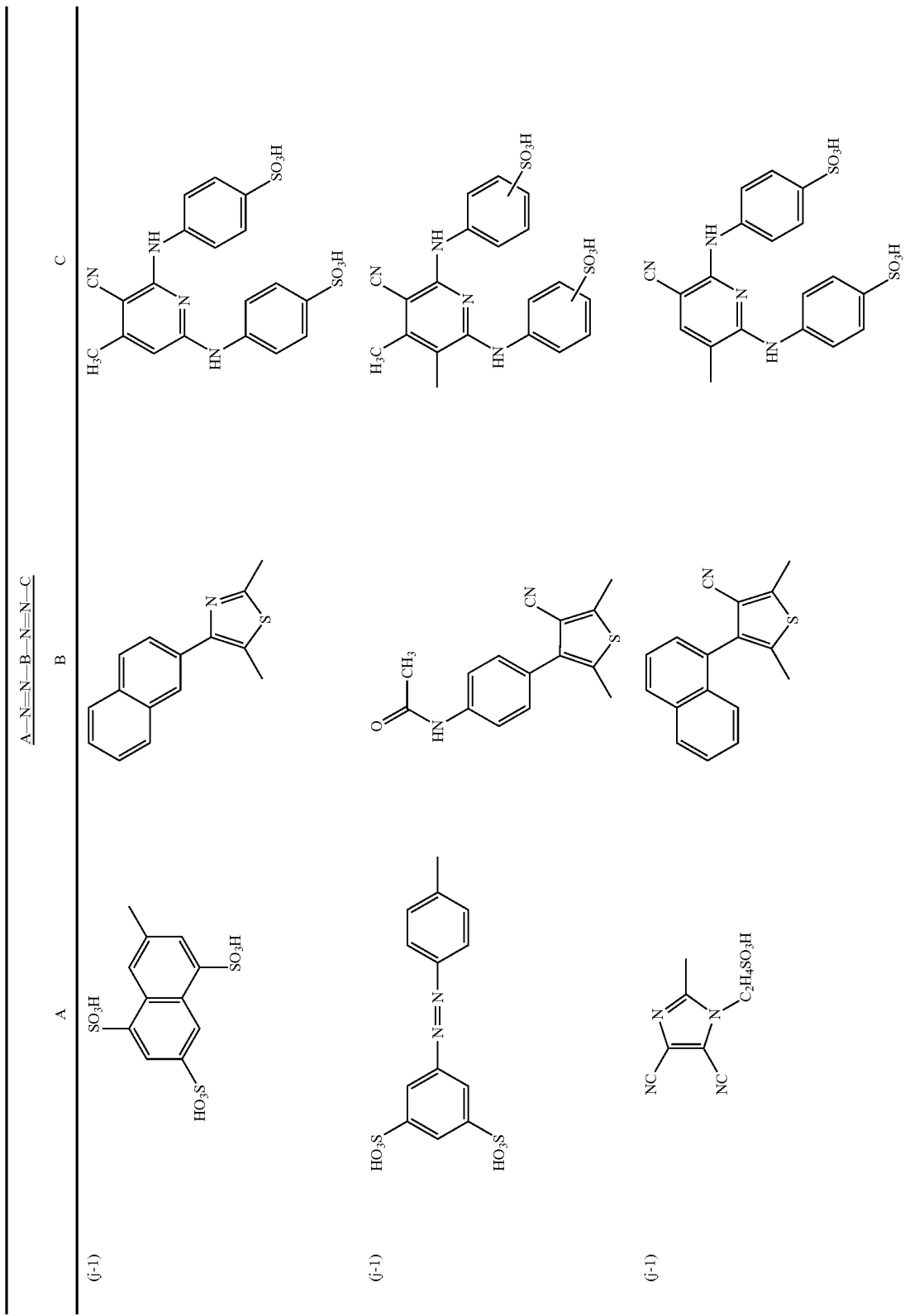

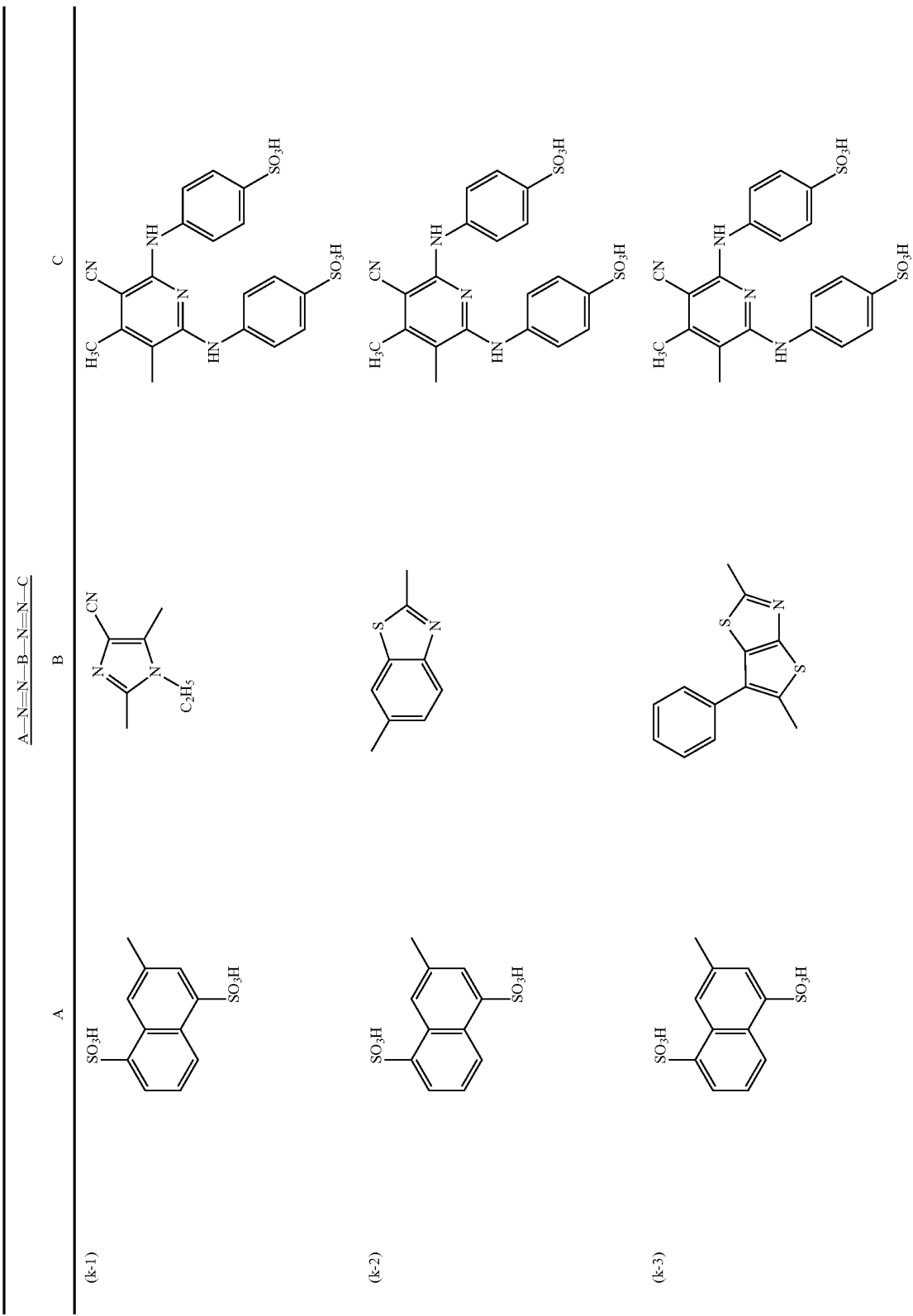

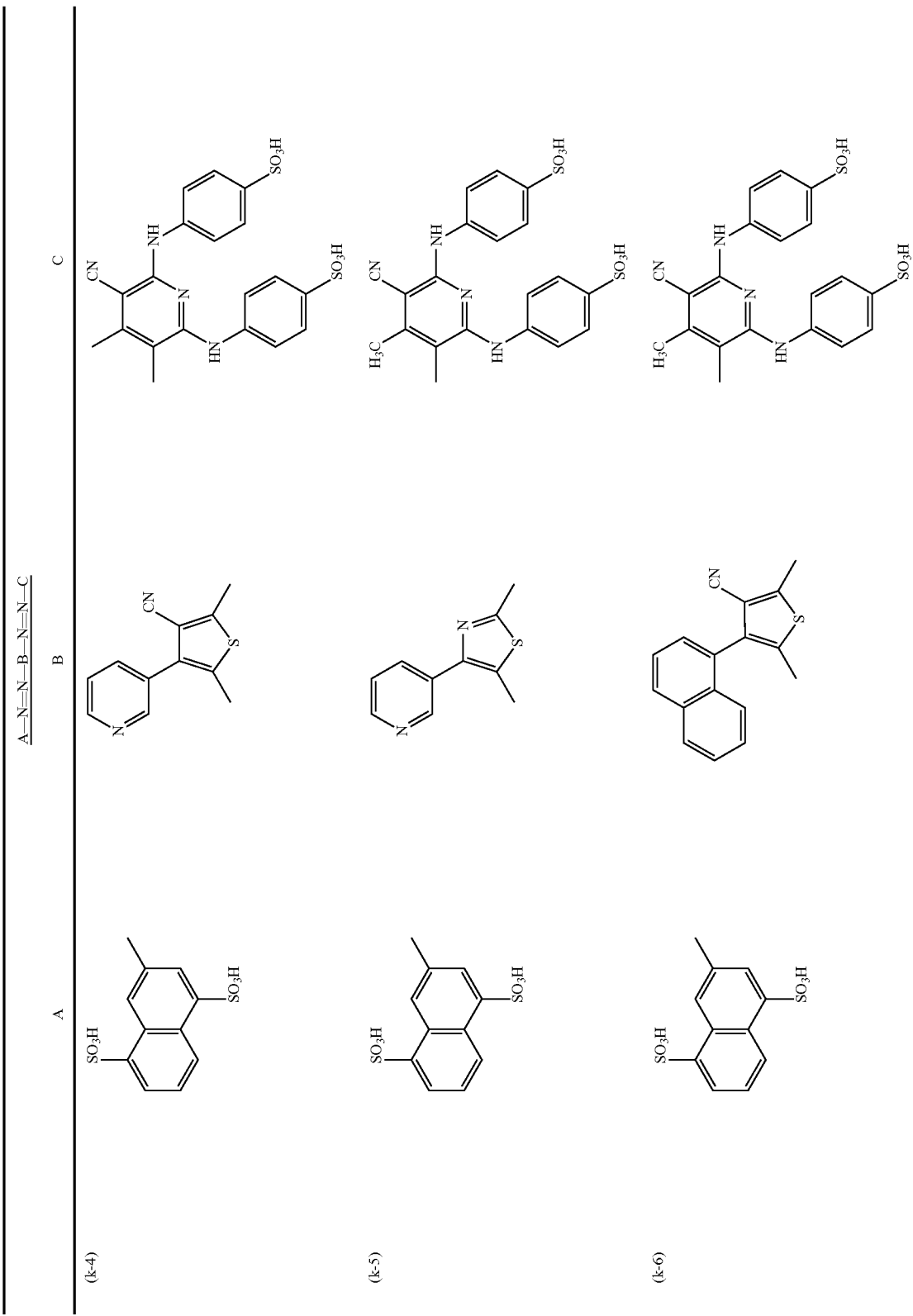

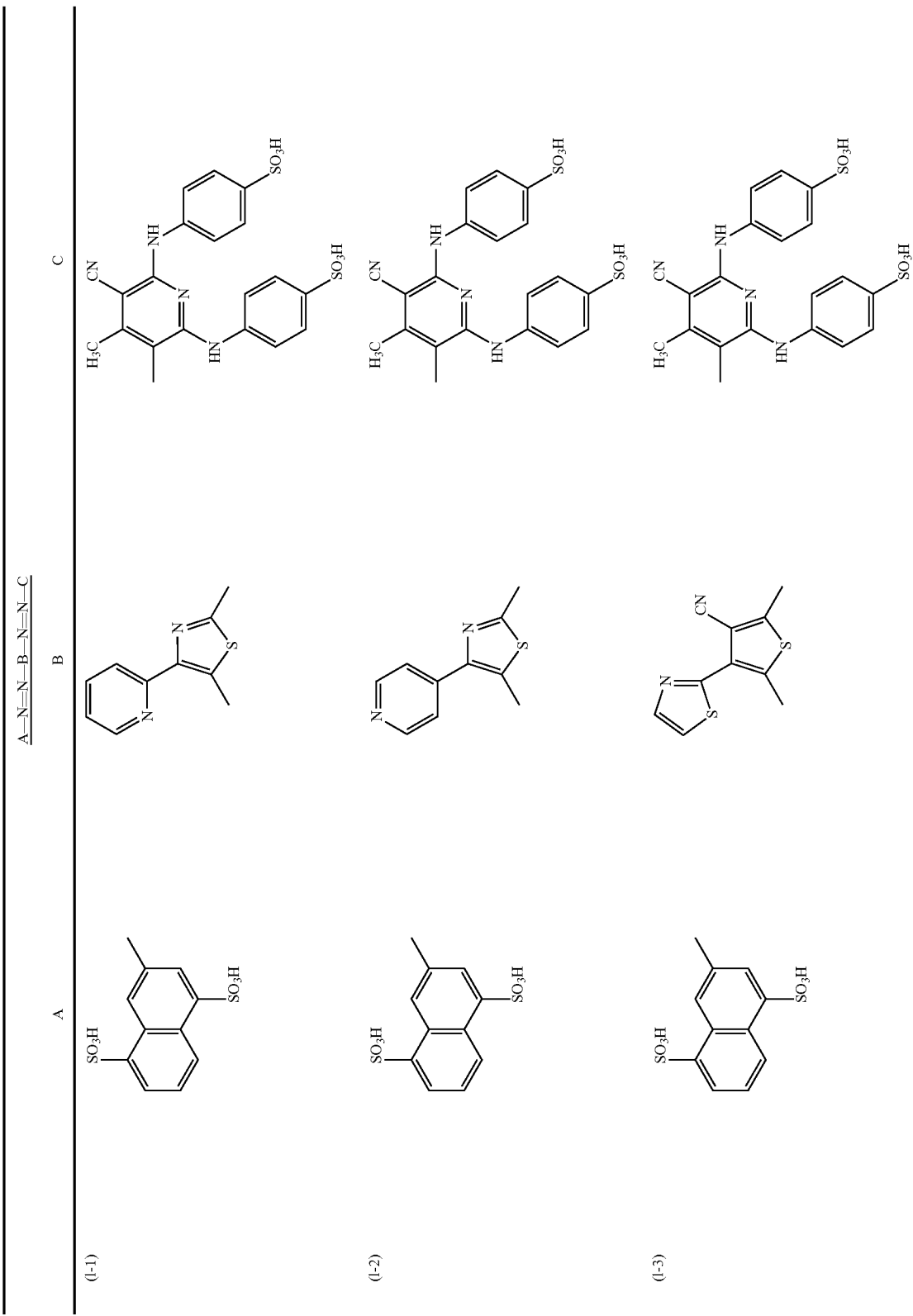

-continued
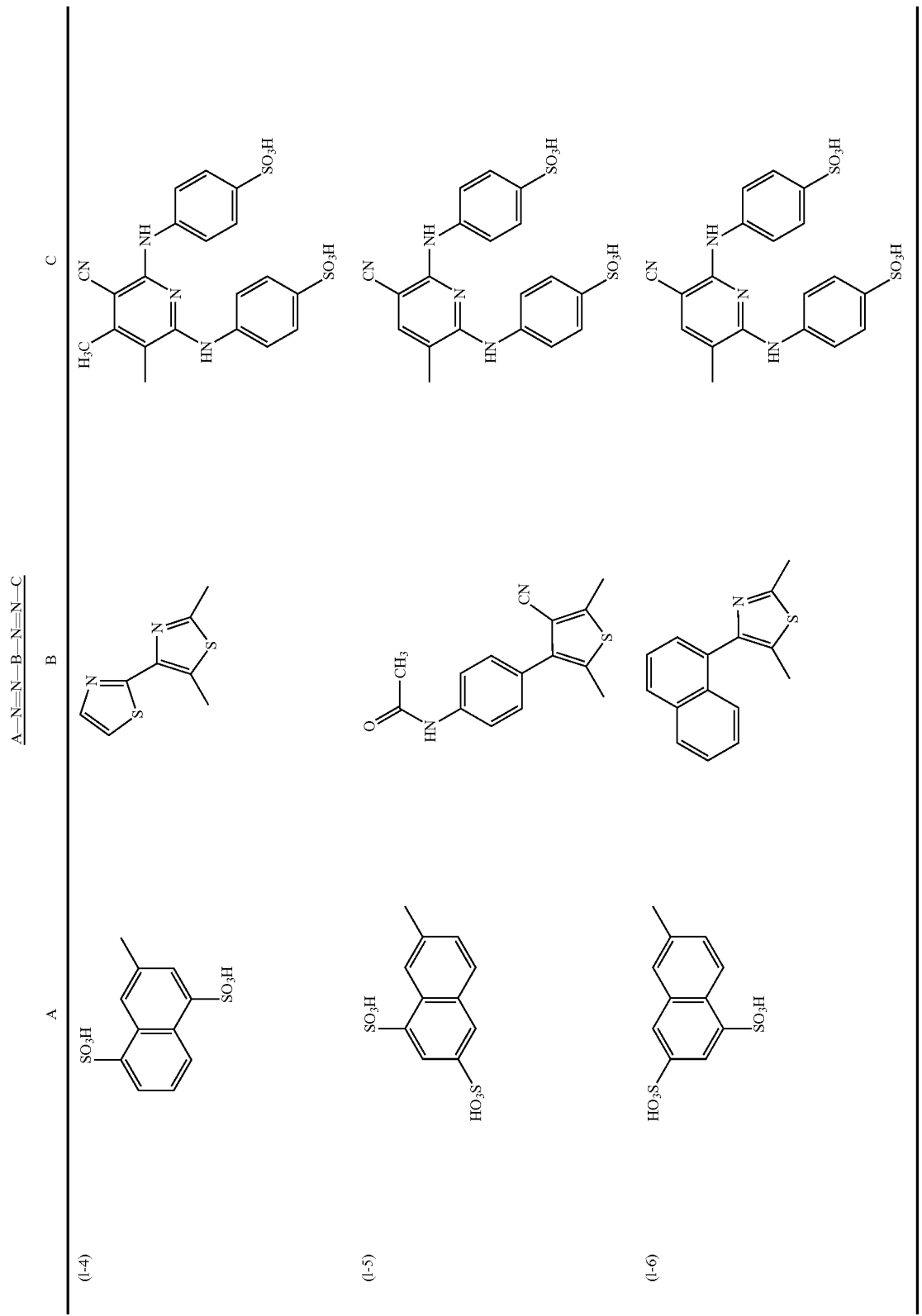

Besides, various dyes can be used as the black dye that can be used in the invention. Examples thereof include not only black dyes described in the Color Index, such as Direct Black and Food Black, but also dyes described in JP-A-2000-345063, JP-A-2001-288379, JP-A-2002-275380, JP-A-2002-332426, JP-A-2003-201412, and Japanese Patent No. 3,428,263.

As the yellow dye (shorter side dye (S) having a $\lambda$max of from 350 to 500 nm) that can be used together with the dye (L), usually used azo dyes, direct dyes represented by azo methine dyes, and acid dyes can be used. As pigments, aqueous dispersions of general pigments each of which a pigment number is given can be used jointly. Above all, it is preferred to use the dye represented by formula (1) as the foregoing short-wave dye (S). At this time, $A_1$ and $A_3$ each preferably represents an aromatic heterocyclic ring.

In all of these cases, dyes whose oxidation potential (Eox) is higher than 1.0 V (vs SCE) are preferable; and dyes whose Eox is 1.2 V (vs SCE) or more are especially preferable.

Also, it is possible to prepare a black ink by using other dye jointly.

The black ink to be used in the ink set of the invention contains the foregoing dye (L) and optionally the dye (S) (hereinafter sometimes referred to as "black dye of the invention") in an amount of from 0.2 to 25% by weight, preferably from 0.2 to 20% by weight, and more preferably from 0.5 to 15% by weight based on the whole of the ink. The dye (S) can be used in an amount of from 1 to 80% by weight based on the whole of the dyes.

For the sake of adjusting the color tone, other dyes may be used together with the foregoing black dye of the invention in the black ink of the invention. Also, for the sake of obtaining desired images of full color, etc., the invention can be formulated into an ink set comprising the black ink of the invention and inks using other dyes. Examples of the dye that can be used jointly include dyes described below. Also, it is preferable that the black ink of the invention contains the dye (S) having a $\lambda$max of from 350 nm to 500 nm as described previously. The following yellow dyes and yellow pigments are preferably used.

Examples of yellow dyes include aryl or heteryl azo dyes having, for example, a phenol, a naphthol, an aniline, a pyrazolone, a pyridone, or an open chain type active methylene compound as a coupling component; azo methylene dyes having, for example, an open chain type active methylene compound as a coupling component; methine dyes such as benzylidene dyes and monomethine oxonol dyes; and quinone based dyes such as naphthoquinone dyes and anthraquinone dyes. Examples of other dyes that can be used include quinophthalone dyes, nitro or nitroso dyes, acridine dyes, and acridinone dyes. These dyes may be ones capable of exhibiting yellow first upon dissociation of a part of the chromophore thereof. In that case, the counter cation may be an inorganic cation such as alkali metals and ammonium, or an organic cation such as pyridinium and quaternary ammonium salts. Further, the counter cation may be a polymer cation having the foregoing cation in a partial structure thereof.

Examples of magenta dyes include aryl or heteryl azo dyes having, for example, a phenol, a naphthol, or an aniline as a coupling component; azo methine dyes having, for example, a pyrazolone or a pyrazolotriazole as a coupling component; methine dyes such as arylidene dyes, styryl dyes, merocyanine dyes, and oxonol dyes; carbonium dyes such as diphenylmethane dyes, triphenylmethane dyes, and xanthene dyes; quinone based dyes such as naphthoquinone dyes, anthraquinone dyes, and anthrapyridone dyes; and fused polycyclic based dyes such as dioxadine dyes. These dyes may be ones capable of exhibiting magenta first upon dissociation of a part of the chromophore thereof. In that case, the counter cation may be an inorganic cation such as alkali metals and ammonium, or an organic cation such as pyridinium and quaternary ammonium salts. Further, the counter cation may be a polymer cation having the foregoing cation in a partial structure thereof.

Examples of cyan dyes include azo methine dyes such as indoaniline dyes and indophenol dyes; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having, for example, a phenol, a naphthol, or an aniline as a coupling component; and indigo or thioindigo dyes. These dyes may be ones capable of exhibiting cyan first upon dissociation of a part of the chromophore thereof. In that case, the counter cation may be an inorganic cation such as alkali metals and ammonium, or an organic cation such as pyridinium and quaternary ammonium salts. Further, the counter cation may be a polymer cation having the foregoing cation in a partial structure thereof.

Also, black dyes other than the black dyes of the invention, such as polyazo dyes, can be used.

Also, water-soluble dyes such as direct dyes, acid dyes, food dyes, basic dyes, and reactive dyes can be used jointly. Of these, the following dyes are preferable.

C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247

C.I. Direct Violet 7, 9, 47, 48, 51, 66, 90, 93, 94, 95, 98, 100, 101

C.I. Direct Yellow 8, 9, 11, 12, 27, 28, 29, 33, 35, 39, 41, 44, 50, 53, 58, 59, 68, 86, 87, 93, 95, 96, 98, 100, 106, 108, 109, 110, 130, 132, 142, 144, 161, 163

C.I. Direct Blue 1, 10, 15, 22, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291

C.I. Direct Black 9, 17, 19, 22, 32, 51, 56, 62, 69, 77, 80, 91, 94, 97, 108, 112, 113, 114, 117, 118, 121, 122, 125, 132, 146, 154, 166, 168, 173, 199

C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397

C.I. Acid Violet 5, 34, 43, 47, 48, 90, 103, 126

C.I. Acid Yellow 17, 19, 23, 25, 39, 40, 42, 44, 49, 50, 61, 64, 76, 79, 110, 127, 135, 143, 151, 159, 169, 174, 190, 195, 196, 197, 199, 218, 219, 222, 227

C.I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326

C.I. Acid Black 7, 24, 29, 48, 52:1, 172

C.I. Reactive Red 3, 13, 17, 19, 21, 22, 23, 24, 29, 35, 37, 40, 41, 43, 45, 49, 55

C.I. Reactive Violet 1, 3, 4, 5, 6, 7, 8, 9, 16, 17, 22, 23, 24, 26, 27, 33, 34

C.I. Reactive Yellow 2, 3, 13, 14, 15, 17, 18, 23, 24, 25, 26, 27, 29, 35, 37, 41, 42

C.I. Reactive Blue 2, 3, 5, 8, 10, 13, 14, 15, 17, 18, 19, 21, 25, 26, 27, 28, 29, 38

C.I. Reactive Black 4, 5, 8, 14, 21, 23, 26, 31, 32, 34

C.I. Basic Red 12, 13, 14, 15, 18, 22, 23, 24, 25, 27, 29, 35, 36, 38, 39, 45, 46

C.I. Basic Violet 1, 2, 3, 7, 10, 15, 16, 20, 21, 25, 27, 28, 35, 37, 39, 40, 48

C.I. Basic Yellow 1, 2, 4, 11, 13, 14, 15, 19, 21, 23, 24, 25, 28, 29, 32, 36, 39, 40

C.I. Basic Blue 1, 3, 5, 7, 9, 22, 26, 41, 45, 46, 47, 54, 57, 60, 62, 65, 66, 69, 71

C.I. Basic Black 8

Further, pigments can be used jointly.

As the pigments that can be used in the ink set of the invention, not only commercially available products but also known pigments described in various documents can be utilized. Examples of such documents include *Color Index* (compiled by The Society of Dyers and Colourists), *Kaitei Shinpan Ganryo Binran* (compiled by Nihon Ganryo Gijutsu Kyokai (1989)), *Saishin Ganryo Oyo Gijutsu* (published by CMC Publishing Co. (1986)), *Insatsu Inki Gijutsu* (published by CMC Publishing Co. (1984)), and W. Herbst and K. Hunger, *Industrial Organic Pigments* (published by VCH Verlagsgessellschaft (1993)). Specific examples of pigments include organic pigments such as azo pigments (for example, azo lake pigments, insoluble azo pigments, condensed azo pigments, and chelate azo pigments), polycyclic pigments (for example, phthalocyanine based pigments, anthraquinone based pigments, perillene or perinone based pigments, indigo based pigments, quinacridone based pigments, dioxazine based pigments, isoindolinone based pigments, quinophthalone based pigments, and diketo pyrrolopyrrole pigments), in-mold decorating lake pigments (lake pigments of acid or basic dyes), and azine pigments; and inorganic pigments such as C.I. Pigment Yellow 34, 37, 42, 53, etc. as yellow pigments, C.I. Pigment Red 101, 108, etc. as red pigments, C.I. Pigment Blue 27, 29, 17:1, etc. as blue pigments, C.I. Pigment Black 7 and magnetite as black pigments, and C.I. Pigment White 4, 6, 18, 21, etc. as white pigments.

As pigments having a color tone preferable for image formation, preferred examples of blue or cyan pigments include phthalocyanine pigments, anthraquinone based indanthrone pigments (for example, P.I. Pigment Blue 60) and in-mold decorating lake pigment based triarylcarbonium pigments. Of these, phthalocyanine pigments (preferred examples include copper phthalocyanines or monochloro- or low chlorinated copper phthalocyanines such as C.I. Pigment Blue 15:1, C.I. Pigment Blue 15.2, C.I. Pigment Blue 15:3, C.I. Pigment Blue 15:4, and C.I. Pigment Blue 15:6, aluminum phthalocyanines such as dyes described in European Patent No. 860,475, non-metal phthalocyanine as C.I. Pigment Blue 16, and phthalocyanines having Zn, Ni or Ti as a central metal); and of these, C.I. Pigment Blue 15:3, C.I. Pigment Blue 15:4, and aluminum phthalocyanines are most preferable.

Preferred examples of red or violet pigments include azo pigments (preferred examples include C.I. Pigment Red 3, C.I. Pigment Red 5, C.I. Pigment Red 11, C.I. Pigment Red 22, C.I. Pigment Red 38, C.I. Pigment Red 48:1, C.I. Pigment Red 48:2, C.I. Pigment Red 48:3, C.I. Pigment Red 48:4, C.I. Pigment Red 49:1, C.I. Pigment Red 52:1, C.I. Pigment Red 53:1, C.I. Pigment Red 57:1, C.I. Pigment Red 63:2, C.I. Pigment Red 144, and C.I. Pigment Red 184; and of these, C.I. Pigment Red 57:1, C.I. Pigment Red 146, and C.I. Pigment Red 184 are most preferable), quinacridone based pigments (preferred examples include C.I. Pigment Red 122, C.I. Pigment Red 192, C.I. Pigment Red 202, C.I. Pigment Red 207, C.I. Pigment Red 209, C.I. Pigment Violet 19, and C.I. Pigment Violet 42; and of these, C.I. Pigment Red 122 is most preferable), in-mold decorating pigment based triarylcarbonium pigments (preferred examples include xanthene based pigments such as C.I. Pigment Red 81:1, C.I. Pigment Violet 1, Pigment Violet 2, Pigment Violet 3, Pigment Violet 27, and Pigment Violet 39), dioxazine based pigments (for example, Pigment Violet 23 and C.I. Pigment Violet 37), diketo pyrrolopyrrole pigments (for example, C.I. Pigment Red 254), perillene pigments (for example, C.I. Pigment Violet 29), anthraquinone based pigments (for example, C.I. Pigment Violet 5:1, C.I. Pigment Violet 31, and C.I. Pigment Violet 33), and thioindigo based pigments (for example, C.I. Pigment Red 38 and C.I. Pigment 88).

Preferred examples of yellow pigments include azo pigments (preferred examples include monoazo based pigments (for example, C.I. Pigment Yellow 1, C.I. Pigment Yellow 3, C.I. Pigment Yellow 74, and C.I. Pigment Yellow 98), disazo based pigments (for example, C.I. Pigment Yellow 12. C.I. Pigment Yellow 13, C.I. Pigment Yellow 14, C.I. Pigment Yellow 16, C.I. Pigment Yellow 17, and C.I. Pigment Yellow 83), overall azo based pigments (for example C.I. Pigment Yellow 93, C.I. Pigment Yellow 94, C.I. Pigment Yellow 95, C.I. Pigment Yellow 128, and C.I. Pigment Yellow. 155), and benzimidazolone based pigments (for example, C.I. Pigment Yellow 120, C.I. Pigment Yellow 151, C.I. Pigment Yellow 154, C.I. Pigment Yellow 156, and C.I. Pigment Yellow 180); and of these, dyes which do not use a benzidine compound as the staring material are most preferable), isoindoline or isoindolinone based pigments (preferred examples include C.I. Pigment Yellow 109, C.I. Pigment Yellow 110, C.I. Pigment Yellow 137, and C.I. Pigment Yellow 139), quinophthalone pigments (preferred examples include C.I. Pigment Yellow 138), and flavanthrone pigments (for example, C.I. Pigment Yellow 24).

Preferred examples of black pigments include inorganic pigments (preferred examples include carbon black and magnetite) and aniline black.

Besides, orange pigments (for example, C.I. Pigment Orange 13 and C.I. Pigment Orange 16) and green pigments (for example, C.I. Pigment Green 7) may be used.

The pigment that can be used in the ink set of the invention may be the foregoing naked pigment or a surface-treated pigment. As the method of surface treatment, a method of coating the surface with a resin or a wax, a method of making a surfactant adhere to the surface, a method of binding a reactive substance (for example, silane coupling agents and radicals generated from epoxy compounds, polyisocyanates and diazonium salts) may be considered, and these methods are described in the following documents or patents.

(1) *Kinzoku Sekken No Seishitsu To Oyo* (published by Saiwai Shobo)
(2) *Insatsu Inki Insatsu* (published by CMC Publishing Co, (1984))
(3) *Saishin Ganryo Oro Gijutsu* (published by CMC Publishing Co. (1986))
(4) U.S. Pat. Nos. 5,554,739 and 5,571,311
(5) JP-A-9-151342, JP-A-10-140065, JP-A-10-292143, and JP-A-11-166145

Above all, self-dispersible pigments prepared by exerting the diazonium salt described in the U.S. patents set forth above in (4) to carbon black, and capsulated pigments prepared by the methods described in the Japanese patents set forth above in (5) are especially effective because dispersion stability is obtained without using a superfluous dispersant in the ink.

In the ink set of the invention, the pigment may be further dispersed using a dispersant. As the dispersant, various known dispersants such as surfactant type low-molecular dispersants and high-molecular dispersants can be used depending upon the kind of pigment to be used. Examples of the dispersant include those described in JP-A-3-69949 and European Patent No. 549,486. Also, in using the dispersant, in order to accelerate adsorption of the dispersant onto the pigment, pigment derivatives called a synergist may be added.

The particle size of the pigment which can be used in the ink set of the invention is preferably in the range of from 0.01 to 10 μm, and more preferably from 0.05 to 1 μm after dispersion.

As a method of dispersing the pigment, known dispersion techniques used at the time of the ink production and toner production can be used. Examples of a dispersion machine include a vertical or horizontal agitator mill, an attritor, a colloid mill, a ball mill, a 3-roll mill, a pearl mill, a supper mill, an impeller, a disperser, a KD mill, a dynatron, a pressure kneader. Details are described in *Saishin Ganryo Oyo Gijutsu* (published by CMC Publishing Co. (1986)).

The ink to be used in the invention can be prepared by dissolving and/or dispersing the black dye and preferably the surfactant in an aqueous medium. The "aqueous medium" as referred to in the invention means water or water to which a component such as a solvent (for example, water-soluble organic solvents), a wetting agent, a stabilizer, and an antiseptic as the need arises.

In preparing the ink to be used in the invention, in the case where the foregoing dye is water-soluble, it is preferred to first dissolve it in water. Thereafter, various solvents and additives are added, and the mixture is dissolved and mixed to form a uniform ink liquid.

As this time, as the dissolution method, there are employable various methods such as dissolution by stirring, dissolution upon irradiation with ultrasonic wave, and dissolution by shaking. Above all, a stirring method is especially preferably employed. In the case of carrying out stirring, various systems that are known in the art, such as fluidized stirring and stirring utilizing a shear force such as a reverse agitator and a dissolver, are employable. On the other hand, stirring utilizing a shear force against a container bottom, such as a magnetic stirrer, can be preferably employed.

By containing a surfactant in the inkjet ink of the invention to adjust liquid physical properties of the ink, it is possible to enhance discharge stability of the ink and provide excellent effects in enhancing waterproof properties of images and preventing bleeding of printed inks, etc.

Examples of the surfactant include anionic surfactants such as sodium dodecyl sulfate, sodium dodecyl hydroxysulfonate, and sodium alkylbenzenesulfonates; cationic surfactants such as cetyl pyridinium chloride, tirmethylcetylammonium chloride, and tetrabutylammonium chloride; and nonionic surfactants such as polyoxyethylene nonylphenyl ether, polyoxyethylene naphthyl ether, and polyoxyethylene octyl phenyl ether. Of these, nonionic surfactants are especially preferably used.

The content of the surfactant is from 0.001 to 20% by weight, preferably from 0.005 to 10% by weight, and more preferably from 0.01 to 5% by weight against the ink.

The inkjet black ink of the invention can be prepared by dissolving and/or dispersing the foregoing dye and preferably the surfactant in an aqueous medium. The "aqueous medium" as referred to in the invention means water or water to which a component such as a solvent (for example, water-soluble organic solvents), a wetting agent, a stabilizer, and an antiseptic as the need arises.

Incidentally, in the following description, the foregoing amide based compounds or substituted alkylamines having strong basicity and ammonia will be enumerated as illustrative compounds. However, it is preferred to suppress the use amount of such a compound or avoid its use in view of stability of the ink.

In preparing the ink liquid of the invention, in the case of an aqueous ink, it is preferred to first dissolve it in water. Thereafter, various solvents and additives are added, and the mixture is dissolved and mixed to form a uniform ink liquid.

As this time, as the dissolution method, there are employable various methods such as dissolution by stirring, dissolution upon irradiation with ultrasonic wave, and dissolution by shaking. Above all, a stirring method is especially preferably employed. In the case of carrying out stirring, various systems that are known in the art, such as fluidized stirring and stirring utilizing a shear force such as a reverse agitator and a dissolver, are employable. On the other hand, stirring utilizing a shear force against a container bottom, such as a magnetic stirrer, can be preferably employed.

Examples of the foregoing water-soluble organic solvent that can be used in the invention include alcohols (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amines (for example, ethanolamine, diethanolamine, triethanolamine, N-methyldietanolamine, N-ethyldiethanolamine, triethanolamine, N-methyldiethanolamine, N-ethyldiethanolamine, morpholine, N-ethylmorphorine, ethylenediamine, diethylenetriamine, triethylenetetramine, polyethyleneimine, and tetramethylpropylenediamine), and other polar solvents (for example, formamide, N,N-dimethylformamide, N,N-dimethylacetamide, dimethyl sulfoxide, sulforane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Incidentally, the foregoing water-soluble organic solvent may be used in combinations with two or more thereof.

It is preferred to use a water-soluble organic solvent having a boiling point of 150° C. or higher as an ink solvent. Also, as described previously, it is preferred to avoid use of an amide based solvent having strong basicity or to suppress its addition amount to not more than 5% by weight based on the weight of the ink.

In the case where the foregoing dye is an oil-soluble dye, the ink liquid can be prepared by dissolving the oil-soluble dye in a high-boiling organic solvent and emulsifying and dispersing the solution in an aqueous medium.

The boiling point of the high-boiling organic solvent that is used in the invention is 150° C. or higher, and preferably 170° C. or higher.

Examples of such a high-boiling organic solvent include phthalic esters (for example, dibutyl phthalate, dioctyl phthalate, dicyclohexyl phthalate, di-2-ethylhexyl phthalate, decyl phthalate, bis(2,4-di-tert-amylphenyl) isophthalate, and bis (1,1-diethylpropyl) phthalate), phosphoric or phosphonic esters (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate, and di-2-ethylhexylphenyl phosphate), benzoic esters (for example, 2-ethylhexyl benzoate, 2,4-dichlorobenzoate, dodecyl benzoate, and 2-ethylhexyl-p-hydroxybenzoate), amides (for example, N,N-diethyldodecanamide and N,N-diethyllaurylamide), alcohols or phenols (for example, isostearyl alcohol and 2,4-di-tert-amylphenol), fatty acid esters (for example, dibutoxyethyl succinate, di-2-ethylhexyl succinate, 2-hexyldecyl tetradecanate, tributyl citrate, diethyl azelate, isostearyl lactate, and trioctyl citrate), aniline derivatives (for example, N,N-dibutyl-2-butoxy-5-tert-octylaniline), chlorinated paraffins (for example, paraffins having a chlorine content of from 10% to 80%), trimesic esters (for example, tributyl trimesate), dodecylbenzene, diisopropylnaphthalene, phenols (for example, 2,4-ditert-amylphenol, 4-dodecyloxyphenol, 4-dodecyloxycarbonylphenol, and 4-(4-dodecyloxyphenyl-sulfonyl)phenol), carboxylic acids (for example, 2-(2,4-di-tert-amylphenoxybutyric acid and 2-ethoxyoctanedecanoic acid), and alkyl phosphoric acids (for example, di-2 (ethylhexyl)phosphoric acid and diphenylphosphoric acid) The high-boiling organic solvent can be used in a weight ratio of from 0.01 to 3 times, and preferably from 0.01 to 1.0 time against the oil-soluble dye.

These high-boiling organic solvents may be used singly or in admixture of several kinds thereof [for example, a mixture of tricresyl phosphate and dibutyl phthalate, a mixture of trioctyl phosphate and di (2-ethylhexyl) sebacate, and a mixture of dibutyl phthalate and poly(N-t-butylacrylamide)].

Compounds of the high-boiling organic solvent to be used in the invention other than those described above and/or synthesis methods of these high-boiling organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, European Patent Nos. 276,319A, 286,253A, 289, 820A, 309,158A, 309,159A, 309,160A, 509,311A and 510, 576A, East German Patent Nos. 147,009, 157,147, 159,573 and 225,240A, British Patent No. 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, J-P-A-56-8183-6-, JP=A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946, and JP-A-5-346338.

The foregoing high-boiling organic solvent can be used in a weight ratio of from 0.01 to 3 times, and preferably from 0.01 to 1.0 time against the oil-soluble dye.

In the invention, the oil-soluble dye and high-boiling organic solvent are emulsified and dispersed in an aqueous medium and then provided for use. In the emulsification and dispersion, a low-boiling organic solvent can be used in view of emulsification properties as the case may be. The low-boiling organic solvent is an organic solvent having a boiling point of about 30° C. or higher and not higher than 150° C. at atmospheric pressure. For example, esters (for example, ethyl acetate, butyl acetate, ethyl propionate, β-ethoxyethyl acetate, and methyl cellosolve acetate), alcohols (for example, isopropyl alcohol, n-butyl alcohol, and sec-butyl alcohol), ketones (for example, methyl isobutyl ketone, methyl ethyl ketone, and cyclohexanone), amides (for example, dimethylformamide and N-methylpyrrolidone), ethers (for example, tetrahydrofuran and dioxane), and so on are preferably used. However, it should not be construed that the invention is limited thereto.

The emulsification and dispersion is carried out for the purpose of dispersing an oil phase in which the dye is dissolved in the high-boiling organic solvent, or a mixed solvent of the high-boiling organic solvent and the low-boiling organic solvent as the case may be, in an aqueous phase composed mainly of water to prepare fine oil droplets of the oil phase. In this case, additives as described later, such as a surfactant, a wetting agent, a dye stabilizer, an emulsion stabilizer, an antiseptic, and an anti-mold agent can be added to either one or both of the aqueous phase and the oil phase as the need arises.

As the emulsification method, a method of adding the oil phase in the aqueous phase is general. However, a so-called phase inversion emulsification method of dropping the aqueous phase in the oil phase can also be preferably employed. Incidentally, in the case where the dye to be used in the invention is water-soluble and the additive is oil-soluble, the foregoing emulsification method is applicable, too.

In carrying out the emulsification and dispersion, various surfactants can be used. Preferred examples thereof include anionic surfactants such as fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid formalin condensates, and polyoxyethylene alkylsulfuric acid ester salts; and nonionic surfactants such as polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Also, SURFYNOLS (manufactured by Air Product & Chemicals) as an acetylene based polyoxyethylene oxide surfactant are preferably used. Also, amine oxide type ampholytic surfactants such as N,N-dimethyl-N-alkylamine oxides are preferable. Further, compounds described as a surfactant in JP-A-59-157636, pages (37) to (38) and Research Disclosure No. 308119 (1989) can be used.

Also, for the purpose of designing stabilization immediately after the emulsification, a water-soluble polymer can be added together with the foregoing surfactant. -As the water-soluble polymer, polyvinyl alcohol, polyvinyl-pyrrolidone, polyethylene oxide, polyacrylic acid, polyacrylaimide, and copolymers thereof are preferably used. Also, it is preferred to use natural water-soluble polymers such as polysaccharides, casein, and gelatin. Further, for the purpose of stabilizing the dye dispersion, polyvinyls, polyurethanes, polyesters, polyamides, polyureas, polycarbonates, and so on, which are not substantially dissolved in the aqueous medium and which are obtained from acrylic esters, methacrylic esters, vinyl esters, acrylamides, methacrylamides, olefins, styrenes, vinyl ethers, or acrylonitriles, can be used jointly. It is preferable that these polymers contain —$SO_3$— or —COO—. In the case where such a polymer which is not substantially dissolved in the aqueous medium is used jointly, it is preferably used in an amount of not more than 20% by weight, and more preferably not more than 10% by weight of the high-boiling organic solvent.

In the case of preparing an aqueous ink by dispersing the oil-soluble dye and the high-boiling organic solvent by emulsification and dispersion, it is particularly important to control its particle size. In forming images by inkjet, it is essential to make the average particle size small for the purpose of increasing the color purity or density. The average particle size is preferably not more than 1 μm, and more preferably from 5 to 100 nm in terms of volume average particle size.

The volume average particle size and particle size distribution of the foregoing dispersed particles can be easily measured by a method described in *Jikken Kagaku Koza*, Fourth Edition, pages 417 to 418 as well as a static light scatter method, a dynamic light scatter method, and a centrifugal sedimentation method. For example, the volume average particle size can be easily measured by diluting the dispersion with distilled water such that the particle concentration in the ink becomes from 0.1 to 1% by weight and performing measurement using a commercially available volume average particle size analyzer (for example, Microtrac UPA (manufactured by NIKKISO Co., Ltd.)). Further, the dynamic light scatter method utilizing a laser Doppler effect is especially preferable because the particle size measurement can be made to a small size.

The volume average particle size is an average particle size weighted by the volume of particles, which is obtained by dividing the sum of values resulting from multiplication of a diameter of individual particle with a volume of that particle by the whole volume of particles.

The volume average particle size is described at page 119 of *Kobunshi Ratekkusu No Kagaku* (written by Soichi Muroi and published by Kobunshi Kankokai).

Also, it has become clear that the presence of coarse particles plays a role very largely against the printing performance. That is, it has been noted that the coarse particles clog a nozzle head, or they do not cause clogging but form stains to cause non-discharge or twisted discharge of the ink, thereby seriously affecting the printing performance. In order to prevent this matter from occurring, it is important to suppress the number of particles of 5 μm or more to not more than ten and the number of particles of 1 μm or more to not more than one thousand, respectively in 1 μL at the time of forming an ink.

As a method of removing these coarse particles, known centrifugation and ultrafiltration methods and so on can be employed. Such a separation measure may be carried out immediately after emulsification and dispersion, or may be carried out after adding various additives such as a wetting agent and a surfactant to the emulsified dispersion and just before filling in an ink cartridge.

As a measure effective for making the average particle size small and making coarse particles free, a mechanical emulsification device can be used.

As the emulsification device, known devices such as a simple stirrer or impeller stirring system, an in-line stirring system, a mill system such as a colloid mill, and an ultrasonic system can be employed. However, use of a high-pressure homogenizer is especially preferable.

The high-pressure homogenizer is described in detail in U.S. Pat. No. 4,533,254, JP-A-6-47264, and so on. Examples of commercially available devices include a gaulin homogenizer (manufactured by A.P.V. GAULIN INC.), a microfluidizer (manufactured by MICROFLUIDEX INC.), and an ultimaizer (manufactured by SUGINO MACHINE LIMITED).

Also, a high-pressure homogenizer provided with a mechanism of fine granulation within an ultra-high pressure jet, as recently described in U.S. Pat. No. 5,720,551, is especially effective in the emulsification and dispersion of the invention. Examples of an emulsification device using such an ultra-high pressure jet include DeBEE 2000 (manufactured by BEE INTERNATIONAL LTD.).

In emulsification by a high-pressure emulsification and dispersion device, the pressure is 50 MPa or more, preferably 60 MPa or more, and more preferably 180 MPa or more.

For example, a combined use of two or more emulsification devices by performing emulsification by a stirring emulsification machine and then passing through a high-pressure homogenizer is an especially preferred method. Also, a method in which after one performing emulsification and dispersion by these emulsification devices, additives such as a wetting agent and a surfactant are added, and the mixture is then passed again through the high-pressure homogenizer during a period of time of filling the ink in a cartridge is a preferred method.

In the case where a low-boiling organic solvent is contained in addition to a high-boiling organic solvent, it is preferred to remove the low-boiling organic solvent from the viewpoints of stability of the emulsion and safe and hygiene. As a method of removing the low-boiling organic solvent, various known methods can be employed depending upon the kind of the solvent. That is, examples thereof include an evaporation method, a vacuum evaporation method, and an ultrafiltration method. It is preferable that this removal step of the low-boiling organic solvent is carried out as quickly as possible immediately after emulsification.

Incidentally, a preparation method of inkjet inks is described in detail in JP-A-5-148436, JP-A-5-295312, JP-A-7-97541, JP-A-7-82515, and JP-A-7-118584. Such a method can be utilized in the preparation of the inkjet recording ink of the invention.

In the production of the inkjet ink of the invention, ultrasonic oscillation can be applied in the dissolution step of additives such as a dye, etc.

The ultrasonic oscillation as referred to herein is a process in which for the purpose of preventing the ink from generation of bubbles caused due to a pressure to be applied by a recording head, ultrasonic energy equivalent to or more than energy which the recording head receives is applied in advance during the production step, thereby removing the bubbles.

The ultrasonic oscillation is generally of an ultrasonic wave with a frequency of 20 kHz or more, preferably 40 kHz or more, and more preferably 50 kHz or more. Also, energy to be applied by the ultrasonic oscillation is generally $2 \times 10^7$ J/m$^3$ or more, preferably $5 \times 10^7$ J/m$^3$ or more, and more preferably $1 \times 10^8$ J/m$^3$ or more. Also, a time of imparting the ultrasonic oscillation is generally from about 10 minutes to one hour.

The step of applying ultrasonic oscillation may be achieved at any time after throwing the dye into the medium, whereby the effect is revealed.

Even by applying ultrasonic oscillation after once storing the ink after completion, the effect is revealed. However, the addition of ultrasonic oscillation in dissolving and/or dispersing the dye in the medium is preferable because the effect of removing bubbles is large, and the dissolution and/or dispersion of the dye in the medium by ultrasonic oscillation is accelerated.

That is, the foregoing at least step of applying ultrasonic oscillation can be carried out at any case during or after the dissolution and/or dispersion of the dye in the medium. In other words, the foregoing at least step of applying ultrasonic oscillation can be arbitrarily carried out once or more during a period until completion of a product after preparation of the ink.

In an embodiment to be carried out, it is preferable that the step of dissolving and/or dispersing the dye in the medium includes a step of dissolving the foregoing dye in a part of the whole medium and a step of mixing the residual medium; it is preferable that ultrasonic oscillation is applied to at least one of the foregoing steps; and it is more preferable that ultrasonic oscillation is at least applied to the step of dissolving the dye in a part of the whole medium.

The step of mixing the residual medium may be a single step or multiple steps.

Also, it is preferred to use jointly heat deaeration or vacuum aeration in the production of ink according to the invention because the effect of bubbles in the ink is enhanced. It is preferable that the heat deaeration step or vacuum deaeration step is carried out at the same time of or after the step of mixing the residual medium.

As a measure for generating ultrasonic oscillation in the step of applying ultrasonic oscillation, known devices such as ultrasonic dispersion machines are enumerated.

In preparing the inkjet ink of the invention, a step of eliminating contaminants as solids by filtration, which is further carried out after preparation of the ink, is important. In this work, a filtration filter is used. At this time, a filter having an effective diameter of not more than 1 µm, preferably 0.05 µm or more and not more than 0.3 µm, and especially preferably 0.25 µm or more and not more than 0.3 µm is used as the filtration filter. With respect to the material quality of the film, various materials can be used. In particular, in the case of an ink of an aqueous dye, it is preferred to use a film prepared for aqueous media. Above all, it is preferred to use a filter made of a polymer material which particularly hardly generates contaminants. With respect to the filtration method, the ink may be passed through a filter by liquid feed, and any of pressure filtration and vacuum filtration can be utilized.

After this filtration, air is often taken into the solution. Bubbles caused by this air may likely cause disorder of images in inkjet recording, and therefore, it is preferred to separately provide the foregoing deaeration step. As a method of deaeration, the solution after filtration may be allowed to stand. Also, various methods using a commercially available device, such as ultrasonic deaeration and vacuum deaeration, can be utilized. In the case of ultrasonic deaeration, a deaeration operation is preferably carried out for from about 30 seconds to 2 hours, and more preferably from about 5 minutes to one hour.

For the sake of preventing incorporation of contaminants in these operations, it is preferable that the operations are carried out in a clean room or by utilizing a space such as a clean bench. In the invention, it is especially preferred to carry out the operations in a space with a class of not more than 1,000 in terms of a degree of clean. The "degree of clean" as referred to herein-means a value measured by a dust counter.

In the inkjet black ink of the invention, additives such as a drying inhibitor for preventing clogging by drying of an ink in an injection port, a penetration accelerator for more penetrating the ink into paper, an ultraviolet absorber, an antioxidant, a viscosity modifier, a surface tension modifier, a dispersant, a dispersion stabilizer, an anti-mold agent, a rust preventive, a pH adjustor, a defoaming agent, and a chelating agent can be properly chosen and used in suitable amounts.

As the drying inhibitor to be used in the invention, water-soluble organic solvents having a vapor pressure lower than water are preferable. Specific examples thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylol-propane; lower alkyl ethers of polyhydric alcohols such as ethylene glycol monomethyl (or monoethyl) ether, diethylene glycol monomethyl (or monoethyl) ether, and triethylene glycol monoethyl (or monobutyl) ether; heterocyclic compounds such as -2-pyrrolidone, N-methyl-2-pyrrolidone, 1,3-dimethyl-2-imidazolidione, and N-ethylmorpholine; sulfur-containing compounds such as sulforane, dimethyl sulfoxide, and 3-sulforene; polyfunctional compounds such as diacetone alcohol and diethanolamine; and urea derivatives. Of these, polyhydric alcohols such as glycerin and diethylene glycol are more preferable. Also, the foregoing drying inhibitors may be used singly or in combinations of two or more thereof. It is preferable that such a drying inhibitor is contained in an amount of from 10 to 50% by weight in the ink.

Examples of the penetration accelerator which can be used in the invention include alcohols (for example, ethanol, isopropanol, butanol, di(or tri)ethylene glycol monobutyl ether, and 1,2-hexanediol), sodium laurylsulfate, sodium oleate, and nonionic surfactants. When the penetration accelerator is contained in an amount of from 10 to 30% by weight in the ink, sufficient effects are revealed, and it is preferable that the penetration accelerator is used in an amount in the range where bleeding of prints or print-through does not occur.

Examples of the ultraviolet absorber which can be used for enhancing fastness of images in the invention include benzotriazole based compounds described in JP-A-58-185677, JP-A-61-190537, JP-A-2-782, JP-A-5-197075, JP-A-9-34057, etc.; benzophenone based compounds described in JP-A-46-2784, JP-A-5-194483, U.S. Patent No. 3,214,463, etc.; cinnamic acid based compounds described in JP-B-48-30492, JP-B-56-21141, JP-A-10-88106, etc.; triazine based compounds described in JP-A-4-298503, JP-A-8-53427, JP-A-8-239368, JP-A-10-182621, JP-T-8-501291, etc.; compounds described in Research Disclosure No. 24239; and so-called fluorescent brighteners as a compound capable of absorbing ultraviolet rays to emit fluorescent light, represented by stilbene based compounds and benzoxazole based compounds.

In the invention, as the antioxidant which is used for enhancing fastness of images, various organic or metal complex based fade inhibitors can be used. Examples of organic fade inhibitors include hydroquinones, alkoxyphenols, dialkoxyphenols, phenols, anilines, amines, indanes, chromans, alkoxyanilines, and heterocyclic compounds; and examples of metal complex based fade inhibitors include nickel complexes and zinc complexes. More specifically, compounds described in patents cited in Research Disclosure No. 17643, Items VII-1 to J, Research Disclosure No. 15162, Research Disclosure No. 18716, page 650, left column, Research Disclosure No. 36544, page 527, Research Disclosure No. 307105, page 872, and Research Disclosure No. 15162; and formulae of representative compounds and compounds included in compound examples described at pages 127 to 137 of JP-A-62-215272 can be used.

Examples of the anti-mold agent which is used in the invention include sodium dehydroacetate, sodium benzoate, sodium pyridinethione-1-oxide, ethyl p-hydroxybenzoate, 1,2-benzisothiazolin-3-one, and salts thereof. It is preferable that such an anti-molt agent is used in an amount of from 0.02 to 5.00% by weight in the ink.

Incidentally, the details are described in *Bokin Bokun Jiten* (compiled by The Society for Antibacterial and Antifungal Agents, Japan, Dictionary Editorial Board), etc.

Also, examples of the rust preventive include acidic sulfites, sodium thiosulfate, antimony thioglycolate, di-isopropylammonium nitrite, pentaerythritol tetranitrate, dicyclohexylammonium nitrite, and benzotriazole. It is preferable that the rust preventive is used in an amount of from 0.02 to 5.00% by weight in the ink.

The pH adjustor to be used in the invention is suitably used in view of pH adjustment, dispersion stability, etc. The pH of the ink at 25° C. is preferably adjusted at from 6 to 9, more preferably from 6.5 to 8.0, and most preferably from 7.5 to 8.0. In the case where the pH of the ink is less than 6, solubility of the dye is lowered so that the nozzle is liable to be clogged; and in the case where it exceeds 9, stability of the ink tends to be lowered. As the pH adjustor, organic bases and inorganic alkalis are enumerated as a basic pH adjustor, and organic acids and inorganic acids are enumerated as an acidic pH adjustor.

Examples of basic compounds which can be used include inorganic compounds such as sodium hydroxide, potassium hydroxide, sodium carbonate, potassium carbonate, sodium hydrogencarbonate, potassium hydrogencarbonate, sodium acetate, potassium acetate, sodium phosphate, and sodium monohydrogenphosphate; ammonia water; and organic bases such as methylamine, ethylamine, diethylamine, triethylamine, ethanolamine, diethanolamine, triethanolamine, ethylene-diamine, piperidine, diazabicyclooctane, diazabicycloundecene, pyridine, quinoline, picoline, lutidine, and collidine.

Examples of acidic compounds which can be used include inorganic compounds such as hydrochloric acid, sulfuric acid, phosphoric acid, boric acid, sodium hydrogensulfate, potassium hydrogensulfate, potassium dihydrogenphosphate, and sodium dihydrogenphosphate; and organic compounds such as acetic acid, tartaric acid, benzoic acid, trifluoroacetic acid, methanesulfonic acid, ethanosulfonic acid, benzene-sulfonic acid, p-toluenesulfonic acid, saccharinic acid, phthalic acid, picolinic acid, and quinolinic acid.

The ink of the invention has an electric conductivity in the range of from 0.01 to 10 S/m. Especially, an electric conductivity in the range of from 0.05 to 5 S/m is preferable.

As a method of measuring an electric conductivity, an electrode method using commercially available saturated potassium chloride is employable.

The electric conductivity can be controlled mainly by the ion concentration in the aqueous solution. In the case where the salt concentration is high, it is possible to carry out desalting using an ultrafiltration membrane, etc. Also, in the case where the electric conductivity is adjusted by the addition of a salt, etc., the adjustment can be achieved by adding a variety of organic salts or inorganic salts.

Examples of the inorganic salts include potassium halides, sodium halides, sodium sulfate, potassium sulfate, sodium hydrogensulfate, potassium hydrogensulfate, sodium nitrate, potassium nitrate, sodium hydrogencarbonate, potassium hydrogencarbonate, sodium phosphate, sodium monohydrogenphosphate, boric acid, potassium dihydrogenphosphate, and sodium dihydrogenphosphate; and examples of the organic salts include sodium acetate, potassium acetate, potassium tartarate, sodium tartarate, sodium benzoate, potassium benzoate, sodium p-toluenesulfonate, potassium saccharinaate, potassium phthalate, and sodium picolate.

Also, the electric conductivity can be adjusted by selecting other additive component.

The ink viscosity of the invention is preferably from 1 to 20 mPa·s, more preferably from 2 to 15 mPa·s, and especially preferably from 2 to 10 mPa·s at 25° C. When the ink viscosity exceeds 20 mPa·s, the fixing rate of the recorded image becomes slow, and the discharge performance is lowered; and when it is less 1 mPa·s, since the recorded image bleeds, the quality is lowered.

The viscosity can be arbitrarily adjusted by the addition amount of the ink solvent. Examples of the ink solvent include glycerin, diethylene glycol, triethanolamine, 2-pyrrolidone, diethylene glycol monobutyl ether, and triethylene glycol monobutyl ether.

Also, a viscosity modifier may be used. Examples of the viscosity modifier include water-soluble polymers such as celluloses and polyvinyl alcohol and nonionic surfactants. More detailed information is described in *Nendo Chosei Gijutsu* (published by Technical Information Institute Co., Ltd. (1999)) and *Chemicals for Inkjet Printers* ('98 Supplement): *Development Trend and Prospect Search of Materials*, pages 162 to 174 (published by CMC Publishing Co. (1997)).

The measurement method of viscosity of liquids is described in detail in JIS Z8803, and the viscosity can be easily measured using commercially available viscometers. Examples of viscometers include a B-type viscometer and E-type viscometer (manufactured by TOKIMEC INC.) as a rotation type and. In the invention, the viscosity was measure at 25° C. using a vibration type VM-100A-L model, manufactured by Yamaichi Electronics Co., Ltd. Though the unit of viscosity is a pascal·sec (Pa·s), it is usually a millipascal·sec (mPa·s).

The surface tension of the ink to be used in the invention is preferably from 20 to 50 mN/m, and preferably from 20 to 40 mN/m at 25° C. in terms of any of dynamic surface tension and static surface tension. When the surface tension exceeds 50 mN/m, the discharge stability is markedly lowered, and printing quality is also markedly lowered due to bleeding at the time of color mixing or generation of whiskers. Also, when the surface tension of the ink is less than 20 mN/m, adhesion of the ink onto the hard surface occurs at the time of discharge, whereby printing failure may possibly occur.

For the purpose of modifying the surface tension, the foregoing various cationic, anionic or anionic surfactants can be added. The surfactant is preferably used in an amount in the range of from 0.01 to 20% by weight, and more preferably in the range of from 0.1 to 10% by weight against the inkjet ink. Also, the surfactant can be used in combinations of two or more thereof.

As a method of measuring the static surface tension, a capillary rise method, a dropping method, a ring suspension method, etc. are known. In the invention, a vertical sheet process is used as a method of measuring the static surface tension.

When a thin sheet of glass or platinum is vertically suspended while dipping a part therein in the liquid, the surface tension of the liquid acts on downwardly along a portion where the liquid level comes into contact with the sheet. This force is balanced with an upward force, whereby the surface tension can be measured.

Also, as a method of measuring the dynamic surface tension, for example, a vibration jet method, a meniscus dripping method, and a maximum bubble pressure method as described in *Shin Jikken Kagaku Koza*, Vol. 18, "Interface and Colloid", pages 69 to 90 (published by Maruzen Corporation (1977)), are known. Further, a liquid film breakage method as described in JP-A-3-2064 is known. In the invention, a bubble pressure differential pressure method is used as the method of measuring a dynamic surface tension. The measurement principle and method will be described below.

When bubbles are formed in a solution which has become uniform upon stirring, a new air-liquid interface is formed, molecules of the surfactant gather in the solution at a constant rate. When the bubble rate (formation rate of bubble) is changed, if the formation rate is slow, much more molecules of the surfactants gather on the surface. Accordingly, the maximum bubble pressure immediately before burst of bubble becomes small, and the maximum bubble pressure (surface tension) against the bubble rate can be detected. As the measurement of the dynamic surface tension, there is enumerated a method in which bubbles are formed in the solution using large and small two probes, a differential pressure of the two probes in the maximum bubble pressure state is measured, from which is then calculated a dynamic surface tension.

What the content of non-volatile matters in the ink of the invention is from 10 to 70% by weight of the whole amount of the ink is preferable in view of discharge stability of the ink, printed image quality, various fastnesses of the image, and reduction of bleeding of the image after printing or stickiness on the print surface. What the content of non-volatile matters is from 20 to 60% by weight is more preferable in view of discharge stability of the ink and reduction of bleeding of the image after printing.

The non-volatile matters as referred to herein mean a liquid having a boiling point of 150° C. or higher at one atmosphere, a solid component, and a high-molecular component. The non-volatile matters in the inkjet recording ink include a dye, a high-boiling solvent, and arbitrary components such as a polymer latex, a surfactant, a dye stabilizer, an anti-mold agent, and a buffering agent. The major part of these non-volatile matters other than the dye stabilizer have such properties that since they lower the dispersion stability of the ink and are present on inkjet receiving paper after printing, they hinder stabilization due to association of the dye on the receiving paper and deteriorate various fastnesses of image areas and bleeding of the image under a high-temperature condition.

In the invention, a high-molecular compound can be contained. The high-molecular compound as referred to herein means all of high-molecular compounds contained in the ink and having a number average molecular weight of 5,000 or more. Examples of these high-molecular compounds include water-soluble high-molecular compounds that are substantially dissolved in the aqueous medium, water-dispersible high-molecular compounds such as polymer latexes and polymer emulsions, and alcohol-soluble high-molecular compounds that are dissolved in a polyhydric alcohol to be used as a co-solvent. Any high-molecular compounds that are substantially dissolved or dispersed uniformly in the ink liquid are included in the high-molecular compound in the invention.

Specific examples of the water-soluble high-molecular compound include water-soluble high-molecular compounds such as polyvinyl alcohol, silanol-modified polyvinyl alcohol, carboxymethyl cellulose, hydroxyethyl cellulose, polyvinylpyrrolidone, polyalkylene oxides (for example, polyethylene oxide and polypropylene oxide), and polyalkylene oxide derivatives; natural water-soluble high-molecular compounds such as polysaccharides, starch, cationic starch, casein, and gelatin; aqueous acrylic resins such as polyacrylic acid, polyacrylamide, and copolymers thereof; aqueous alkyd resins; and water-soluble high-molecular compounds that are substantially dissolved in the aqueous medium and having an —$SO_3$— or —COO— group in the molecule thereof.

Also, examples of the polymer latex include styrene butadiene latexes, styrene-acryl latexes, and polyurethane latexes. Further, examples of the polymer emulsion include acrylic emulsions.

These water-soluble high-molecular compounds can be used singly or in combinations of two or more thereof.

As described previously, the water-soluble high-molecular compound is used as a viscosity modifier for the purpose of modifying the viscosity of the ink so as to fall within a viscosity region where the discharge characteristic is good. When its addition amount is too high, the viscosity of the ink increases so that the discharge stability of the ink liquid is lowered, and the ink is liable to generate clogging of a nozzle with a precipitate with a time.

The addition amount of the high-molecular compound as a viscosity modifier varies depending upon the molecular weight of the compound to be added (the higher the molecular weight, the lower the addition amount) and is from 0 to 5% by weight, preferably from 0 to 3% by weight, and more preferably from 0 to 1% by weight based on the whole amount of the ink.

In addition to the foregoing surfactant, nonionic, cationic or-anionic surfactants may be used as a surface tension modifier. For instance, examples of anionic surfactants include fatty acid salts, alkylsulfuric acid ester salts, alkylbenzenesulfonic acid salts, alkylnaphthalenesulfonic acid salts, dialkylsulfosuccinic acid salts, alkylphosphoric acid ester salts, naphthalenesulfonic acid formalin condensates, and polyoxyethylene alkylsulfuric acid ester salts; and examples of nonionic surfactants include polyoxyethylene alkyl ethers, polyoxyethylene alkylaryl ethers, polyoxyethylene fatty acid esters, sorbitan fatty acid esters, polyoxyethylene sorbitan fatty acid esters, polyoxyethylene alkylamines, glycerin fatty acid esters, and oxyethylene-oxypropylene block copolymers. Also, SURFYNOLS (manufactured by Air Product & Chemicals) as an acetylene based polyoxyethylene oxide surfactant are preferably used. Also, amine oxide type ampholytic surfactants such as N,N-dimethyl-N-alkylamine oxides are preferable. Further, compounds described as a surfactant in JP-A-59-157636, pages (37) to (38) and Research Disclosure No. 308119 (1989) can be used.

Also, in the invention, if desired, the foregoing various cationic, anionic or nonionic surfactants can be used as a dispersant or a dispersion stabilizer; and fluorine based and silicone based compounds and chelating agents represented by EDTA can be used as a defoaming agent.

(Image Receiving Material)

Examples of the image receiving material that is used in the invention include recording papers and recording films as reflection type media as described below.

A support in the recording paper or recoating film is made of a chemical pulp (for example, LBKP and NBKP), a mechanical pulp (for example, GP, PGW, RMP, TMP, CTMP, CMP, and CCP), or used paper (for example, DIP). If desired, known additives such as a pigments, a binder, a sizing agent, a fixing agent, a cationic agent, and a paper strengthening agent are mixed. Supports prepared by using a variety of devices such as a fourdrinier paper machine and a cylinder paper machine can be used. In addition to these supports, any synthetic papers and plastic film sheets can be used as the support. The support preferably has a thickness of from 10 to 250 μm and a basis weight of from 10 to 250 g/m².

A support having an image receiving layer and a back coat layer directly provided thereon may be employed as an image receiving material for the ink of the invention. Alternatively, an image receiving material prepared by size pressing a support with starch, polyvinyl alcohol, etc. or providing a support with an anchor layer and then providing an image receiving layer and a back coat layer may be employed. Further, the support may be subjected to a flattening treatment by a calendaring device, such as machine calendaring, TG calendaring, and soft calendaring.

In the invention, paper or a plastic film, the both sides of which are laminated with a polyolefin (for example, polyethylene, polystyrene, polybutene, and copolymers thereof) or a polyethylene terephthalate, is preferably used as the support. It is preferred to add a white pigment (for example, titanium oxide and zinc oxide) or a tinting dye (for example, cobalt blue, ultramarine, and neodymium oxide).

A porous material and an aqueous binder are contained in the image receiving layer to be provided on the support. Also, it is preferable that the image receiving layer contains a pigment. As the pigment, white pigments are preferable. Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate; and organic pigments such as styrene based pigments, acrylic pigments, urea resins, and melamine resins. Of these, porous white inorganic pigments are especially preferable, and in particular, synthetic amorphous silica, etc. having a large pore area are suitable. As the synthetic amorphous silica, all of silicic anhydride obtained by a dry production process (vapor phase process) and hydrous silicic acid obtained by a wet production process can be used.

Specific examples of the recording paper in which the foregoing pigment is contained in the image receiving layer include recording papers disclosed in JP-A-10-81064, JP-A-10-119423, JP-A-10-157277, JP-A-10-217601, JP-A-11-348409, JP-A-2001-138621, JP-A-2000-43401, JP-A-2000-211235, JP-A-2000-309157, JP-A-2001-96897, JP-A-2001-138627, JP-A-11-91242, JP-A-8-2087, JP-A-8-2090, JP-A-8-2091, JP-A-8-2093, JP-A-8-174992, JP-A-11-192777, and JP-A-2001-301314.

Examples of the aqueous binder to be contained in the image receiving layer include water-soluble high-molecular compounds such as polyvinyl alcohol, silanol-modified polyvinyl alcohol, starch, cationic starch, casein, gelatin, carboxymethyl cellulose, hydroxyethyl cellulose, polyvinylpyrrolidone, polyalkylene oxides, and polyalkylene oxide derivatives; and water-dispersible high-molecular compounds such as styrene butadiene latexes and acrylic emulsions. These aqueous binders can be used singly or in combinations with two or more thereof. In the invention, of these, polyvinyl alcohol and silanol-modified polyvinyl alcohol are suitable in view of adhesion to the pigment and resistance to peeling of the ink receiving layer.

The image receiving layer can contain a mordant, a waterproofing agent, a light resistance improver, a gas resistance improver, a surfactant, a hardener, and other additives in addition to the pigment and aqueous binder.

It is preferable that the mordant to be added in the image receiving layer is immobilized. For achieving this, a polymer mordant is preferably used.

The polymer mordant is described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853,- JP-A-60-57836, JP-A-60-60643, JP-A-60-118834, JP-A-60-122940, JP-A-60-122941, JP-A-60-122942, JP-A-60-235134, JP-A-1-161236, and U.S. Pat. Nos. 2,484,430, 2,548,564, 3,148,061, 3,309,690, 4,115,124, 4,124,386, 4,193,800, 4,273,853, 4,282,305 and 4,450,224. Image receiving materials containing a polymer mordant as described at pages 212 to 215 of JP-A-1-161236 are especially preferable. When the polymer mordant described in this patent document is used, images having excellent image quality are obtained, and light resistance of the image is improved.

The waterproofing agent is effective for waterproofing of the image. As such a waterproofing agent, cationic resins are especially desired. Examples of such cationic resins include polyamidepolyamine epichlorohydrin, polyethylene-imine, polyaminesulfone, dimethyldiallylammonium chloride polymers, and cationic polyacrylamide. The content of the cationic resin is preferably from 1 to 15% by weight, and especially preferably from 3 to 10% by weight based on the whole of solids of the ink receiving layer.

Examples of the light resistance improver and gas resistance improver include phenol compounds, hindered phenol compounds, thioether compounds, thiourea compounds, thiocyanic acid compounds, amine compounds, hindered amine compounds, TEMPO compounds, hydrazine compounds, hydrazide compounds, amidine compounds, vinyl group-containing compounds, ester compounds, amide compounds, ether compounds, alcohol compounds, sulfinic acid compounds, saccharides, water-soluble reducing compounds, organic acids, inorganic acids, hydroxyl group-containing organic acids, benzotriazole compounds, benzophenone compounds, triazine compounds, heterocyclic compounds, water-soluble metal salts, organometal compounds, and metal complexes.

Specific examples of these compounds include compounds described in JP-A-10-182621, JP-A-2001-260519, JP-A-2000-260519, JP-B-4-34953, JP-B-4-34513, JP-B-4-34512, JP-A-11-170686, JP-A-60-67190, JP-A-7-276808, JP-A-2000-94829, JP-T-8-512258, and JP-A-11-321090.

The surfactant functions as a coating aid, a peeling improver, a slipperiness improver, or an antistatic agent. The surfactant is described in JP-A-62-173463 and JP-A-62-183457.

An organofluoro compound may be used in place of the surfactant. It is preferable that the organofluoro compound is hydrophobic. Examples of the organofluoro compound include fluorine based surfactants, oily fluorine based compounds (for example, fluorocarbon oils), and solid fluorine compound resins (for example, tetrafluoroethylene resins). The organofluoro compound is described in JP-B-57-9053 (the eighth to 17th columns), JP-A-61-20994, and JP-A-62-135826.

As the hardener, materials described at page 222 of JP-A-1-161236 and in JP-A-9-263036, JP-A-10-119423, and JP-A-2001-310547 can be used.

Examples of other additives to be added in the image receiving layer include a pigment dispersant, a thickening agent, a defoaming agent, a dye, a fluorescent brightener, an antiseptic, a pH adjustor, a matting agent, and a hardener. Incidentally, the ink receiving layer may be of a single-layer or two-layer structure.

The recording paper or recording film can be provided with a back coat layer. Examples of components which can be added in this layer include a white pigment, an aqueous binder, and other components.

Examples of the white pigment to be contained in the back coat layer include white inorganic pigments such as precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrated halloysite, magnesium carbonate, and magnesium hydroxide; and organic pigments such as styrene based plastic pigments, acrylic plastic pigments, polyethylene, microcapsules, urea resins, and melamine resins.

Examples of the aqueous binder to be contained in the back coat layer include water-soluble high-molecular compounds such as styrene/maleic acid salt copolymers, styrene/acrylic acid salt copolymers, polyvinyl alcohol, silanol-modified polyvinyl alcohol, starch, cationic starch, casein, gelatin, carboxymethyl cellulose, hydroxyethyl cellulose, and polyvinylpyrrolidone; and water-dispersible high-molecular compounds such as styrene butadiene latexes and acrylic emulsions. Examples of other components to be contained in the back coat layer include a defoaming agent, a foam inhibitor, a dye, a fluorescent brightener, an antiseptic, and a waterproofing agent.

In constitutional layers (including the back layer) of the inkjet recording paper or recording film, a polymer fine particle dispersion may be added. The polymer fine particle dispersion is used for the purpose of improving film physical properties such as dimensional stabilization, curl prevention, adhesion prevention, and film cracking prevention; The polymer fine particle dispersion is described in JP-A-62-245258, JP-A-62-136648, and JP-A-62-110066. When a polymer fine particle dispersion having a low glass transition temperature (not higher than 40° C.) is added in the mordant-containing layer, cracking or curling of the layer can be prevented. Also, when a polymer fine particle dispersion having a high glass transition temperature is added in the back layer, curling can be prevented.

(Inkjet Recording)

In the ink, a jet drop volume of the ink on the recording material is preferably 0.1 pL or more and not more than 100 pL, more preferably 0.5 pL or more and not more than 50 pL, and especially preferably 2 pL or more and not more than 50 pL.

In the invention, the inkjet recording system is not limited, and known systems such as a charge control system of discharging the ink utilizing an electrostatic inducing force; a drop-on-demand system utilizing an oscillation pressure of piezoelectric element (pressure pulse system); an acoustic inkjet system of discharging the ink utilizing a radiation pressure caused by converting electric signals to acoustic beams and irradiating them to the ink; and a thermal inkjet (bubble jet) system utilizing a pressure generated by forming bubbles upon heating of the ink are employed.

The inkjet recording system includes a system of injecting a number of inks having a low density called a photo-ink in a small volume; a system of improving image quality using a plural number of inks having substantially the same hue and a different density; and a system using a colorless transparent ink. The control of jet drop volume of the ink is carried out chiefly by a print head.

For example, in the case of the thermal inkjet system, the jet drop volume can be controlled by the structure of a print head. That is, droplets can be jetted into a desired size by changing sizes of an ink chamber, a heating part, and a nozzle. Also, even in the thermal inkjet system, jetting of droplets of a varied size can be realized by using a plural number of print heads having a different size of a heating part or a nozzle.

In the case of the drop-on-demand system using piezoelectric elements, likewise the thermal inkjet system, the jet drop volume can be changed on the structure of a print head. However, as described later, droplets having a varied size can be jetted by using print heads having the same structure by controlling a waveform of drive signals of driving piezoelectric elements.

In the invention, it is preferable that when droplets of the ink are jetted onto a recording material, a discharge frequency is 1 kHz or more.

As shown in the photograph, for the sake-of recording images, in order to reproduce images having a high sharpness by small ink drops, the jet drop density is required to be 600 dpi (number of dots per inch) or more.

On the other hand, in jetting drops of the ink by heads having a plural number of nozzles, in the type of achieving the recording in which recording paper and the head move in the perpendicular directions to each other, the number of heads that can be simultaneously driven is restricted to from approximately several tens to 200; and in the type wherein heads called a line head are fixed, the number of heads is restricted to several hundreds. This is because a drive power is restricted; and since heat generation of the heads affects images, a number of head nozzles cannot be driven at the same time. For these reasons, for the sake of achieving the recording by raising the jet drop density, the recording speed is liable to become long. However, by increasing the drive frequency, it is possible to increase the recording speed.

In order to control the jet drop frequency, in the case of the thermal inkjet system, the control can be achieved by controlling the frequency of a head drive signal for heating heads.

In the case of piezoelectric system, it is possible to control the frequency of a signal of driving piezo.

The drive of a piezoelectric head will be described below. With respect to an image signal to be printed, a jet drop size, a jet drop rate and a jet drop frequency are determined by a printer control section, thereby preparing a signal for driving a print head. The drive signal is fed into the print head. The jet drop size, jet drop rate and jet drop frequency are controlled by a signal for driving a piezo. Here, the jet drop size and jet drop rate are determined by the shape and amplitude of drive waveform, and the jet drop frequency is determined by a repeating period of the signal.

When the jet drop frequency is set up at 10 kHz, the head is driven every 100 μ-seconds, and recording of one line is completed at 400 μ-seconds. By setting up the movement rate of recording paper at 1/600 inch per 400 μ-seconds, i.e., about 42 μm, it is possible to achieve printing at a rate of one sheet per 1.2 seconds.

With respect to the construction of a printing device and the construction of a printer for which the inkjet ink of the invention is used, embodiments disclosed in, for example, JP-A-11-170527 are suitable. Also, with respect to an ink cartridge, ones disclosed in, for example, JP-A-5-229133 are suitable. With respect to suction and the construction of a cap of covering the print head, etc., ones disclosed in, for example, JP-A-7-276671 are suitable. Also, it is suitable to provide a filter for eliminating bubbles in the vicinity of a head as disclosed in JP-A-9-277552.

Also, it is suitable that the nozzle surface is subjected to a water repellent treatment as described in JP-2002-292878. With respect to the utilization, printers to be connected to computers or devices specialized for printing photographs are applicable.

In the inkjet ink of the invention, an average jet drop rate at the time of jetting drops on a recording material is preferably 2 m/sec or more, and more preferably 5 m/sec or more.

The jet drop rate can be controlled by controlling the shape and amplitude of a drive waveform of driving the head.

Also, by properly using a plural number of drive waveforms, it is possible to jet drops having a varied size using the same head.

(Application of Inkjet)

The inkjet ink of the invention can be used for other applications than the inkjet recording. For example, it can be used for materials for display images, image forming materials of indoor decorative materials, and image forming materials of outdoor decorative materials.

The materials for display images mean various materials such as posters, wall papers, decorative small articles (for example, ornaments and dolls), business advertising leaflets, wrapping papers, wrapping materials, paper bags, vinyl bags, packaging materials, signboards, pictures or attached images in the sides of transport facilities (for example; automobiles, buses, and electric trains), and logotype-provided dresses. In the case where the dye of the invention is applied for forming materials of display images, the image as referred to herein includes not only images of a narrow sense but also all of patterns by dyes which a person can acknowledge such as abstract designs, characters, and geometric patterns.

The indoor decorative materials mean various materials such as wall papers, decorative small-articles (for example, ornaments and dolls), members of lighting instruments, members of furniture, and design members of floors or ceiling. In the case where the dye of the invention is applied for image forming materials, the image as referred to herein includes not only images of a narrow sense but also all of patterns by dyes which a person can acknowledge such as abstract designs, characters, and geometric patterns.

The outdoor decorative materials mean various materials such as wall materials, roofing materials, signboards, gardening materials, outdoor decorative small articles (for example, ornaments and dolls), and members of outdoor lighting instruments. In the case where the dye of the invention is applied for image forming materials, the image as referred to herein includes not only images of a narrow sense but also all of patterns by dyes which a person can acknowledge such as abstract designs, characters, and geometric patterns.

In the foregoing applications, examples of media in which a pattern is formed include various materials such as papers, fibers, cloths (including non-woven fabrics), plastics, metals, and ceramics. As a dyeing embodiment, mordanting, textile printing, or fixing of a dye in the form a reactive dye having a reactive group introduced thereinto can be employed. Of these, dyeing in the mordanting form is preferable.

EXAMPLES

The invention will be described below with respect to the following Examples, but it should not be construed that the invention is limited thereto.

Example 1

Ultra-pure water (specific resistance: 18 MΩ·cm or more) was added to the following components to make to one liter, and thereafter, the mixture was stirred for one hour while heating at from 30 to 40° C. Thereafter, the resulting mixture was subjected to vacuum filtration using a microfilter having an average pore size of 0.25 μm to prepare a black ink Bk-101.

| (Formulation of black ink Bk-101) | |
|---|---|
| (Solid component) | |
| Black dye (Bk-1) of the invention: | 60 g/L |
| Black dye (Bk-2) of the invention: | 15 g/L |
| Proxel: | 5 g/L |
| Urea: | 20 g/L |
| Benzotriazole: | 3 g/L |
| (Liquid component) | |
| Diethylene glycol monobutyl ether (DGB): | 100 g/L |
| Glycerin (GR) | 125 g/L |
| Diethylene glycol (DEG): | 100 g/L |
| 2-Pyrrolidone (PRD): | 100 g/L |
| Triethanolamine (TEA): | 30 g/L |
| SURFYNOL STG (SW): | 10 g/L |

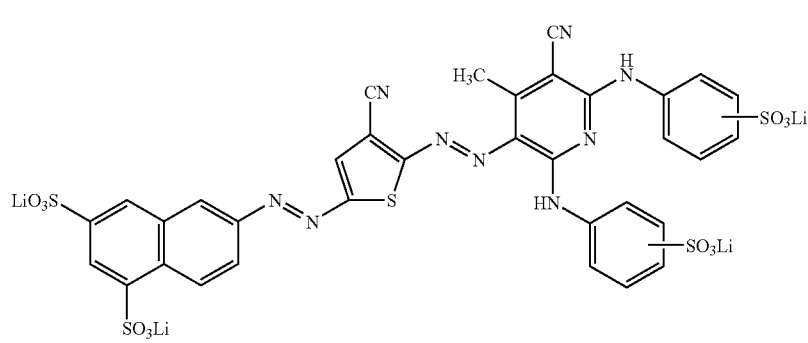

Bk-1

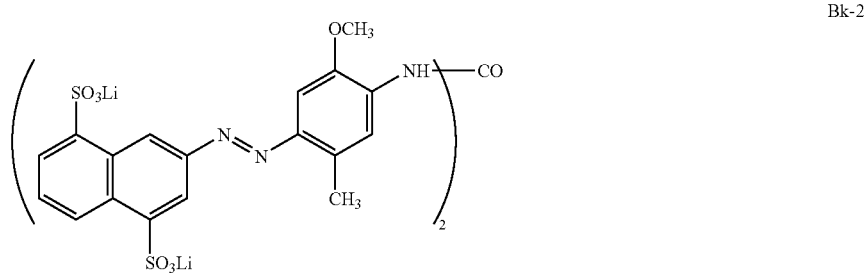

Bk-2

The black dyes used herein (Bk-1 and Bk-2) had an oxidation potential (Eox) of 1.2 V (vs SCE) or more, respectively in all of the cyclic voltammetry method and rotatory ring disk electrode method using a 1 mmole/L aqueous solution of the dye. Also, Bk-1 had a λmax of 565 nm and a half-band width of 116 nm.

Next, black inks Bk-102 to 110 having the same composition as in Bk-101 were prepared in the same manner, except for changing the ink formulation as shown in the following Table 1.

TABLE 1

| | | Ink solvent | | | | |
|---|---|---|---|---|---|---|
| | Dye | DGB | DEG | PRD | Base | Ink pH |
| Bk-101 | Bk-1 and Bk-2 | 100 g/L | 100 g/L | 100 g/L | TEA 30 g/L | 9.5 |
| Bk-102 | Bk-1 and Bk-2 | 100 g/L | 100 g/L | 100 g/L | TEA 5 g/L | 8.1 |
| Bk-103 | Bk-1 and Bk-2 | 100 g/L | 100 g/L | 30 g/L | TEA 30 g/L | 9.2 |
| Bk-104 | Bk-3 and Bk-4 | 100 g/L | 100 g/L | 100 g/L | TEA 5 g/L | 8.1 |
| Bk-105 | Bk-1 and Bk-2 | 100 g/L | 100 g/L | 30 g/L | TEA 5 g/L | 7.9 |
| Bk-106 | Bk-1 and Bk-2 | 150 g/L | 100 g/L | 20 g/L | TEA 5 g/L | 8.0 |
| Bk-107 | Bk-1 and Bk-2 | 100 g/L | 100 g/L | 30 g/L | LiOH 2 g/L | 8.3 |
| Bk-108 | Bk-1 and Bk-2 | 150 g/L | 100 g/L | 20 g/L | LiOH 1 g/L | 7.7 |
| Bk-109 | Bk-1 and Bk-2 | 100 g/L | 100 g/L | 30 g/L | NaOH 2 g/L | 8.2 |
| Bk-110 | Bk-1 and Bk-2 | 150 g/L | 100 g/L | 20 g/L | NaOH 1 g/L | 7.6 |

Here, the dyes Bk-3 and Bk-4 had an oxidation potential (Eox) of not more than 1.0 V (vs SCE) or more, respectively. Also, Bk-3 had a λmax of 572 nm and a half-band width of 124 nm.

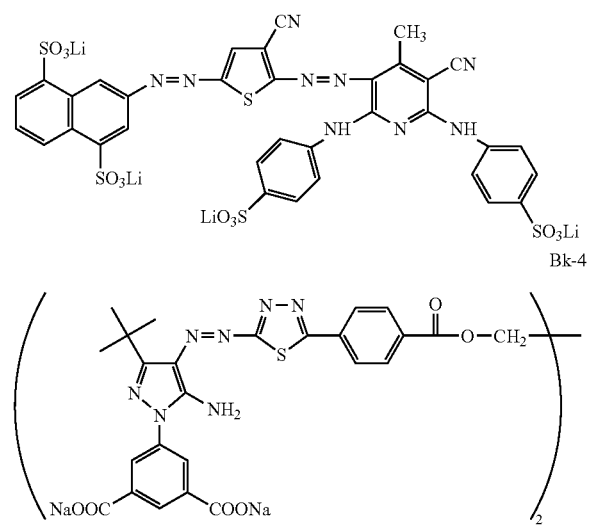

These inks were subjected to a heat refluxing treatment without being diluted for 6 hours under a boiling condition of water, and a change of absorbance (a lowering of dye density) at λmax was measured before and after heat refluxing treatment using a cell having an optical path length of 5 μm.

Also, each of the inks was filled in a black ink cartridge of an inkjet printer PM-980C, manufactured by SEIKO EPSON CORPORATION, and the cartridge was stored for 2 weeks under conditions of 40° C. and 80% RH and then subjected to printing test. At that time, with respect to other inks, inks of PM-980C were used as they were, and an image pattern, the density of which changed in a gray stepwise manner, was printed.

An inkjet paper of super photo grade "kassai", manufactured by Fuji Photo Film Co., Ltd. was used as an image receiving sheet, an image was printed thereon, and image quality and discharge properties and image fastness of the ink were evaluated.

1) With respect to the discharge stability, the cartridge was set in the printer, and after confirming discharge of the ink from all of nozzles, A4-size 30 sheets were output. Gray image areas were evaluated according to the following criteria.

A: No disorder of prints is observed from the start to completion of the printing.

B: Output with disorder of prints occurs.

C: Disorder of prints is observed from the start to completion of the printing.

2) With respect to the image fastness of the black dye, the following evaluations were carried out using a gray print sample. The evaluation of the image fastness was carried out by measuring the density of the gray stepwise pattern using an X-Rite 310 density analyzer-mounted-with a status A filer and measuring a change of the density while defining a point in the vicinity of $D_{vis}$ as a standard point.

(i) With respect to the light fastness, a density ($D_{vis}$) Ci of pattern S immediately after printing was measured, and an image was then irradiated with xenon light (85,000 luxes) for 14 days using a weather-o-meter manufactured by ATLAS. Thereafter, the density Cf of the pattern S was again measured, and a remaining ratio of dye [Cf/Ci×100 (%)] was determined. The case where the remaining ratio of dye was 80% or more was defined as "A"; the case where the remaining ratio of dye was from 70 to 80% was defined as "B"; and the case where the remaining ratio of dye was less than 70% was defined as "C".

(ii) With respect to the heat fastness, a density of pattern S was measured before and after storing the sample for 21 days under conditions of 80° C. and 70% RH using an X-Rite 310 density analyzer. A remaining ratio of dye was then determined and evaluated. The case where the remaining ratio of dye was 90% or more was defined as "A"; the case where the remaining ratio of dye was from 80 to 90% was defined as "B"; and the case where the remaining ratio of dye was less than 80% was defined as "C".

(iii) With respect to the ozone fastness, the sample was allowed to stand in a box where the ozone gas concentration was set up at 5 ppm for 96 hours, and a density of pattern S was measured before and after standing under an ozone gas using an X-Rite 310 density analyzer. A remaining ratio of dye was then determined and evaluated.

The ozone gas concentration in the box was set up using an ozone gas monitor, manufactured by APPLICS (Model: OZG-EM-01).

The case where the remaining ratio of dye was 80% or more was defined as "A"; the case where the remaining ratio of dye was from 70 to 80% was defined as "B"; and the case where the remaining ratio of dye was less than 70% was defined as "C".

The thus obtained results are shown in Table 2.

TABLE 2

| No. | Lowering rate of ink density | Discharge properties | Light fastness | Heat fastness | $O_3$ fastness |
|---|---|---|---|---|---|
| Bk-101 (Comparison) | 32% | C | A | A | B |
| Bk-102 (Comparison) | 11% | B | A | A | A |
| Bk-103 (Comparison) | 23% | C | A | A | B |
| Bk-104 (Comparison) | 14% | B | C | B | C |
| Bk-105 (Invention) | 3% | A | A | A | A |
| Bk-106 (Invention) | 1% | A | A | A | A |
| Bk-107 (Invention) | 2% | A | A | A | A |
| Bk-108 (Invention) | ≦1% | A | A | A | A |
| Bk-109 (Invention) | 2% | A | A | A | A |
| Bk-110 (Invention) | ≦1% | A | A | A | A |

It is noted from the results shown in Table 2 that the ink liquids having a change ratio of absorbance at λmax (lowering rate of ink density) of 10% or less are high in discharge properties and superior in all of performances to the comparisons. From this fact, the effects of the invention are clear.

Example 2

Ultra-pure water having a specific resistance of 18 MΩ·cm or more was added to the following components to make to one liter, and thereafter, the mixture was stirred for one hour while heating at from 30 to 40° C. Thereafter, the resulting mixture was subjected to vacuum filtration using a microfilter having an average pore size of 0.25 μm to prepare a black ink.

(Formulation of black ink)
(Solid component)

| | |
|---|---|
| Black dye (Bk-5): | 65 g/L |
| Black dye (Bk-6): | 20 g/L |
| Proxel: | 5 g/L |
| Urea: | 20 g/L |
| Benzotriazole: | 3 g/L |

(Liquid component)

| | |
|---|---|
| Diethylene glycol monobutyl ether (DGB): | 120 g/L |
| Glycerin (GR) | 125 g/L |
| Diethylene glycol (DEG): | 100 g/L |
| 2-Pyrrolidone: | 35 g/L |
| Triethanolamine (TEA): | 8 g/L |
| SURFYNOL STG (SW): | 10 g/L |

(Formulation of light black ink)
(Solid component)

| | |
|---|---|
| Black dye (Bk-5): | 22 g/L |
| Black dye (Bk-6): | 7 g/L |
| Proxel: | 5 g/L |
| Urea: | 10 g/L |
| Benzotriazole: | 3 g/L |

(Liquid component)

| | |
|---|---|
| Diethylene glycol monobutyl ether (DGB): | 100 g/L |
| Glycerin (GR) | 125 g/L |
| Diethylene glycol (DEG): | 90 g/L |
| 2-Pyrrolidone: | 25 g/L |
| Triethanolamine (TEA): | 8 g/L |
| SURFYNOL STG (SW): | 10 g/L |

Ink sets made of an ink containing exactly the same ink components were prepared, except that in these inks, the dyes were changed as shown in the following table.

In Table 3, the parameters defined in the present application, "when an absorbance (Dmax (A)) at λmax in measuring an absorbance (Abs) of the ink as it is in the visible region using a cell having an optical path length of 5 μm and an absorbance (Dmax (B)) at λmax in measuring an absorbance (Abs) of the ink after diluting with water by 2,000 times in the visible region using a cell having an optical path length of 1 cm are measured to determine a ratio of the both (RD=Dmax (A)/Dmax (B)), RD (RD-L) of the lower density black ink, RD (RD-H) of the higher density black ink, and the following relationship: Z=RD-L/RD-H<1", are described. Also, the Dmax (A), $k_{vis}$ and Dmax (B) of each of the inks are shown in Table 3.

TABLE 3

| | Black | | | | | Light black ink | | | | |
|---|---|---|---|---|---|---|---|---|---|---|
| | Dye | Dmax (A) | $k_{vis}$ | RD-H | Dmax (B) | Dye | Dmax (A) | $k_{vis}$ | RD-H | Dmax (B) | Z |
| 201 (Comparison) | Bk-5 Bk-6 | 1.14 | 0.21 | 0.78 | 1.46 | Bk-5 Bk-6 | 0.40 | 0.46 | 0.80 | 0.50 | 1.03 |
| 202 (Comparison) | Bk-5 Bk-7 | 1.10 | 0.12 | 0.72 | 1.53 | Bk-5 Bk-6 | 0.40 | 0.46 | 0.80 | 0.50 | 1.11 |
| 203 (Comparison) | Bk-8 Bk-6 | 1.06 | 0.075 | 0.66 | 1.56 | Bk-5 Bk-6 | 0.40 | 0.46 | 0.80 | 0.50 | 1.21 |
| 204 (Invention) | Bk-5 Bk-6 | 1.14 | 0.21 | 0.78 | 1.46 | Bk-8 Bk-6 | 0.36 | 0.094 | 0.69 | 0.53 | 0.88 |
| 205 (Invention) | Bk-5 Bk-7 | 1.10 | 0.12 | 0.72 | 1.53 | Bk-8 Bk-6 | 0.36 | 0.094 | 0.69 | 0.53 | 0.96 |
| 206 (Invention) | Bk-5 Bk-6 | 1.14 | 0.21 | 0.78 | 1.46 | Bk-9 Bk6 | 0.35 | 0.086 | 0.66 | 0.54 | 0.85 |

TABLE 3-continued
| | | Black | | | | Light black ink | | | | |
|---|---|---|---|---|---|---|---|---|---|---|
| | Dye | Dmax (A) | $k_{vis}$ | RD-H | Dmax (B) | Dye | Dmax (A) | $k_{vis}$ | RD-H | Dmax (B) | Z |
| 207 (Invention) | Bk-5 Bk7 | 1.10 | 0.12 | 0.72 | 1.53 | Bk-9 Bk-6 | 0.35 | 0.086 | 0.66 | 0.54 | 0.92 |
| 208 (Invention) | Bk-5 Bk-6 | 1.14 | 0.21 | 0.78 | 1.46 | Bk-9 Bk-7 | 0.36 | 0.091 | 0.68 | 0.53 | 0.87 |
$k_{vis} = \times 10^{-2} \, [h^{-1}]$
The structures of the forgoing dyes will be given below.
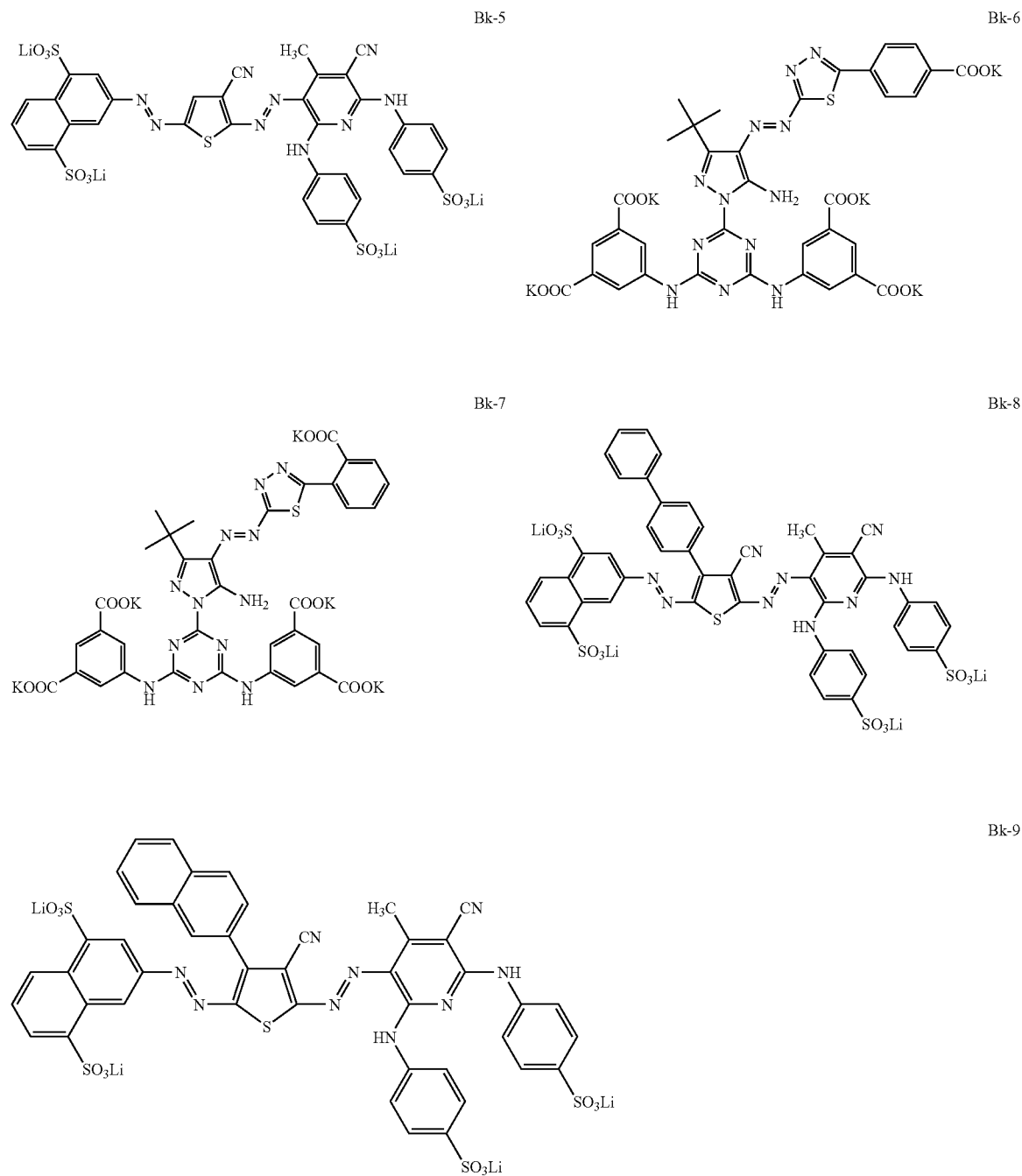

Each of the inks was filled in an ink cartridge of an inkjet printer PM-980C, manufactured by SEIKO EPSON CORPORATION and printed with an image pattern, the density of which changed in a gray stepwise manner, in a monochromatic mode.

An inkjet paper of super photo grade "kassai", manufactured by Fuji Photo Film Co., Ltd. was used as an image receiving sheet.

<Evaluation of Light Fastness>

An image density Ci immediately after printing was measured using a reflection densitometer (X-Rite 310TR), and an image was then irradiated with xenon light (85,000 luxes) for 30 days using a weather-o-meter manufactured by ATLAS. Thereafter, the image density Cf was again measured, and a remaining ratio of dye [Cf/Ci×100 (%)] was determined and evaluated. With respect to the remaining ratio of dye, the reflection density was evaluated at three points of 1, 1.5 and 2 regarding monochromatic pure color of each of C, M and Y and gray areas. The case where the remaining ratio of dye was 80% or more in all of the densities was defined as "A"; the case where the remaining ratio of dye was less than 80% in two of the three points was defined as "B"; and the case where the remaining ratio of dye was less than 80% in all of the densities.

<Evaluation of Image>

A: A uniform and even image is obtained.
B: Bronze is observed in the gray area.

<Evaluation of Ozone Fastness>

The foregoing inkjet paper of super photo grade having an image formed thereon was allowed to stand in a box where the ozone gas concentration was set up at 5 ppm for 7 days, and an image density was measured before and after standing under an ozone gas using a reflection densitometer (X-Rite 310TR), thereby evaluating the measured values as a remaining ratio of dye. Incidentally, the foregoing reflection density was measured at three points of 1, 1.5 and 2. The ozone gas concentration in the box was set up using an ozone gas monitor, manufactured by APPLICS (Model: OZG-EM-01).

The evaluation was made according to three grades such that the case where the remaining ratio of dye was 80% or more in all of the densities was defined as "A"; the case where the remaining ratio of dye was less than 80% in one or two of the three points was defined as "B"; and the case where the remaining ratio of dye was less than 70% in all of the densities. The thus obtained results are shown in Table 4.

TABLE 4

| Ink set No. | Light fastness | Image | Ozone fastness |
|---|---|---|---|
| PM-980C (Comparison type) | C | A | C |
| 201 (Comparison) | A | A | B |
| 202 (Comparison) | A | A | B |
| 203 (Comparison) | A | B | B |
| 204 (Invention) | A | A | A |
| 205 (Invention) | A | A | A |
| 206 (Invention) | A | A | A |
| 207 (Invention) | A | A | A |
| 208 (Invention) | A | A | A |

From the foregoing results, the effects of the invention are clear.

The present invention has been explained in detail and by preferring to specific embodiments, but it will be apparent for those skilled in the art that various modification and alterations can be added within the scope and spirit of the invention.

This application is based on Japanese Patent Application Nos. JP2003-374328 and JP2004-3813, filed on Nov. 4, 2003 and Jan. 9, 2004, respectively, the contents of which is incorporated herein by reference.

INDUSTRIAL APPLICABILITY

The invention is applicable to inkjet recording method without specifically defined. Known systems such as a charge control system of discharging the ink utilizing an electrostatic inducing force; a drop-on-demand system utilizing an oscillation pressure of piezoelectric element (pressure pulse system); an acoustic inkjet system of discharging the ink utilizing a radiation pressure caused by converting electric signals to acoustic beams and irradiating them to the ink; and a thermal inkjet (bubble jet) system utilizing a pressure generated by forming bubbles upon heating of the ink are employed.

The invention claimed is:

1. An ink set for inkjet recording, which comprises at least two black inks having different densities from each other, wherein the at least two black inks each independently comprises: an aqueous medium; and a dye having a $\lambda$max of from 500 nm to 700 nm and a half-band value of 100 nm or more in an absorption spectrum of a diluted solution, the absorption spectrum being standardized to have an absorbance of 1.0 at the $\lambda$max, wherein a lower density black ink in the at least two black inks has an ozone fastness stronger than that of a higher density black ink in the at least two black inks, the higher density black ink having a density higher than that of the lower density black ink.

2. An ink set for inkjet recording, which comprises at least two black inks having different densities from each other, wherein the at least two black inks each independently comprises: an aqueous medium; and a dye having a $\lambda$max of from 500 nm to 700 nm and a half-band value of 100 nm or more in an absorption spectrum of a diluted solution, the absorption spectrum being standardized to have an absorbance of 1.0 at the $\lambda$max, wherein the at least two black inks satisfy following relationship:

$$Z=(RD\text{-}L)/(RD\text{-}H)<1$$

wherein RD-L represents a ratio of Dmax (A) to Dmax (B) of a lower density black ink in the at least two black inks;

RD-H represents a ratio of Dmax (A) to Dmax (B) of a higher density black ink in the at least two black inks, the higher density black ink having a density higher than that of the lower density black ink;

Dmax (A) represents an absorbance at $\lambda$max in a visible region in measuring the absorbance of the lower density black ink or the higher density black ink in a cell having an optical path length of 5 µm; and Dmax (B) represents the absorbance at $\lambda$max in the visible region in measuring the absorbance of the lower density black ink or the higher density black ink diluted with water by 2,000 times in a cell having an optical path length of 1 cm.

3. An ink set for inkjet recording, which comprises at least two black inks having different densities from each other, wherein the at least two black inks each independently comprises: an aqueous medium; and a dye having a $\lambda$max of from 500 nm to 700 nm and a half-band value of 100 nm or more in an absorption spectrum of a diluted solution, the absorption spectrum being standardized to have an absorbance of 1.0 at the λmax, wherein when with respect to each of the at least two black inks, a stepwise printing sample having a concentration pattern of 15 steps up to 30 mL/m² at maximum is prepared and a reflection density in the concentration pattern is measured, a higher density black ink in the at least two black inks has a maximum value of the reflection density higher than that a lower density black ink in the at least two black inks, the lower density black ink having a density lower than that of the higher density black ink.

4. The ink set for inkjet recording according to claim 1, wherein at least one dye to be contained in the at least two black inks has an oxidation potential higher than 1.0 V versus SCE.

5. The ink set for inkjet recording according to claim 1, wherein at least one dye to be contained in the at least two black inks is a dye represented by formula (1):

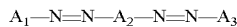

wherein $A_1$, $A_2$ and $A_3$ each independently represents an aromatic group or a heterocyclic group that may be substituted; $A_1$ and $A_3$ each represents a monovalent group; and $A_2$ represents a divalent group.

6. The ink set for inkjet recording according to claim 1, wherein at least one of the at least two black inks is a black ink comprising:

an aqueous medium; and a dye having a λmax of from 500 nm to 700 nm and a half-band width of 100 nm or more in an absorption spectrum of a diluted solution, the absorption spectrum being standardized to have an abforbance of 1.0 at the λmax, wherein a change ratio of an absorbance at λmax in a visible region is 10% or less before and after the black ink is heated to reflux for 6 hours under a condition which water boils, wherein the absorbance is an absorbance of the black ink in a cell having an optical path length of 5 μm.

7. The ink set for inkjet recording according to claim 2, wherein at least one dye to be contained in the at least two black inks has an oxidation potential higher than 1.0 V versus SCE.

8. The ink set for inkjet recording according to claim 2, wherein at least one dye to be contained in the at least two black inks is a dye represented by formula (1):

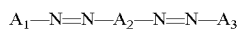

wherein $A_1$, $A_2$ and $A_3$ each independently represents an aromatic group or a heterocyclic group that may be substituted; $A_1$ and $A_3$ each represents a monovalent group; and $A_2$ represents a divalent group.

9. The ink set for inkjet recording according to claim 2, wherein at least one of the two black inks is a black ink comprising:

an aqueous medium; and a dye having a λmax of from 500 nm to 700 nm and a half-band width of 100 nm or more in an absorption spectrum of a diluted solution, the absorption spectrum being standardized to have an absorbance of 1.0 at the λmax, wherein a change ratio of an absorbance at λmax in a visible region is 10% or less before and after the black ink is heated to reflux for 6 hours under a condition which water boils, wherein the absorbance is an absorbance of the black ink in a cell having an optical path length of 5 μm.

10. The ink set for inkjet recording according to claim 3, wherein at least one dye to be contained in the at least two black inks has an oxidation potential higher than 1.0 V versus SCE.

11. The ink set for inkjet recording according to claim 3, wherein at least one dye to be contained in the at least two black inks is a dye represented by formula (1):

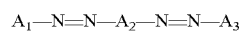

wherein $A_1$, $A_2$ and $A_3$ each independently represents an aromatic group or a heterocyclic group that may be substituted; $A_1$ and $A_3$ each represents a monovalent group; and $A_2$ represents a divalent group.

12. The ink set for inkjet recording according to claim 3, wherein at least one of the at least two black inks is a black ink comprising:

an aqueous medium; and a dye having a λmax of from 500 nm to 700 nm and a half-band width of 100 nm or more in an absorption spectrum of a diluted solution, the absorption spectrum being standardized to have an absorbance of 1.0 at the λmax, wherein a change ratio of an absorbance at λmax in a visible region is 10% or less before and after the black ink is heated to reflux for 6 hours under a condition which water boils, wherein the absorbance is an absorbance of the black ink in a cell having an optical path length of 5 μm.

* * * * *